United States Patent
Brew et al.

(10) Patent No.: US 12,431,763 B1
(45) Date of Patent: Sep. 30, 2025

(54) CONDUCTIVE AERODYNAMIC STATOR

(71) Applicant: Whisper Aero Inc., Crossville, TN (US)

(72) Inventors: Patrick Brew, Arlington, VA (US); Matthew Alan Dempsey, Nashville, TN (US); Devon Jedamski, Nashville, TN (US); Andy Le, Garden Grove, CA (US); Chris Peterson, Crossville, TN (US); Paul Rothhaar, Yorktown, VA (US); Andy Yoon, Nashville, TN (US); David Gelwan, West Hartford, CT (US)

(73) Assignee: Whisper Aero Inc., Crossville, TN (US)

( * ) Notice: Subject to any disclaimer, the term of this patent is extended or adjusted under 35 U.S.C. 154(b) by 0 days.

(21) Appl. No.: 18/973,853

(22) Filed: Dec. 9, 2024

Related U.S. Application Data

(60) Provisional application No. 63/644,938, filed on May 9, 2024.

(51) Int. Cl.
*H02K 7/14* (2006.01)
*B64D 27/30* (2024.01)
(Continued)

(52) U.S. Cl.
CPC ............ *H02K 7/145* (2013.01); *F01D 9/041* (2013.01); *F01D 25/10* (2013.01); *H02K 7/14* (2013.01);
(Continued)

(58) Field of Classification Search
CPC ........... F05D 2220/323; F05D 2270/80; F05D 2300/5024; H02K 7/145; H02K 7/14; F01D 9/041; F01D 25/10; B64D 27/30
See application file for complete search history.

(56) References Cited

U.S. PATENT DOCUMENTS 6,129,528 A   10/2000   Bradbury et al.
6,600,249 B2   7/2003   Nelson et al.
(Continued)

FOREIGN PATENT DOCUMENTS

EP   3998213 A1      5/2022
EP   4155193 A1 *   3/2023   ........... B64D 35/026
(Continued)

OTHER PUBLICATIONS

Mar. 6, 2025—(WO) International Search Report and Written Opinion—App PCT/US2024/059180.

*Primary Examiner* — Brian Christopher Delrue
(74) *Attorney, Agent, or Firm* — Banner & Witcoff, Ltd.

(57) ABSTRACT

An air-moving device may include an aerodynamic stator. The aerodynamic stator may be positioned forward of a motor of the air-moving device and aftward of an aerodynamic rotor of the air-moving device. A control unit may be integrated in and in thermal communication with the aerodynamic stator. The aerodynamic stator may transfer heat from the control unit to thermally conductive stator vanes of the aerodynamic stator. An airflow generated by the aerodynamic rotor may facilitate heat dissipation from the thermally conductive stator vanes. The aerodynamic stator may include electrically conductive stator vanes. The electrically conductive stator vanes may provide at least one of power or control signaling to the control unit.

21 Claims, 31 Drawing Sheets

(51) Int. Cl.
*F01D 9/04* (2006.01)
*F01D 25/10* (2006.01)

(52) U.S. Cl.
CPC ........ *B64D 27/30* (2024.01); *F05D 2220/323* (2013.01); *F05D 2270/80* (2013.01); *F05D 2300/5024* (2013.01)

(56) References Cited

U.S. PATENT DOCUMENTS

| | | | |
|---|---|---|---|
| 6,754,075 B2 | 6/2004 | Boucheret et al. | |
| 7,976,293 B2 | 7/2011 | Kusano | |
| 8,251,674 B1 | 8/2012 | Pairaktaridis | |
| 9,680,356 B2 | 6/2017 | Seidenbinder et al. | |
| 9,970,445 B2 * | 5/2018 | Kodato | A47L 5/14 |
| 10,090,735 B2 | 10/2018 | Bradfield | |
| 11,279,201 B2 | 3/2022 | Havel | |
| 11,316,409 B2 | 4/2022 | Goto et al. | |
| 11,506,065 B1 * | 11/2022 | Kim | C04B 35/80 |
| 11,802,485 B2 * | 10/2023 | Moore | F04D 29/329 |
| 11,873,824 B2 * | 1/2024 | Lee | F04D 29/403 |
| 2003/0030348 A1 * | 2/2003 | Lopatinsky | H02K 1/12 310/DIG. 6 |
| 2004/0037715 A1 * | 2/2004 | Bader | F04D 29/5806 417/366 |
| 2007/0115163 A1 * | 5/2007 | Brittingham | H01Q 3/46 342/13 |
| 2007/0128022 A1 | 6/2007 | Yeh et al. | |
| 2007/0182261 A1 * | 8/2007 | Rapp | F04D 25/0646 310/90 |
| 2007/0217149 A1 | 9/2007 | Horng et al. | |
| 2007/0227470 A1 * | 10/2007 | Cole | F02N 11/04 123/3 |
| 2007/0237656 A1 * | 10/2007 | Pipkorn | F04D 29/542 417/366 |
| 2007/0252451 A1 | 11/2007 | Shibuya et al. | |
| 2008/0075593 A1 * | 3/2008 | Read | F01D 25/02 415/177 |
| 2008/0116753 A1 * | 5/2008 | Carlucci | H02K 7/145 388/816 |
| 2009/0226299 A1 | 9/2009 | Jin | |
| 2009/0263242 A1 * | 10/2009 | Winkler | F04D 29/601 415/213.1 |
| 2010/0117468 A1 * | 5/2010 | Kurita | F04D 25/0633 310/68 B |
| 2010/0314885 A1 * | 12/2010 | Presz, Jr. | F03D 1/04 290/55 |
| 2012/0039732 A1 | 2/2012 | Chang | |
| 2012/0301290 A1 * | 11/2012 | Justak | F03D 9/00 415/208.2 |
| 2015/0211535 A1 * | 7/2015 | Kodato | F04D 29/5806 417/371 |
| 2019/0315476 A1 | 10/2019 | Lawrence | |
| 2020/0239146 A1 * | 7/2020 | Friend | F02C 7/047 |
| 2020/0240289 A1 * | 7/2020 | Karapurath | F01D 17/162 |
| 2020/0244139 A1 * | 7/2020 | Vermeulen | B64C 27/08 |
| 2021/0288553 A1 | 9/2021 | Day et al. | |
| 2023/0303264 A1 * | 9/2023 | Schenk | F02K 7/10 |
| 2024/0352871 A1 * | 10/2024 | Bitter | F01D 5/147 |
| 2024/0384660 A1 * | 11/2024 | Votie | F01D 5/189 |
| 2025/0146496 A1 * | 5/2025 | Zheng | F04D 29/4253 |

FOREIGN PATENT DOCUMENTS

| | | | | |
|---|---|---|---|---|
| FR | 2728631 B1 | | 2/1997 | |
| FR | 2742813 B1 | | 2/1998 | |
| GB | 2626583 A | * | 7/2024 | ............. H02K 9/06 |
| JP | 2004511197 A | * | 4/2004 | ............. H02K 5/15 |
| WO | WO-2004108198 A1 | * | 12/2004 | ............ F04D 17/12 |
| WO | 2008062835 A1 | | 5/2008 | |
| WO | 2023102573 A1 | | 6/2023 | |

\* cited by examiner

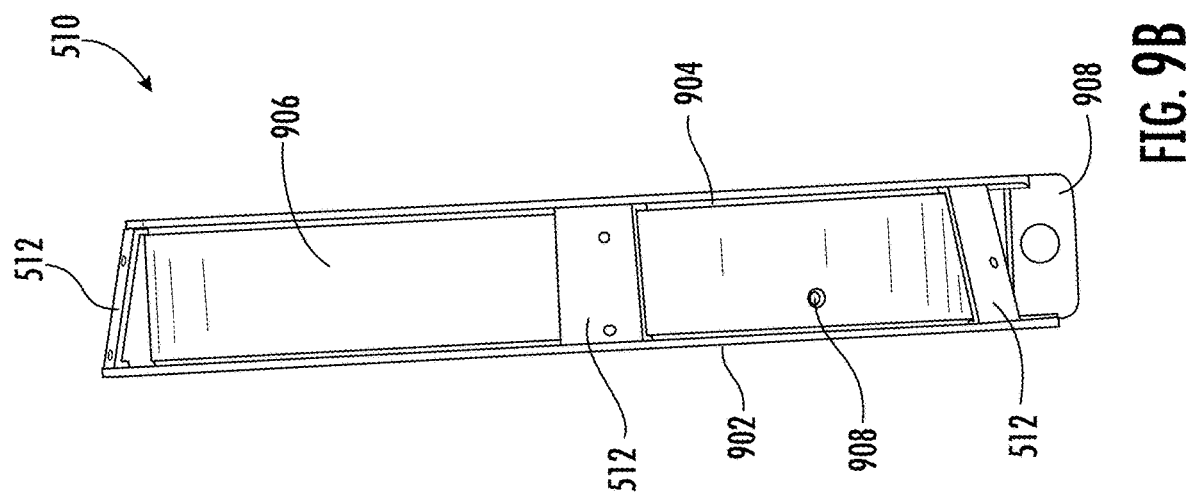
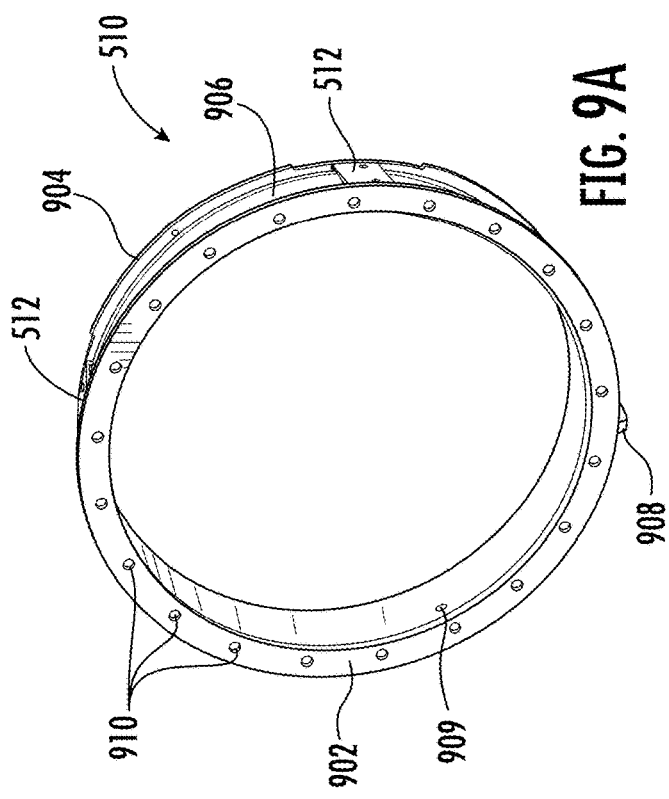
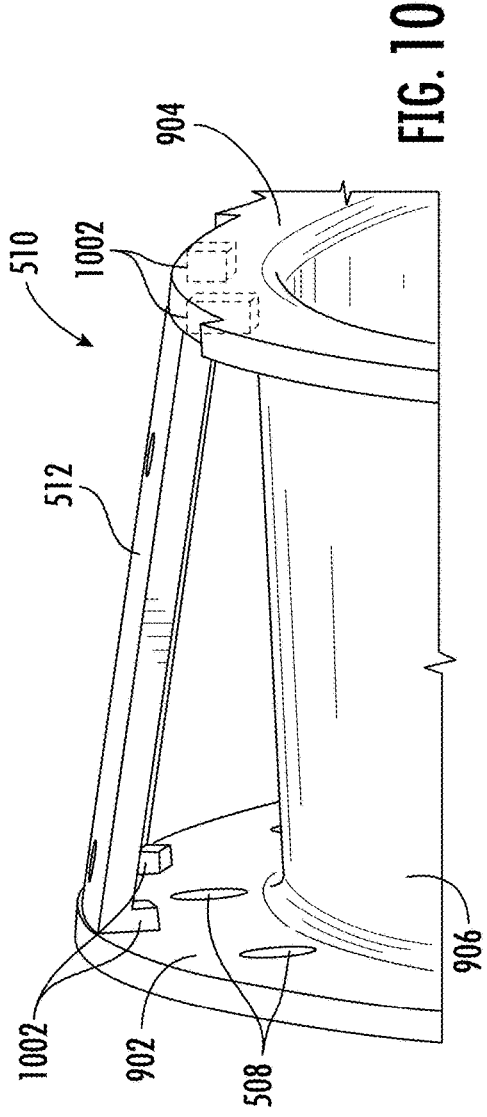

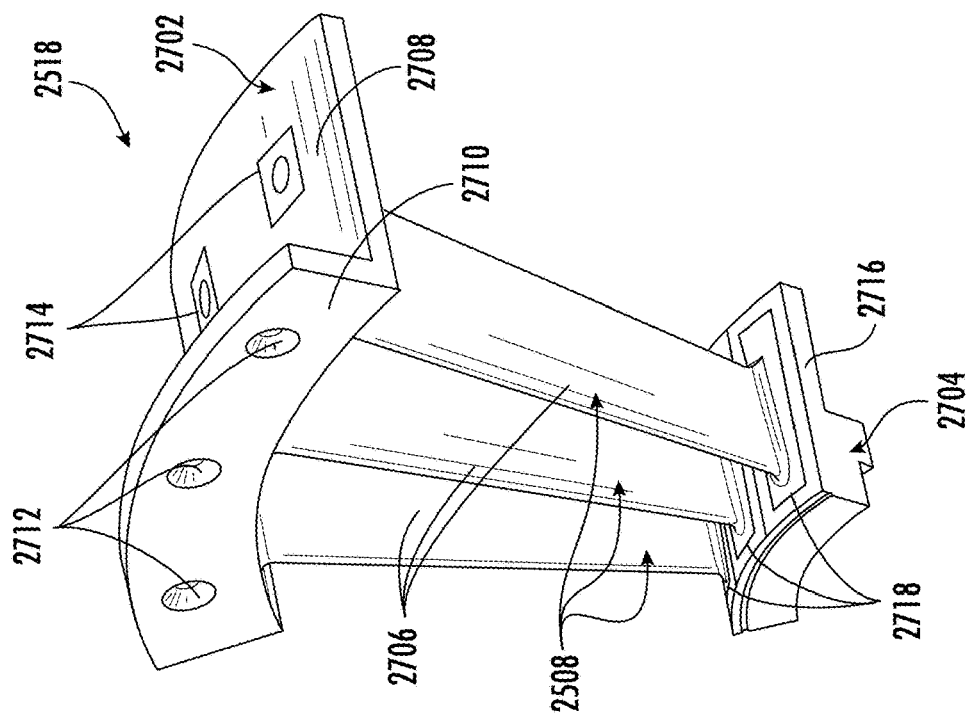
FIG. 27
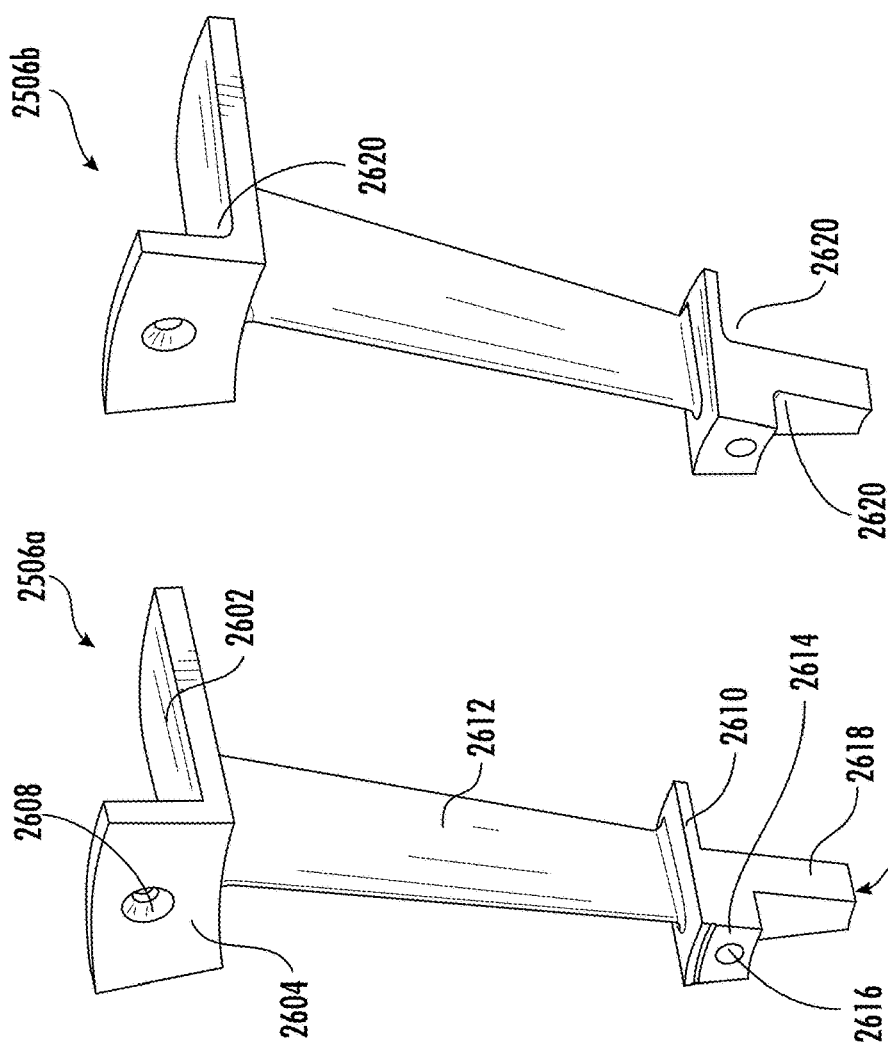
FIG. 26B
FIG. 26A

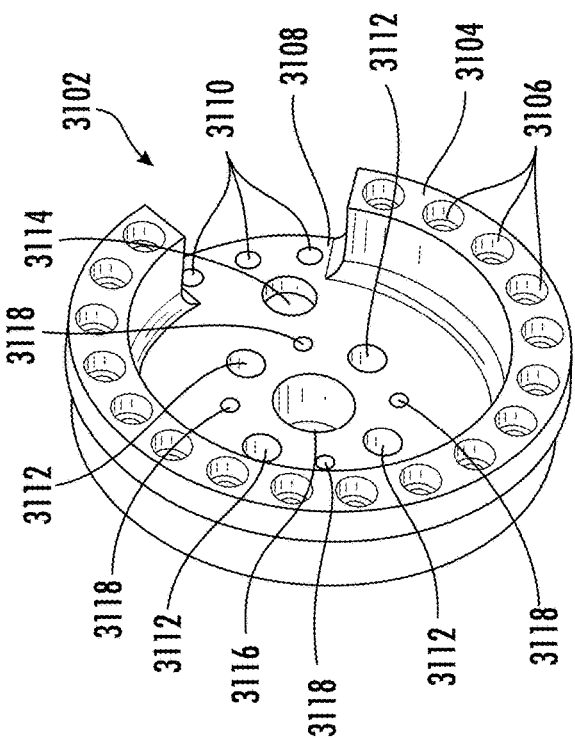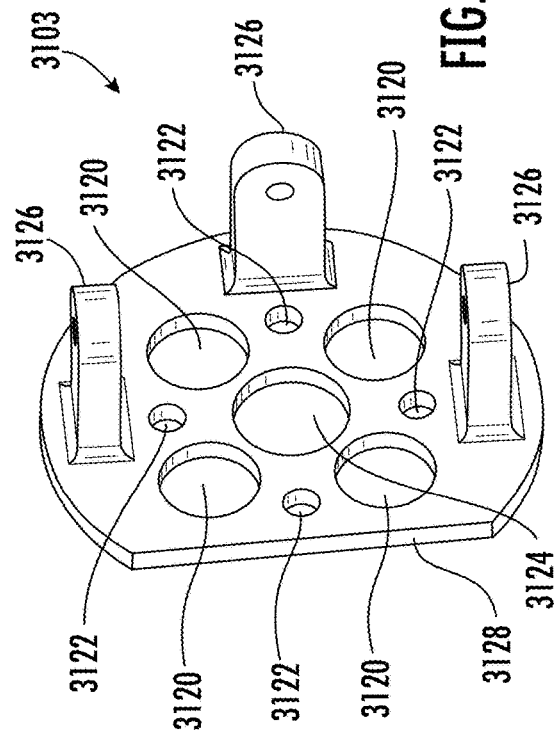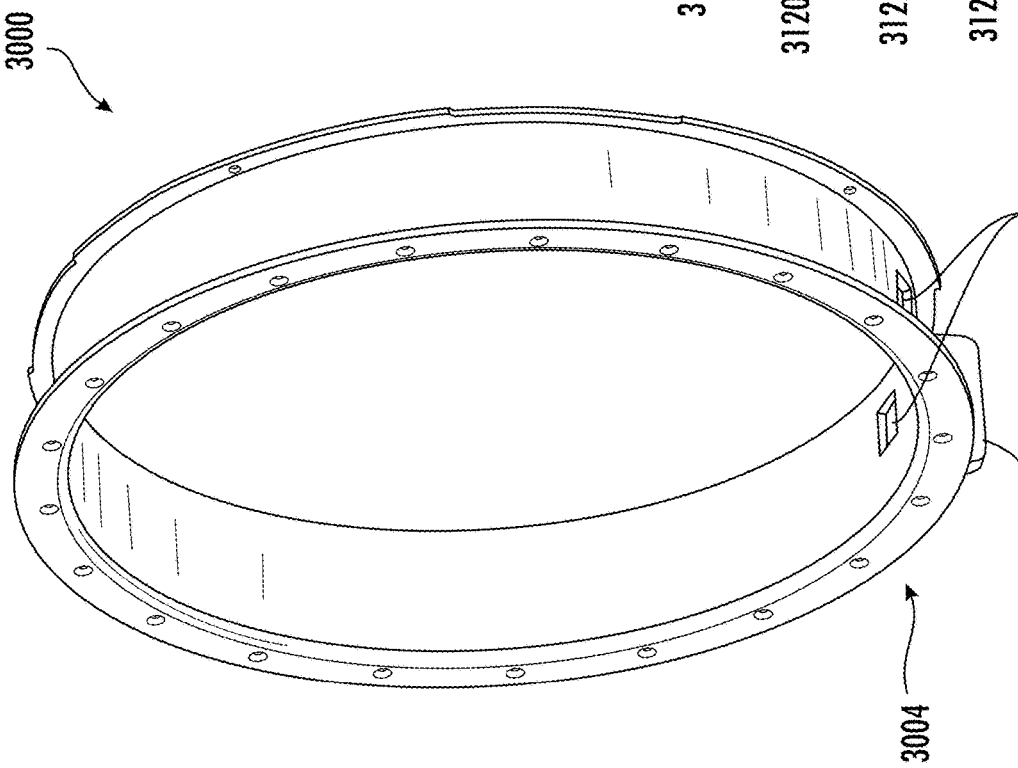

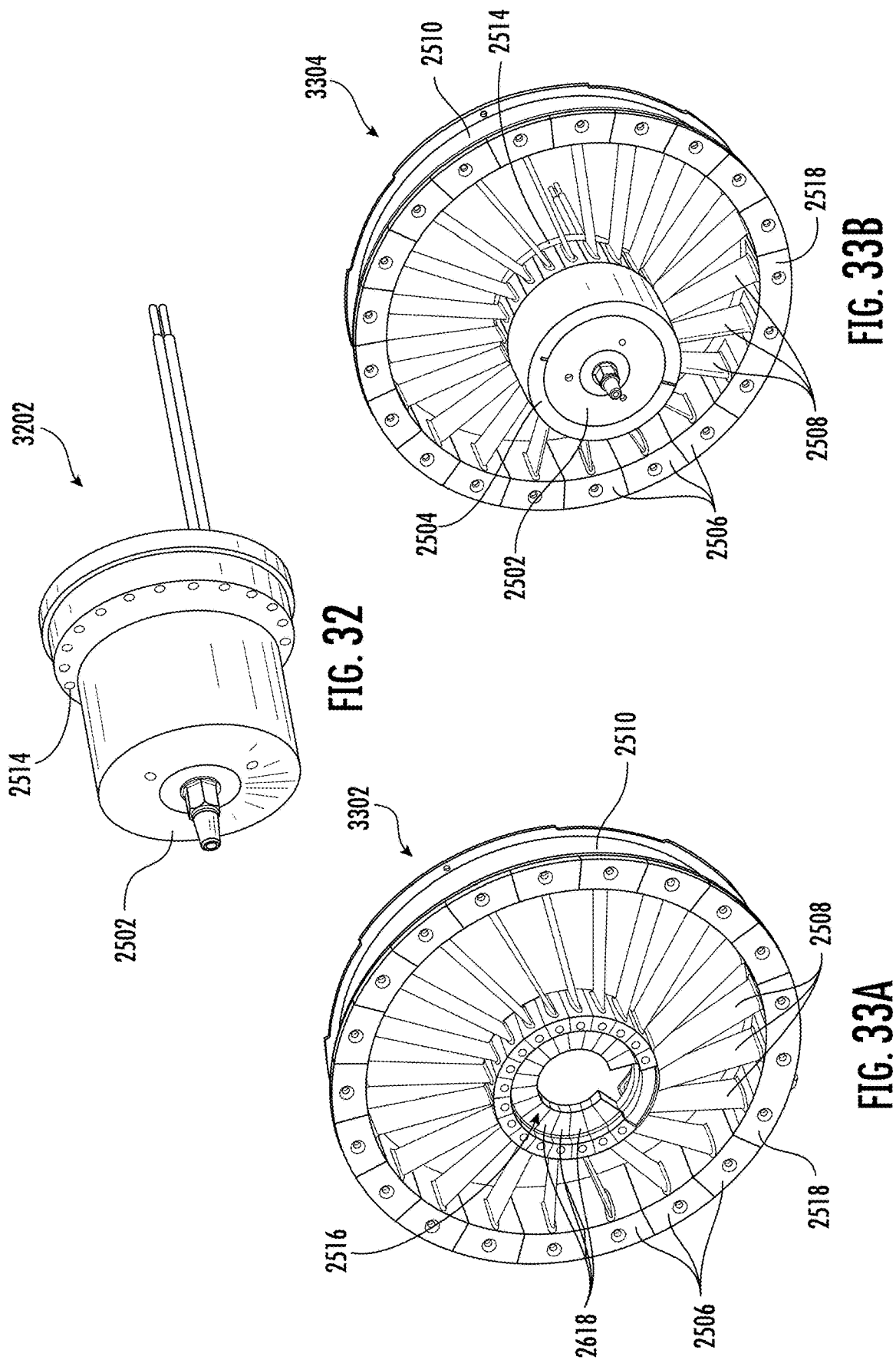

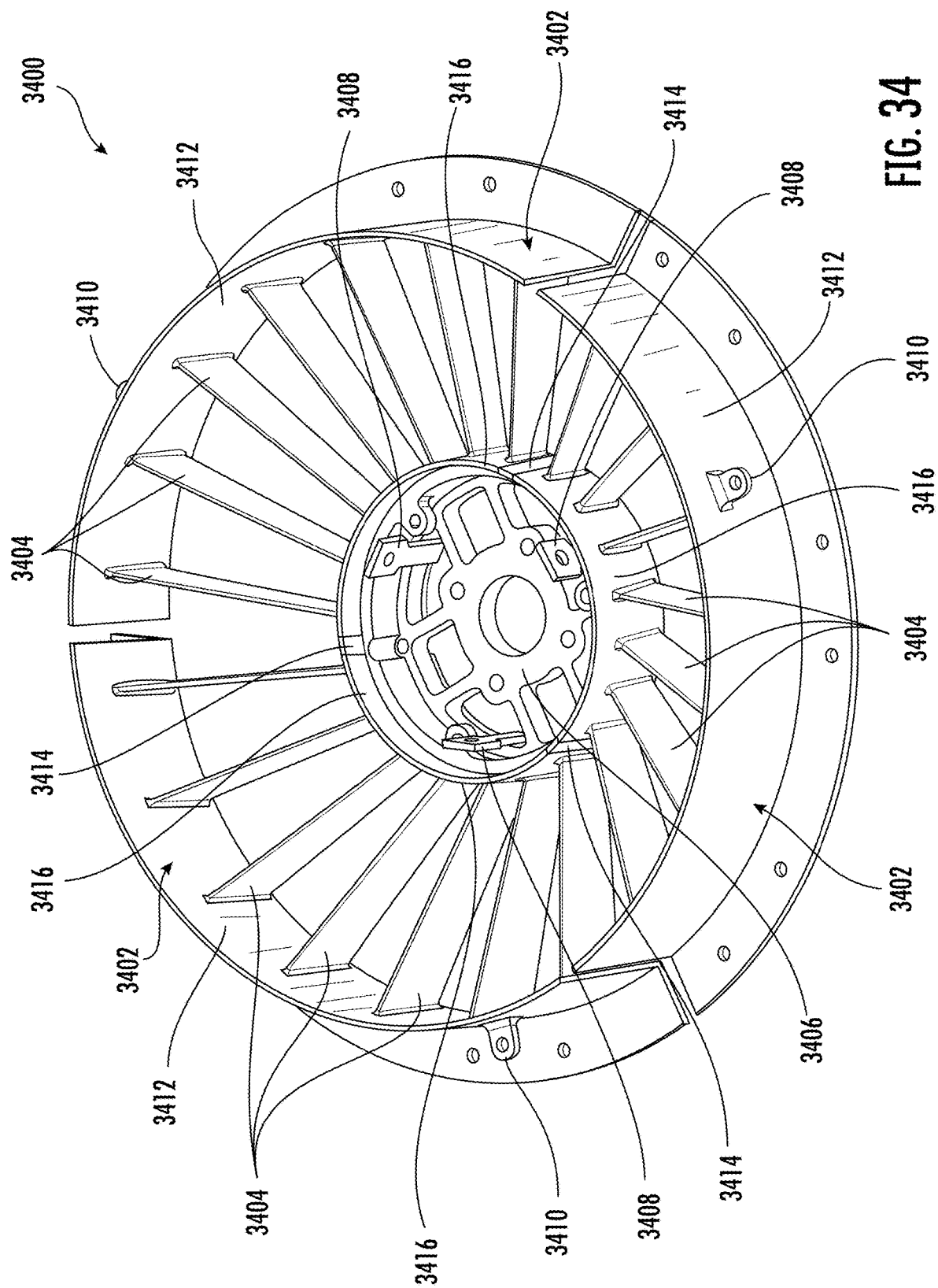

CONDUCTIVE AERODYNAMIC STATOR

CROSS-REFERENCE TO RELATED APPLICATIONS

This application claims priority to U.S. Provisional Patent Application No. 63/644,938 titled "Integrated Propulsor with Forward Electronic Speed Controller and Conductive Stator" filed on May 9, 2024, which is incorporated by reference herein in its entirety.

FIELD

The present disclosure generally relates to aerodynamic stators of air-moving devices, more particularly relates to thermally and/or electrically conductive aerodynamic stators, and more specifically relates to thermally and/or electrically conductive aerodynamic stators configured to house a control unit of an air-moving device.

BACKGROUND

Air-moving devices are used in a variety of applications. Examples include drying, cooling, moving debris, providing ventilation, providing thrust, hovering, and the like. During operation, a control unit of the air-moving device may generate heat.

SUMMARY

The following summary present a general overview of various aspects of the present disclosures. This summary is not an extensive description of all aspects of the present disclosures and should not be understood to identify key or critical elements.

Air-moving devices having an aerodynamic ("aero") stator assembly are described. Example aero stator assemblies described herein are configured to integrate a control unit, electronic speed controller (ESC), or motor within a central cavity defined by the aero stator assembly.

In some examples, when integrated into an aero stator assembly, the control unit, ESC, or motor is in thermal communication with the aero stator assembly. The aero stator assemblies in these examples are thermally conductive such that heat generated by the control unit, ESC, or motor is transferred away and dissipated. The heat is transferred to thermally conductive stator vanes that are positioned within an airflow generated by an aerodynamic rotor of an air-moving device. The airflow across the thermally conductive stator vanes facilitate dissipation of the heat transferred from the control unit, ESC, or motor. The thermally conductive stator vanes thus function as a heat sink in these example aero stator assemblies. In some examples, an aero stator assembly that integrates a control unit or ESC may be positioned between the aerodynamic rotor and the motor of an air-moving, for example, aftward of the aerodynamic rotor and forward of the motor. In other examples, an aero stator assembly that integrates a motor, a control unit, or an ESC may be positioned forward of the aerodynamic rotor (e.g., in air-moving devices that ingest air from a rear end of the air-moving device). Integrating a control unit, ESC, or motor into an aero stator assembly configured to function as a heat sink may avoid overheating by facilitating dissipation of waste heat and, in turn, maintenance of suitable operating temperatures during operation.

Example aero stator assemblies described herein additionally or alternatively are electrically conductive. In some examples, aero stator assemblies include electrically conductive stator vanes. An electrically conductive stator vane may conduct electric power to the control unit, ESC, or motor integrated into the aero stator assembly. An electrically conductive stator vane may conduct electric signaling to the control unit, ESC, or motor integrated into the aero stator assembly. Signaling may include, for example, sensor signaling, control signaling, communication signaling, and combinations of such signaling. Providing electric power and/or electric control signaling via electrically conductive stator vanes to a control unit, ESC, or motor integrated into an aero stator assembly, may reduce the weight of the air-moving device by omitting components (e.g., struts, bulkheads) that may be necessary if the control unit, ESC, or motor were positioned elsewhere in the air-moving device. For example, providing electric power and/or electric control signaling via electrically conductive stator vanes eliminates any need to pass electrical wiring through a duct of an air-moving device thereby improving aerodynamic efficiency, reducing weight, and reducing noise output.

These features and advantages, as well as others, are described in further detail below.

BRIEF DESCRIPTION OF THE DRAWINGS

The present disclosure is illustrated by way of example and not limited in the accompanying figures in which like reference numerals indicate similar elements and in which:

FIG. 9A depicts a front perspective view of an example of an structural shroud of the example aero stator assembly of FIGS. 5A-D in accordance with aspects of the present disclosure;

FIG. 9B depicts a side view of the example structural shroud of FIG. 9A in accordance with aspects of the present disclosure;

FIG. 10 depicts a side view of a rib of the example structural shroud of FIGS. 9A-B in accordance with aspects of the present disclosure;

FIGS. 26A-B depict respective perspective views of examples of stator vanes of the example aero stator assembly of FIG. 25A in accordance with aspects of the present disclosure;

FIG. 27 depicts a perspective view of an example of an electrically conductive stator vane sector of the example aero stator assembly of FIG. 25A in accordance with aspects of the present disclosure;

FIG. 30 depicts a perspective view of an example of an outer structural shroud of the example aero stator assembly of FIG. 25A in accordance with aspects of the present disclosure;

FIG. 31A depicts a rear perspective view of another example of a motor mounting plate of the example aero stator assembly of FIG. 25A in accordance with aspects of the present disclosure;

FIG. 31B depicts a rear perspective view of an example of an aft mounting plate for the example motor mounting plate of FIG. 31A in accordance with aspects of the present disclosure;

FIG. 32 depicts a perspective view of an assembly of the example motor mounting plate of FIG. 31A with an example motor in accordance with aspects of the present disclosure;

FIG. 33A depicts a perspective view of an assembly of the example structural shroud of FIG. 30 with the example stator vanes of FIG. 26A or FIG. 26B and the example stator vane sector of FIG. 27 in accordance with aspects of the present disclosure;

FIG. 33B depicts a perspective view of the assembly of FIG. 33A with the example motor of FIG. 32 and the example motor thermal clamping sleeve of FIG. 28 in accordance with aspects of the present disclosure;

FIG. 34 depicts a perspective view of another example of an aero stator assembly in accordance with aspects of the present disclosure;

DETAILED DESCRIPTION

Figure 1:
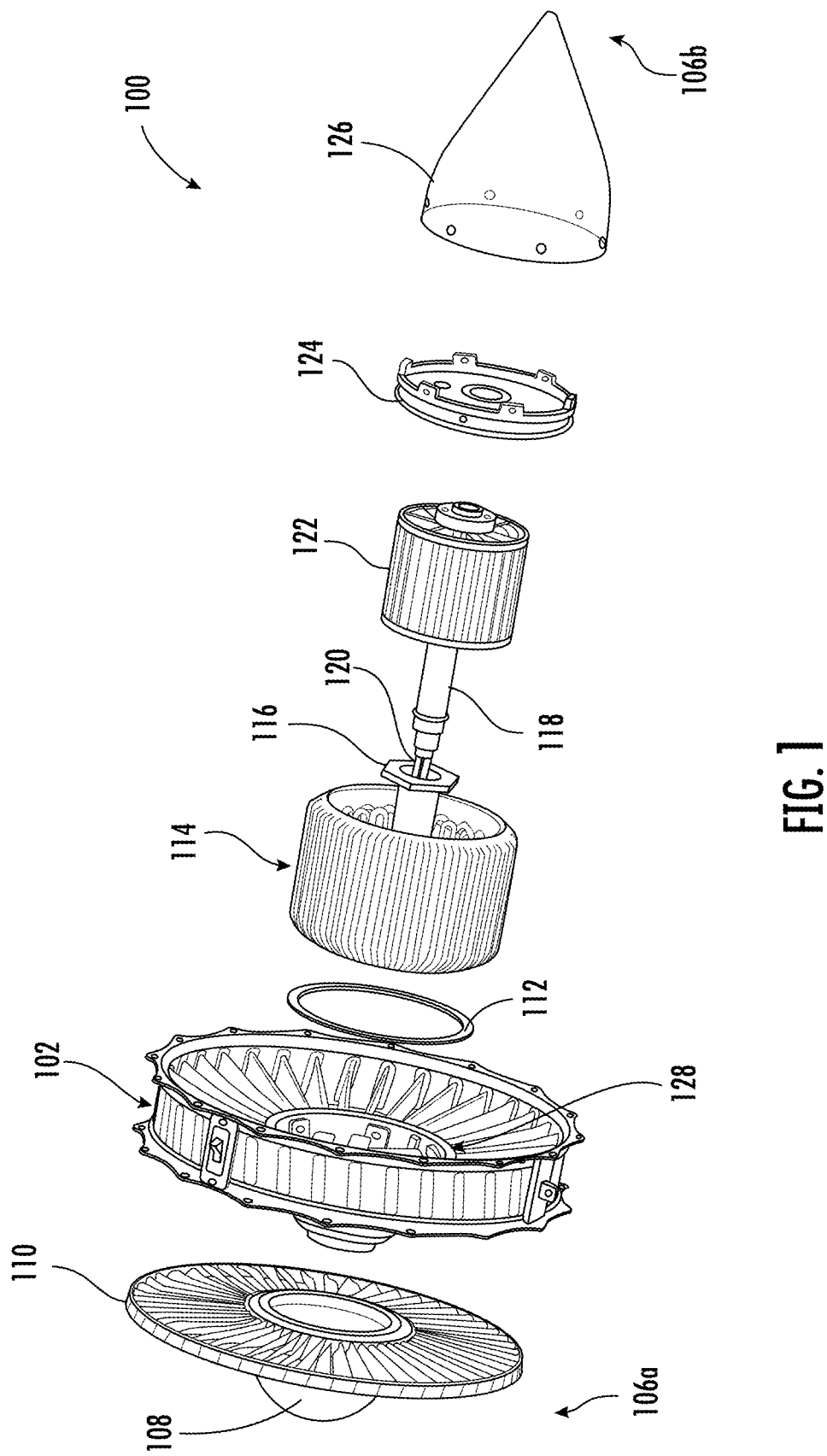
FIG. 1 depicts a perspective, exploded view of example components of an air-moving device in accordance with aspects of the present disclosure.

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure. Further, headings within this disclosure should not be considered as limiting aspects of the disclosure. Those skilled in the art with the benefit of this disclosure will appreciate that the example embodiments are not limited to the example headings.

As noted above, aspects of the present disclosure generally relate to aero stator assemblies of air-moving devices. In some examples, an aero stator assembly may be configured to house or otherwise position a control unit of an air-moving device in a central location of the aero stator such that the heat-generating elements of the control unit are in thermal communication with the aero stator assembly. In other examples, an aero stator assembly may be configured to house or otherwise position a motor of the air-moving device in a central location of the aero stator assembly such that the motor itself is in thermal communication with the aero stator assembly. The aero stator assembly may be constructed of a thermally conductive material. Vanes of the aero stator assembly are positioned in the airflow path of the air-moving device. By positioning the control unit or motor to be in thermal communication with the aero stator assembly, heat generated by the control unit or motor during operation may be transferred away through the thermally conductive material of the aero stator assembly and dissipated by the stator vanes that reside within the airflow path. In other words, the thermal arrangement of the aero stator assembly with the control unit or motor transforms the aero stator assembly into a type of heat sink that is cooled via the flow of air across the stator vanes. Furthermore, in some examples, an aero stator assembly may be positioned upstream (in front) of a motor of an air-moving device. By positioning the aero stator assembly upstream of the motor, the aero stator assembly receives the flow of air before that airflow is warmed as a result of passing over the motor. The location of the control unit within the aero stator assembly and the positioning of the aero stator assembly upstream of the motor, in these examples, may reduce or eliminate the need for additional components (e.g., struts) and/or wiring often seen in air-moving devices that house control units behind the motor (e.g., in a tail cone). The location of the control unit within the aero stator assembly also may result in a center of gravity that is more toward a center of the air-moving device in contrast to other air-moving devices that house their respective control units toward a rear of the air-moving device (e.g., in a tail cone).

As also described in further detail below, an aero stator assembly may be electrically conductive. By positioning a control unit in a central location of the aero stator assembly, electrical power signals and/or electrical control signaling (control signals) may be provided to the control unit via the electrically conductive elements of the aero stator assembly, which may then provide corresponding electrical power and/or electrical control signaling to an electric motor of the air-moving device. In some examples, an aero stator assembly may be both thermally conductive to transfer and dissipate heat from a centrally located control unit or motor and electrically conductive to deliver power and/or control signals via the stator vanes of the aero stator assembly. In some examples, an aero stator assembly may be only electrically conductive to deliver power and/or control signals via the stator vanes of the aero stator assembly whereby the aero stator assembly is not relied on for heat transfer and dissipation. More generally, the central location of an aero stator assembly may receive a component (e.g., a heat-generating component such as a motor or a control unit), and that component may be in conductive communication (e.g., electrical communication, thermal communication) with the stator vanes of the aero stator assembly. As used herein, for convenience, an element may be said to be in thermal communication with another element when heat can be transferred between those elements either directly as a result of those elements being in physical contact with each other or indirectly via one or more other intermediate elements as a result of respective physical contact between the elements. Elements that are said to be in electrical communication with each other should be similarly understood, for example, when electrical signals (e.g., power, control signaling) can be delivered via those elements either directly as a result of those elements being in direct electrical contact with each other or indirectly via one or more intermediate elements as a result of respective electrical contact between the elements.

Various examples of aero stator assemblies are described herein. FIGS. 1-4 relate to an example of an aero stator assembly that is both electrically and thermally conductive and configured to position a control unit within a central location of the aero stator assembly. FIGS. 5A-14 relate to an example of an aero stator assembly that is thermally conductive and configured to position a motor within a central location of the aero stator assembly. FIGS. 15-24F relate to an example of an aero stator assembly that is both thermally and electrically conductive and configured to position a motor in a central location of the aero stator assembly. FIGS. 25A-33B relate to another example of an aero stator assembly that is both thermally and electrically conductive and configured to position a motor within a central location of the aero stator assembly. FIGS. 34-42B relate to an example of an aero stator assembly that is electrically conductive and configured to position a motor within a central location of the aero stator assembly.

Figure 2:
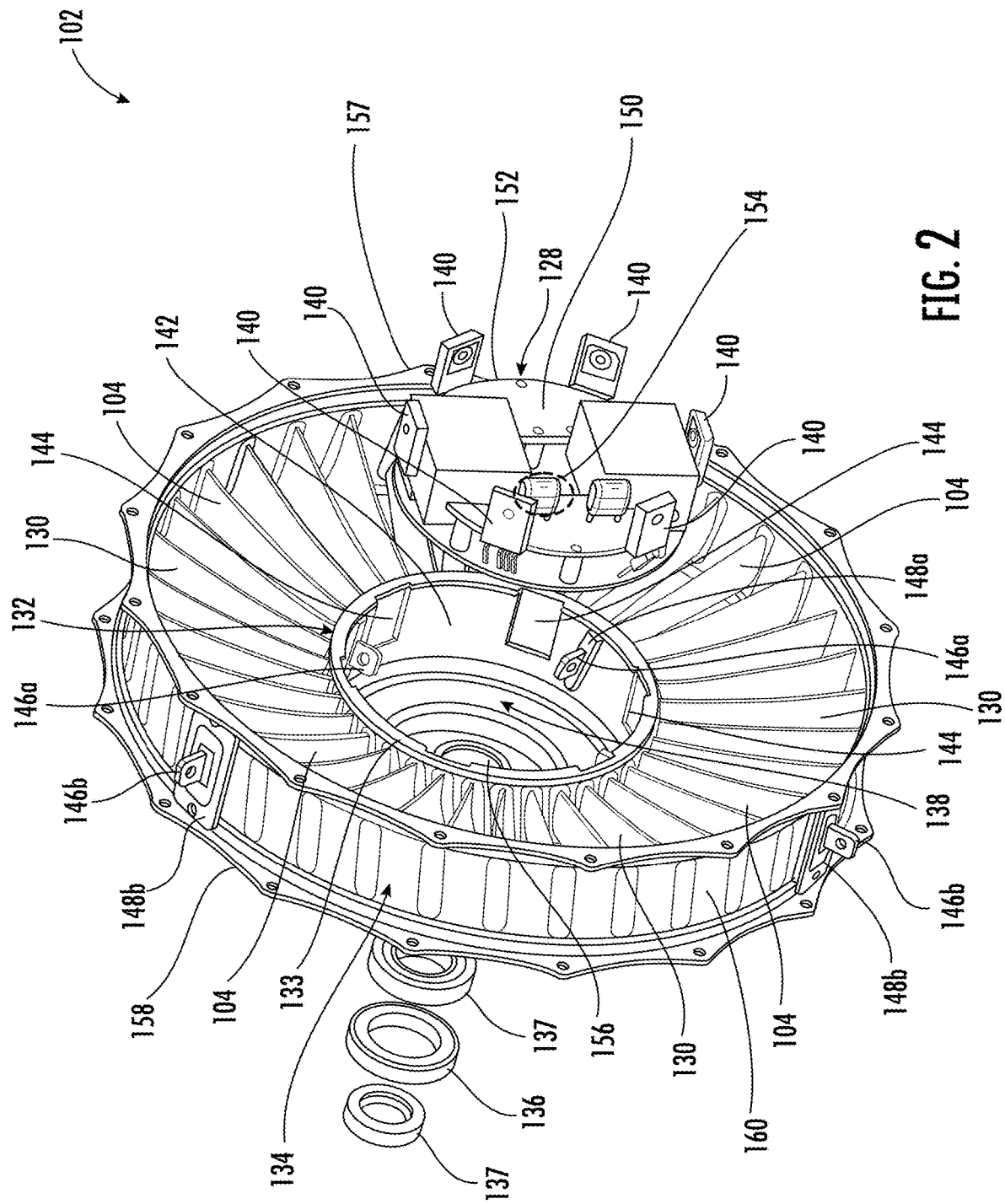
FIG. 2 depicts a perspective, exploded view of an example of an aero stator assembly in accordance with aspects of the present disclosure.
Figure 3:
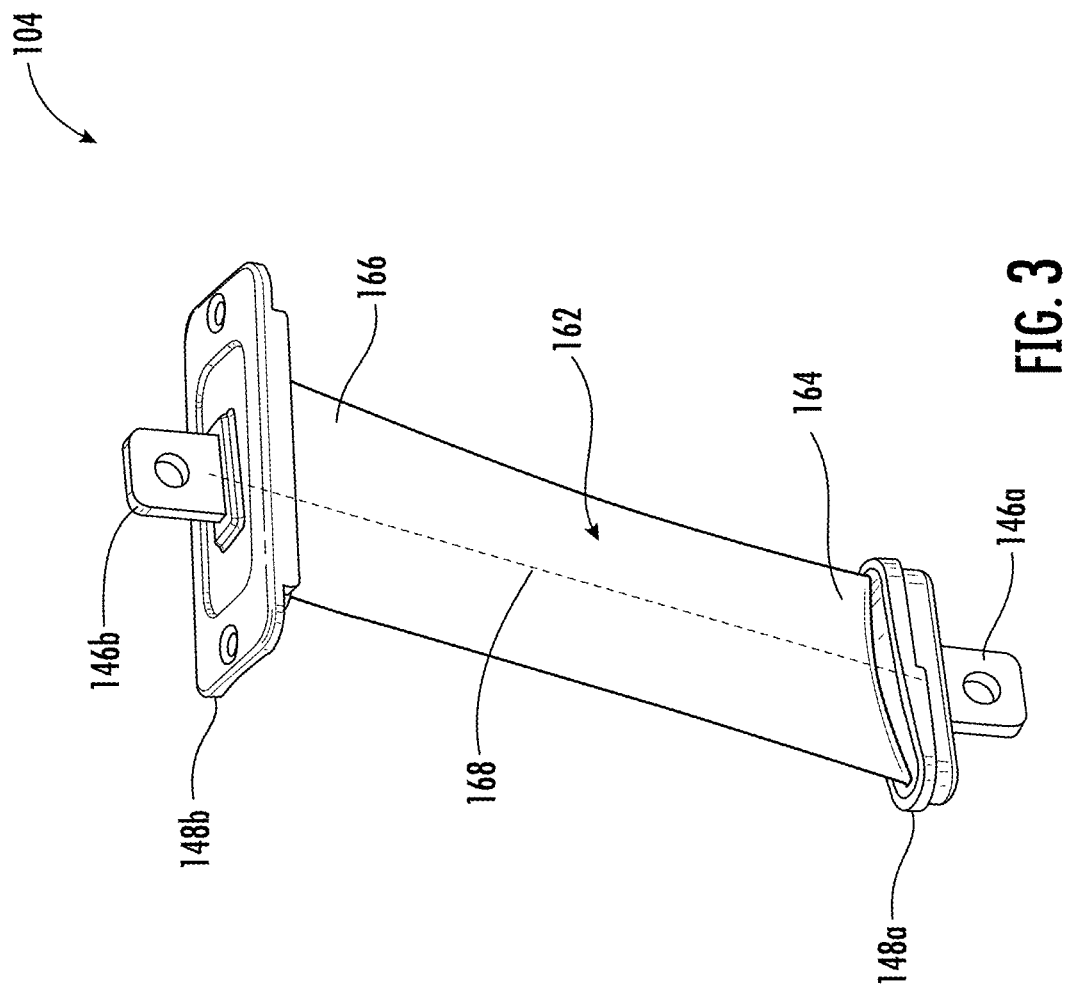
FIG. 3 depicts a perspective view of an example of an electrically conductive stator vane in accordance with aspects of the present disclosure.
Figure 4:
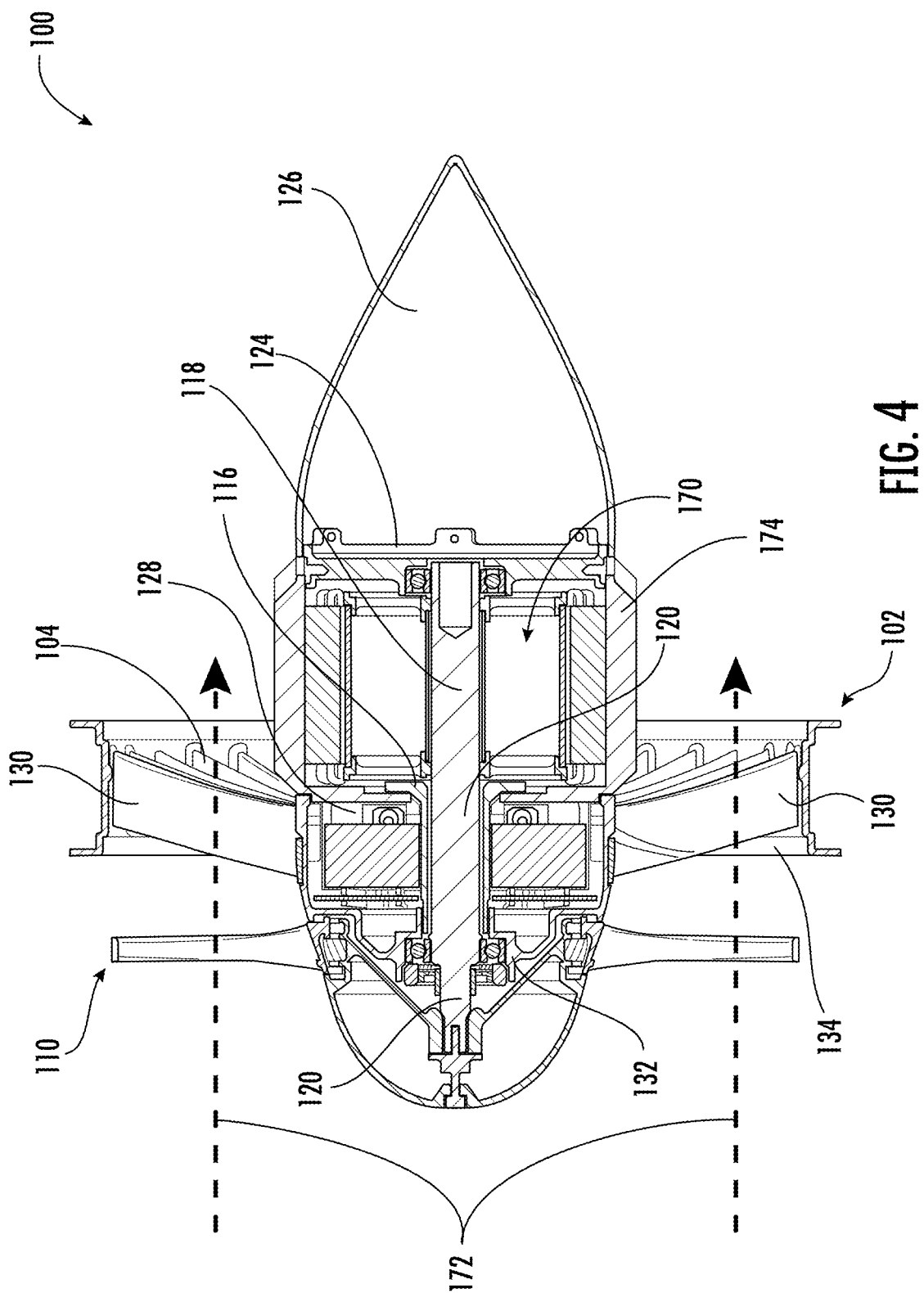
FIG. 4 depicts a cross-sectional view of the example components of the air-moving device of FIG. 1 in accordance with aspects of the present disclosure.

To introduce concepts directed to the aero stator assemblies described herein, reference is first made to FIGS. 1-4. FIG. 1 depicts a perspective, exploded view of example components of an air-moving device 100. FIG. 2 depicts a perspective, exploded view of an example of the aero stator assembly 102. FIG. 3 depicts a perspective view of an example of an electrically conductive stator vane 104. FIG. 4 depicts a cross-sectional view of the example components of the air-moving device 100 of FIG. 1 in an assembled configuration.

The components of the example air-moving device 100 in FIG. 1 may be described by moving from the forward end 106a to the aft end 106b of the air-moving device. Starting at the forward end 106a, the air-moving device 100, in this example, includes a nose cone 108, an aerodynamic (aero) rotor 110, the aero stator assembly 102, a motor seal 112, a motor stator 114, a fastening collar 116, a drive shaft 118 having a coupler 120 for the aero rotor 110, a motor rotor 122, a motor end plate (cap) 124, and a tail cone 126. The motor 114, drive shaft 118, and motor rotor 122 may collectively form the motor of the air-moving device 100. As described herein, in some examples, the motor may be an electric motor. In some examples, the motor may be an outrunner motor. Accordingly, the drive shaft, in some examples, may be the output shaft of an outrunner motor. More generally, any suitable mechanical power delivery mechanism may be employed to drive rotation of an aerodynamic rotor (e.g., aerodynamic rotor 110). For example, a mechanical power delivery mechanism may be or include a combustion engine. In some examples, the mechanical power delivery mechanism may be a hybrid system that drives rotation of an aerodynamic rotor (e.g., an electric motor and a combustion engine).

As used herein, a forward direction refers to a direction toward a forward (front) end of an air-moving device (e.g., toward a nose cone) and an aftward direction refers to a direction toward an aft (rear) end of an air-moving device (e.g., toward a tail cone). As also used herein, an axial direction refers to a direction along a longitudinal axis of an air-moving device (e.g., generally parallel along the length of an air-moving device between and through a nose cone and a tail cone). As further used herein, a radial direction refers to a direction along a radius of an air-moving device (e.g., generally perpendicularly from a longitudinal axis toward an outer perimeter of an aero rotor, aero stator, etc.) or along a lateral axis, transverse axis, or vertical axis of an air-moving device that are perpendicular to the longitudinal axis.

The aero rotor 110 may be, for example, an aero rotor assembly or a single-part aero rotor having a monolithic construction (e.g., an aero rotor with blades that are contiguous with a hub of the aero rotor and contiguous with a shroud of the aero rotor). The aero rotor 110 may be referred to as a bladed disk or blisk. Examples of aero rotor assemblies are described in commonly owned U.S. Pat. No. 11,802,485 titled "Propulsor Fan Array," which is incorporated by reference herein in its entirety. Examples of single-part aero rotors are described in commonly owned U.S. patent application Ser. No. 18/891,746 titled "Air Moving Devices, Aerodynamic Rotor, and Methods," which is incorporated by reference herein in its entirety. In some examples, the aero rotor 110 may be a shrouded fan. In some examples, the aero rotor may be a propeller (prop) fan.

As seen in FIG. 1, and as described in further detail below with reference to FIG. 2, a control unit 128 is positioned within a central cavity defined by a hub of the aero stator assembly 102. The control unit 128 may be or otherwise include an electronic speed controller (ESC) used to control and regulate the speed of the motor. As such, the control unit 128 is configured to electrically couple to the motor of an air-moving device. The fastening collar 116 (sleeve, collet), in this example, is configured to couple (mount) the control unit 128 to the motor. The example fastening collar 116 axially extends along the air-moving device through the aero stator assembly 102 toward the aero rotor 110. The example fastening collar 116 houses the drive shaft 118 within an axial channel that extends through the fastening collar. The drive shaft 118 thus extends through the fastening collar 116 and connects the aero rotor 110 to the motor (e.g., the motor rotor 122) via the coupler 120 at the end of the drive shaft. The control unit 128, in this example, thus includes a central aperture (opening) that allows the fastening collar 116 with the drive shaft 118 to pass through the control unit for coupling the drive shaft to the aero rotor 110. As also seen from FIG. 1, positioning the control unit 128 shifts the center of gravity of the air-moving device 100 forward toward the middle of the air-moving device where the aero stator assembly 102 and motor are located relative to the center of gravity if the control unit were positioned behind the motor, for example, in the tail cone 126.

Turning to FIG. 2, example components of the aero stator assembly 102 are shown. The aero stator assembly 102, in this example, includes the control unit 128, multiple stator vanes including both electrically conductive stator vanes 104 and thermally conductive vanes 130, a hub 132, a structural shroud 134, a drive shaft bearing 136, and various seals 137. As seen in FIG. 2, the hub 132 comprises an axial rim 133 that defines a central region of the aero stator assembly 102, and the structural shroud 134 defines an outer perimeter of the aero stator assembly. The electrically conductive stator vanes 104 and the thermally conductive vanes 130 radially extend away from an outer surface of the hub 132 toward an outer perimeter of the aero stator assembly 102. For example, the electrically conductive stator vanes 104 and the thermally conductive vanes 130 radially extend between the hub 132 and the structural shroud 134. For convenience only some of the thermally conductive vanes 130 have been labeled with a reference number in FIG. 2. Example implementations of an aero stator assembly in accordance with aspects of these disclosures may include more or fewer stator vanes than depicted in FIG. 2. In some examples, an aero stator assembly may include a quantity of thermally conductive vanes (e.g., thermally conductive vanes 130) in the range of about 10-60 stator vanes. In some examples, the quantity of stator vanes may be in the range of about 30-40 stator vanes (e.g., 36 stator vanes). In some examples, the quantity of stator vanes may be in the range of about 25-50 stator vanes (e.g., 45 stator vanes). In some examples, the quantity of stator vanes may be higher than 60 or fewer than 10. In some examples, an aero stator assembly may include electrically conductive stator vanes (e.g., electrically conductive stator vanes 104) in the range of about 2-6 electrically conductive stator vanes. In one example, an aero stator assembly may include forty-four (44) total stator vanes with five of the stator vanes used to provide power and control signaling (e.g., one stator vane to conduct positive current, another stator vane to conduct negative current, and the remaining three stator vanes respectively used to provide three-phase power) and the remaining stator vanes divided in half between thermally conductive stator vanes and purely structural stator vanes (e.g., 20 thermally conductive stator vanes and 19 structural stator vanes or 19 thermally conductive stator vanes and 20 structural stator vanes).

Stator vanes may exhibit different constructions depending on their role in an aero stator assembly. For example, a stator vane may be configured for one or more of power delivery, control signaling, thermal conductivity, structural support, aerodynamics (e.g., reduce or minimize swirling of the airflow through the air-moving device), and acoustics (e.g., reduce or minimize noise generated by an air-moving device). In some examples, a stator vane may be configured for only one purpose (e.g., only power delivery, only thermal conductivity) or for a combination of purposes (e.g., structural support and aerodynamics, thermal conductivity and control signaling). As used herein, electrically conductive stator vanes refer to stator vanes configured for at least power delivery or control signaling, and thermally conductive stator vanes refer to stator vanes configured at least for thermal conductivity. It will be appreciated, however, that electrically conductive stator vanes may exhibit thermally conductive properties, provide structural support, and/or exhibit features designed to achieve desired aerodynamic and/or acoustic output. Similarly, it will be appreciated that thermally conductive stator vanes may provide structural support and/or exhibit features designed to achieve desired aerodynamic and/or acoustic output. As such, stator vanes may exhibit different constructions (e.g., materials, thickness, etc.) depending on their purpose in an aero stator assembly and in order to maintain desired performance characteristics (e.g., power delivery, signaling, thermal conductivity, structural support, aerodynamics, and/or acoustics). For example, electrically conductive stator vanes may be constructed of aluminum or copper and electrically conductive stator vanes may be constructed of aluminum. An electrically conductive stator vane may have a thickness sufficient for the desired or expected amperage through the stator vane. In some examples, relatively smaller thickness may be employed where power is distributed across multiple electrically conductive stator vanes. In some examples, stator vanes may have a thickness in the range of about 0.5 mm to about 2.0 mm (e.g., less than 1 mm, 0.5-1 mm, 1-2 mm). In some examples, the thickness of a stator vane may vary across the radial length of the stator vane (e.g., between the hub and the structural shroud). For example, a stator vane may have an airfoil shape that is relatively thicker in some areas and relatively thinner in other areas.

In the example aero stator assembly 102, the hub 132 and the thermally conductive vanes 130 are configured to conduct heat away from the control unit 128 during operation. For example, the hub 132 is configured to conduct heat away from the control unit 128, and the thermally conductive vanes 130 are configured to conduct heat away from the hub. The hub 132, in this example, defines a central cavity 138 that is configured to receive the control unit 128. The central cavity 138 of the hub 132 also is configured such that, when the control unit 128 is received within the central cavity of the hub, heat-generating elements 140 of the control unit are in thermal communication with the hub. The hub 132, in this example, includes an interior axial wall 142 that circumscribes the control unit 128 residing within the central cavity 138 of the hub. When residing in the central cavity 138 of the hub 132, the heat-generating elements 140 of the control unit are in physical contact with the interior axial wall 142 thereby establishing a thermal coupling between the heat-generating elements and the hub. The hub 132 is constructed of a thermally conductive material, that is, a material having sufficient thermal conduction properties to transfer heat from the heat-generating elements to and through the hub. For example, the hub 132 may be constructed of a metallic material such as aluminum. As such, the hub 132 may be referred to as a thermally conductive hub. As described herein, the thermally conductive vanes 130 of the aero stator assembly 102 likewise are constructed of a thermally conductive material (e.g., aluminum) and are in thermal communication with the hub. The thermally conductive vanes 130, in this example, thus serve the dual purpose of directing and/or guiding the path of the airflow generated by the aero rotor 110 (e.g., reducing swirling of the airflow, straightening the airflow, etc.) and dissipating heat generated by the control unit 128. During operation of the air-moving device 100, the heat generated by the heat-generating elements 140 of the control unit 128 is transferred, in this example, to the hub 132 via the interior axial wall 142 and through the body of the hub to the thermally conductive vanes 130 positioned in the airflow path, which cools the thermally conductive vanes. The interior axial wall 142 of the hub 132, in this example, includes recesses 144 (pockets) that are sized and shaped to match the heat-generating elements 140 of the control unit. The recesses 144 of the hub 132 may receive the heat-generating elements 140 of the control unit 128 when the control unit resides in the central cavity 138 of the hub. The recesses 144 may increase the surface area of the interior axial wall 142 that is in thermal communication with the heat-generating elements 140 of the control unit, which may further facilitate heat transfer between the control unit and the hub.

In the example aero stator assembly 102, the electrically conductive stator vanes 104 are configured to conduct at least one of electrical power or electrical control signaling. The received electrical power may be provided to the motor of an air-moving device via the control unit 128 (e.g., by converting received DC power to AC power as described further below). The control unit 128 may be configured to control the motor of the air moving device based on the received electrical control signaling. The electrically conductive stator vanes 104, in this example, include electrical attachment lugs 146a and 146b for attaching electrical wiring (e.g., electrical leads, lead wiring) that delivers power and/or control signals to the control unit 128. The electrical attachment lugs 146a and 146b also may be referred to as electrical couplings. For convenience, only some of the electrical attachment lugs 146a and 146b are labeled with a reference number in FIG. 2. The electrical attachment lugs 146a and 146b, in this example, are located on opposite ends of an electrically conductive stator vane. The attachment lugs 146a, in this example, are disposed within the central cavity 138 of the hub 132 extend inwardly away from the rim 133 of the hub. The attachment lugs 146b, in this example, are disposed on an exterior side of the structural shroud 134 and extend outwardly away from the structural shroud. The electrically conductive stator vanes 104 connect to the control unit 128, in this example, via internal electrical attachment lugs 146a disposed within the central cavity 138 of the hub 132. The interior axial wall 142 of the hub 132, in this example, thus includes respective apertures (not shown in FIG. 2) that allow passage of the internal electrical attachment lugs 146a into the central cavity 138. The electrically conductive stator vanes 104 connect to a power source and/or a control signal source, in this example, via external electrical attachment lugs 146b. The structural shroud 134, in this example, thus include counterpart apertures (not shown in FIG. 2) that allow passage of the external electrical attachment lugs 146b through the structural shroud. The electrically conductive stator vanes 104, in this example, are electrically isolated (insulated) from the hub 132 and the structural shroud 134. The aero stator assembly 102, in this example, includes insulators 148a and 148b to electrically isolate the electrically conductive stator vanes 104. An interior insulator 148a is positioned, in this example, around an internal electrical attachment lug 146a to electrically isolate an electrically conductive stator vane 104 from the hub. An exterior insulator 148*b* is positioned, in this example, around an external electrical attachment lug 146*b* to electrically isolate an electrically conductive stator vane 104 from the structural shroud 134. For convenience, only some of the insulators 148*a* and 148*b* have been labeled with a reference number in FIG. 2.

An aero stator assembly may include multiple electrically conductive stator vanes. In some examples, an aero stator assembly may include at least two electrically conductive stator vanes. In some examples, the two electrically conductive stator vanes may respectively conduct direct current (DC) having different polarities. For example, one electrically conductive stator vane may conduct a positive direct current signal, and another electrically conductive stator vane may conduct a negative direct current signal. In some examples, one or more electrically conductive stator vanes may conduct alternating current (AC). One or more electrically conductive stator vanes may conduct control signals to the control unit. The control signals may be pulse-width modulated (PWM) signals. Control signals may be provided to the control unit using a serial communication standard/protocol. For example, a controller area network (CAN) may be used to provide the control signals to the control unit via one or more electrically conductive stator vanes. One or more electrically conductive stator vanes may conduct the CAN bus control signals to the control unit. For example, one electrically conductive stator vane may conduct a high CAN bus control signal, and another electrically conductive stator vane may conduct a low CAN bus control signal. In some examples, an aero stator assembly may include at least three electrically conductive stator vanes, for example, one electrically conductive stator vane that conducts a low DC signal, one electrically conductive stator vane that conducts a high DC signal, and one electrically conductive stator vane that conducts a PWM control signal. In some examples, an aero stator assembly may include at least four electrically conductive stator vanes, for example, one electrically conductive stator vane that conducts a low DC signal, one electrically conductive stator vane that conducts a high DC signal, one electrically conductive stator vane that conducts a low CAN bus signal, and one electrically conductive stator vane that conducts a high CAN bus signal. In some examples, an aero stator assembly may include a electrically conductive stator vane that provides a separate ground for the motor of an air-moving device. In some examples, an aero stator assembly may include at least five electrically conductive stator vanes, for example, two electrically conductive stator vanes that conduct DC power, two electrically conductive stator vanes that conduct CAN bus protocol communications, and one electrically conductive stator vane for thermistor sensing. In some examples, as described herein, an aero stator assembly may include a quantity of electrically conductive stator vanes in the range of about 3-6 electrically conductive stator vanes. In some examples, an aero stator assembly may include more electrically conductive stator vanes. In some examples, an aero stator assembly may include one or more electrically conductive stator vane sectors each having multiple (e.g., three) electrically conductive stator vanes that conduct power and/or control signals. For example, a motor of an aero stator assembly may be powered using three-phase AC power, and the aero stator assembly may include three electrically conductive stator vane sectors that conduct a respective one of the phases. The power signals, in this example, may be divided and distributed across the three electrically conductive stator vane sectors with each receiving one third of the power for a respective phase. In some examples, an electrically conductive stator vane assembly may receive AC current in the range of about 20-60 amps during operation. In some examples, an electrically conductive stator vane sector may receive AC current of up to about 20 amps during operation.

The example aero stator assembly 102 includes four electrically conductive stator vanes 104. The electrically conductive stator vanes 104, in this example, are unevenly spaced apart around the circumference of the aero stator assembly 102. That is, in this example, the aero stator assembly 102 includes different quantities of intervening thermally conductive vanes 130 between respective electrically conductive stator vanes 104 (e.g., six or ten intervening thermally conductive vanes). In some examples, the electrically conductive stator vanes of an aero stator assembly may be evenly spaced apart around the circumference of the aero stator assembly with the same quantity of intervening thermally conductive vanes between the electrically conductive stator vanes. In some examples, one or more electrically conductive stator vanes may be located adjacent to one another with no intervening thermally conductive vane. The electrically conductive stator vanes 104, in this example, include two pairs of diametrically opposed electrically conductive stator vanes: a first pair with one electrically conductive stator vane located in a top-right quadrant of the aero stator assembly 102 and another diametrically opposed electrically conductive stator vane located in a bottom-left quadrant of the aero stator assembly, and a second pair with one electrically conductive stator vane located in a top-left quadrant of the aero stator assembly and another diametrically opposed electrically conductive stator vane located in a bottom-right quadrant of the aero stator assembly. The quantity and location of the electrically conductive stator vanes of an aero stator assembly may depend on a particular implementation of an air-moving device. For example, the quantity and location of the electrically conductive stator vanes may be based on one or more of the type and/or configuration of the control unit of the air-moving device (e.g., an ESC), the type and/or configuration of the motor of the air moving device, the type and/or configuration of any ducting and/or bulkheads that surround and/or are proximate to the aero stator assembly, case of installation, case of maintenance and/or repair, case of replacement, and the like.

A control unit of an aero stator assembly as described herein may be have a size and a shape that facilitates insertion and receipt within the central cavity of the aero stator assembly and that facilitates thermal communication between the heat-generating elements of the control unit and a thermally-conductive surface of the aero stator assembly. In some examples, the shape of the central cavity of a hub of an aero stator assembly may match (e.g., be substantially the same as) the overall shape of a control unit. The central cavity 138 of the hub 132 of the aero stator assembly 102, in this example, has a generally circular shape. The control unit 128, in this example, thus also has a generally circular shape that allows it to be inserted into and received within the central cavity 138 with the heat-generating elements 140 being in thermal communication with the interior axial wall 142 of the hub 132. The control unit 128, in this example, includes a substrate 150 (e.g., a printed circuit board, PCB) that supports the heat-generating elements 140 and other control circuitry. The heat-generating elements 140 of the control unit 128, in this example, are radially positioned around the perimeter 152 of the substrate 150. When the control unit 128 is inserted into and received within the central cavity 138, each heat-generating element 140 is received within a respective one of the recesses 144 formed in the interior axial wall 142 of the hub 132. In some examples, heat-generating elements of a control unit may be coupled to a surface of an aero stator assembly. For example, heat-generating elements of the control unit may be bonded or fastened to an interior surface (e.g., an interior axial wall like the interior axial wall 142 of the example aero stator assembly 102). A thermal bonding glue or a thermal bonding paste may be used to bond the heat-generating elements to the interior surface of the aero stator assembly. Mechanical hardware such as screws or bolts may be used to fasten the heat-generating elements to the interior surface of the aero stator assembly. The heat-generating elements 140 may include one or more metal-oxide-semiconductor field-effect transistors (MOSFETs), capacitors, and the like. In some examples, a control unit may include power circuitry as well. For example, a control unit such as an ESC may include one or more power inverters that convert DC power (e.g., received via the electrically conductive stator vanes) to AC power that is delivered to the motor. This arrangement of a control unit with one or more power converters integrated into an aero stator assembly with electrically conductive stator vanes, as shown in FIG. 1 and FIG. 2 for example, enables DC power to be delivered to the power converters and AC power to be delivered to the motor via motor wiring through a hollow fastener eliminates any need for a separate strut to support motor wiring to the motor, which might be used in arrangements that locate the control unit elsewhere in an air-moving device (e.g., where power transfer occurs from behind the motor). The control unit 128, in this example, thus includes a central aperture 154 that allows passage of the fastening collar 116 and drive shaft 118 (FIG. 1) through the control unit. The hub 132 of the example aero stator assembly 102, in this example, includes a similar central aperture 156 (e.g., in a forward face of the hub) that allows passage of the fastening collar 116 and drive shaft 118 for engagement with the drive shaft bearing 136.

As described above, an aero stator assembly may include a structural shroud that circumscribes the stator vanes of an aero stator assembly. As seen in FIG. 1 and FIG. 2, the structural shroud 134, in this example, has a ring shape and thus also may be referred to as a structural ring in some examples. The structural shroud 134 of the example aero stator assembly 102 includes an aft radial flange 157, a forward radial flange 158, and a web 160 that axially extends between the forward and aft radial flanges. The aft radial flange 157 and the forward radial flange 158 each include mounting apertures for mounting the example aero stator assembly 102 to other components (e.g., ducting, bulkheads) of the air-moving device 100. As described above, the structural shroud 134, in this example, includes apertures in the web 160 that allow passage of respective ones of the electrically conductive stator vanes 104.

In FIG. 3, an example electrically conductive stator vane 104 is shown. As described above, the example electrically conductive stator vane 104 includes electrical attachment lugs 146a and 146b. A vane 162 extends between the electrical attachment lugs 146a and 146b. The region of the blade near (proximate) to the attachment lug 146a and closer to the center of the aero stator assembly 102 may be referred to as the root 164 of the stator vane. The region of the blade near (proximate) to the attachment lug 146b and closer to the outer perimeter of the aero stator assembly 102 may be referred to as the tip 166 of the stator vane. The vane 162 may exhibit, for example, an airfoil shape and thus may be referred to as an airfoil in some examples. As also described above, insulators 148a and 148b may be positioned respectively around the root 164 and tip 166 of the vane 162 to electrically isolate the electrically conductive stator vane from other components of the aero stator assembly 102 (e.g., the thermally conductive vanes 130, the structural shroud 134). In some examples, a stator vane may be rendered electrically conductive via wiring that extends through the stator vane (e.g., copper wiring, brass wiring). For example, the example electrically conductive stator vane 104 includes wiring 168 that extends through the vane 162 between the attachment lugs 146a and 146b. In some examples, a stator vane may be rendered electrically conductive based on the material used to construct the stator vane. For example, in some examples the stator vane may be constructed of an electrically conductive material such as metal (e.g., aluminum, steel, titanium, nickel, etc.). In some examples, an electrically conductive stator vane may be constructed of a non-conductive material (e.g., carbon fiber) with wiring (e.g., copper wiring) embedded in the material as described herein.

FIG. 4 shows a cross-sectional view of components of the example air-moving device 100 in an assembled configuration. As seen in FIG. 4 and described herein, the control unit 128 is integrated into the aero stator assembly 102 with the aero stator assembly being positioned forward (in front) of the motor 170 and aft (behind) of the aero rotor 110 of the air-moving device 100. During operation, the aero rotor 110 generates an airflow 172 that passes through the aero stator assembly 102. As described herein, the airflow 172 across the thermally conductive vanes 130 facilitates dissipation of the heat transferred from the heat-generating elements of the control unit 128 to the thermally conductive vanes. As also described herein, by positioning the aero stator assembly 102 forward of the motor 170, the thermally conductive vanes 130 receive the airflow 172 ("clean" air) before that air is warmed ("dirty" air) as a result of passing over the motor. As also seen in FIG. 4 and as described herein, the fastening collar 116 and drive shaft 118 extend through respective central apertures of the control unit 128 and hub 132 to couple to the aero rotor 110. The motor 170 may be contained in its own housing 174 (e.g., ducting, bulkhead). The hub 132 of the aero stator assembly 102 may be mounted to the forward end of the motor housing 174. The motor end plate 124 may be mounted to the aft end of the motor housing 174. The tail cone 126 may be mounted to the motor end plate 124. The motor housing 174 may be configured to dissipate heat from the motor (e.g., via radial fins that similarly function as a heat sink).

Figure 5B:
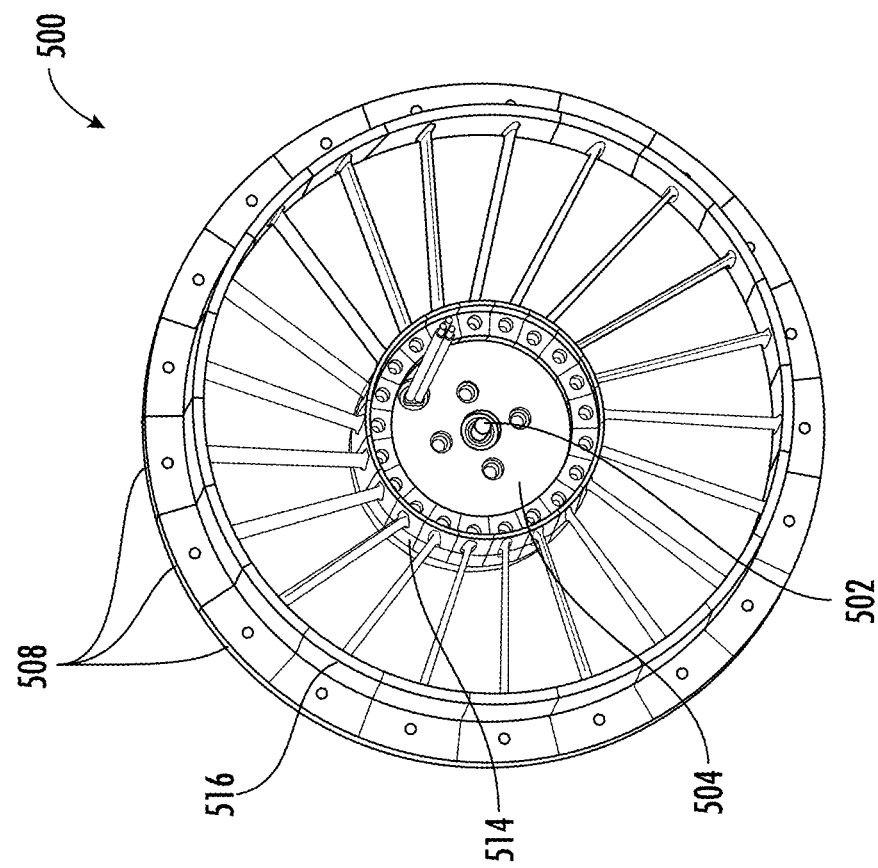
FIGS. 5A-B depict respective front and back perspective views of an example of an aero stator assembly in accordance with aspects of the present disclosure.
Figure 5A:
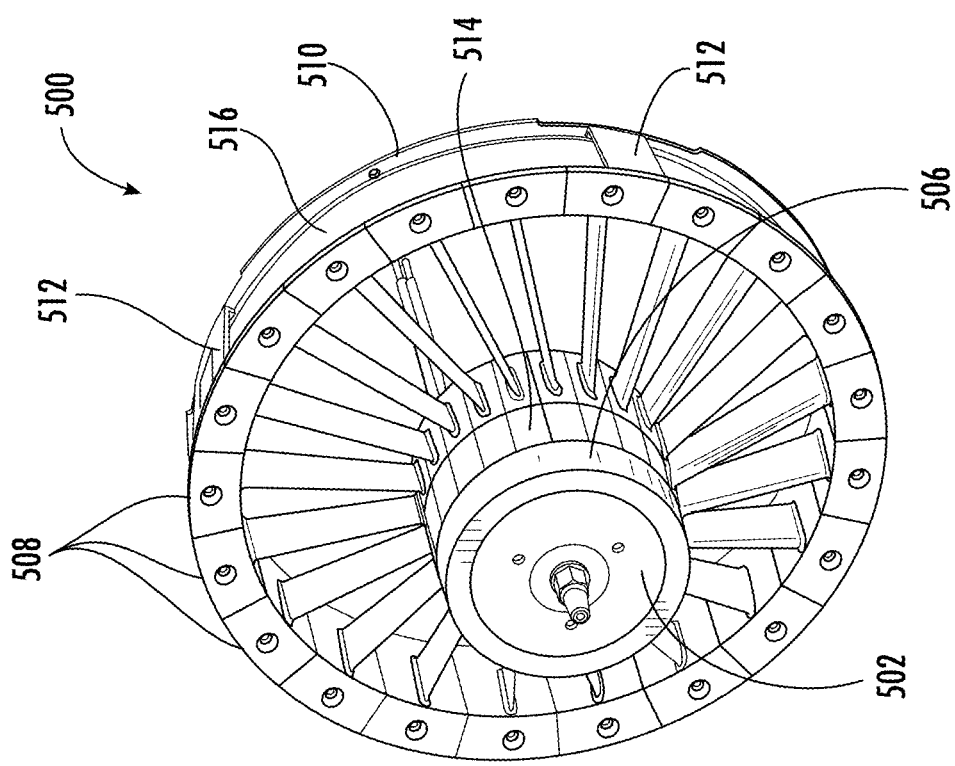
Figure 5D:
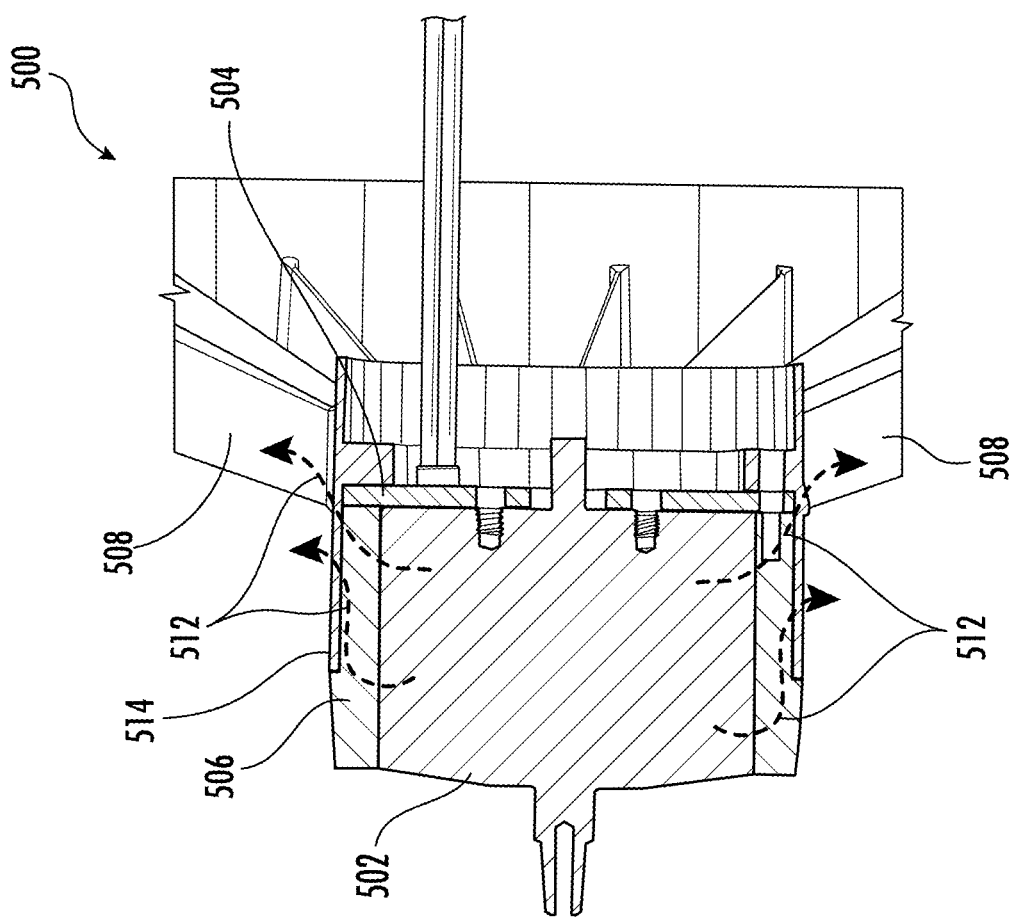
FIG. 5D depicts a side cross-sectional view of the example aero stator assembly of FIGS. 5A-B in accordance with aspects of the present disclosure.
Figure 5C:
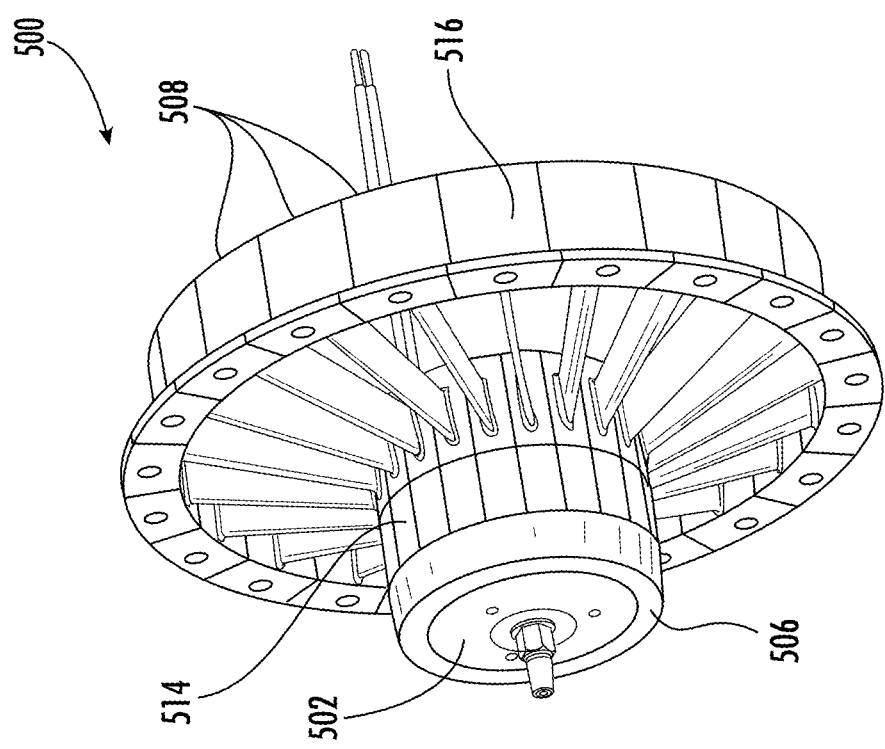
FIG. 5C depicts a side perspective view of the example aero stator assembly of FIGS. 5A-B in accordance with aspects of the present disclosure.

Turning now to FIGS. 5A-D, an example of another aero stator assembly 500 is shown. The aero stator assembly 500 shown in FIG. 5 differs from the aero stator assembly 102 shown in FIG. 2 in that the aero stator assembly 500 includes an integrated motor 502 rather than an integrated control unit. FIGS. 5A-B depict respective front and back perspective views of the example aero stator assembly 500. FIG. 5C depicts a side perspective view of the example aero stator assembly 500. FIG. 5D depicts a side cross-sectional view of the example aero stator assembly 500. As seen in FIGS. 5A-C, the aero stator assembly 500, in this example, includes an integrated motor 502, a motor mounting plate 504, a motor thermal transfer sleeve 506, thermally conductive vanes 508, a structural shroud 510 (omitted in FIGS. 5B-C), and structural ribs 512. As also seen in FIGS. 5A-B and described further below, in an assembled configuration, the example aero stator assembly 500 includes an inner axial ring 514 defined by respective lower axial flanges of the thermally conductive vanes 508 and an outer ring 516 defined by respective upper axial flanges of the thermally conductive vanes. The inner axial ring 514, in this example, is sized and shaped to receive the motor 502. The inner axial ring 514 thus may at least partially define the hub of the aero stator assembly 500. Similarly, the motor thermal transfer sleeve 506 is sized and shaped to slide over the forward end of the motor 502 when the motor is received within the inner axial ring 514 of the example aero stator assembly 500. The motor thermal transfer sleeve 506, in this example, is in thermal communication with both the motor 502 and the inner axial ring 514 defined by the lower axial flanges of the thermally conductive vanes 508. The motor 502, therefore, may be said to be in thermal communication with (or in indirect thermal with) the inner axial ring 514 of the aero stator assembly 500 via the motor thermal transfer sleeve and thus also in thermal communication with the thermally conductive aero stator vanes. For example, an outer circumferential surface of a motor may be in thermal communication with an inner circumferential surface of a motor thermal transfer sleeve, and an outer circumferential surface of the motor transfer sleeve may be in thermal communication with an inner circumferential surface of the hub (e.g., an inner circumferential surface defined by an inner axial ring). The motor thermal transfer sleeve 506, in this example, is in thermal communication with the entire outer circumferential surface of the motor 502. In other examples, a motor thermal transfer sleeve may be in thermal communication with less than the entire outer circumferential surface of a motor. In some examples, an aero stator assembly may omit a motor thermal transfer sleeve, and the outer circumferential surface of the motor may be in direct thermal communication with an inner surface of a hub of an aero stator assembly (e.g., an inner surface of an inner axial ring). The motor thermal transfer sleeve 506 and the thermally conductive vanes 508 may be constructed of a thermally conductive material as described herein such that heat generated by the motor 502 is transferred to and through the motor thermal transfer sleeve and then to and through the thermally conductive vanes where it is dissipated. For example, an airflow through the example aero stator assembly 500 during operation of an air-moving device may facilitate the heat dissipation from the thermally conductive vanes. To achieve thermal communication between the motor 502, the motor thermal transfer sleeve 506, and the inner axial ring 514, the inner diameter (ID) of the inner axial ring may be slightly larger than the outer diameter (OD) of the motor thermal transfer sleeve, and the ID of the motor thermal transfer sleeve may be slightly larger than the OD of the motor (e.g., about 0.25 mm larger). As also described further below, the structural shroud 510, in this example, circumscribes the thermally conductive vanes 508, and structural ribs 512 extend between radial flanges of the structural shroud. The structural ribs 512, in this example, may support additional components of the example aero stator assembly 500 (e.g., inner or outer mold line skin, IML or OML). In some examples, the structural ribs may be omitted from an aero stator assembly. As seen in FIG. 5B, the motor mounting plate 504 mounts to an aft end of the motor 502. FIG. 5D shows a side cross-sectional view of the example aero stator assembly 500 with examples of heat transfer pathways 518 from the motor 502, through the motor thermal transfer sleeve 506, and through the thermally conductive vanes 508 (e.g., the inner axial ring 514 defined by the lower axial flanges of the thermally conductive vanes).

Figure 6:
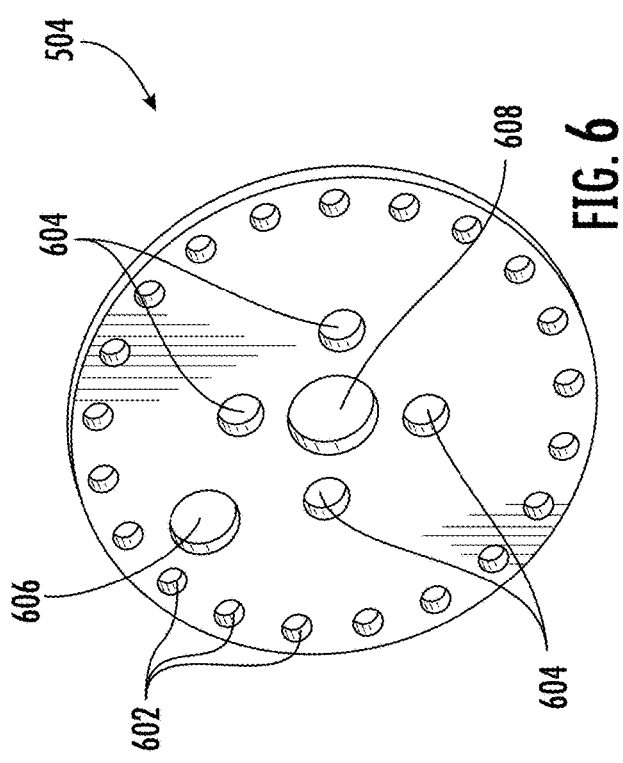
FIG. 6 depicts a perspective view of an example of a motor mounting plate of the example aero stator assembly of FIGS. 5A-D in accordance with aspects of the present disclosure.

FIG. 6 depicts a perspective view of the example motor mounting plate 504. The motor mounting plate 504, in this example, includes stator vane mounting apertures 602, motor mounting apertures 604, a wiring passthrough aperture 606, and a central aperture 608. For convenience, only some of the stator vane mounting apertures 602 have been labeled with a reference number in FIG. 6. The stator vane mounting apertures 602 are circumferentially positioned around an outer perimeter of the motor mounting plate 504 and align with corresponding mounting apertures on the thermally conductive vanes 508. The central aperture 608 may be configured to facilitate an optional encoder feature as described below with reference to FIG. 23. The motor mounting plate 504 may be constructed of a thermally conductive material as described herein to facilitate heat transfer away from the motor 502 and to the thermally conductive vanes 508.

Figure 7:
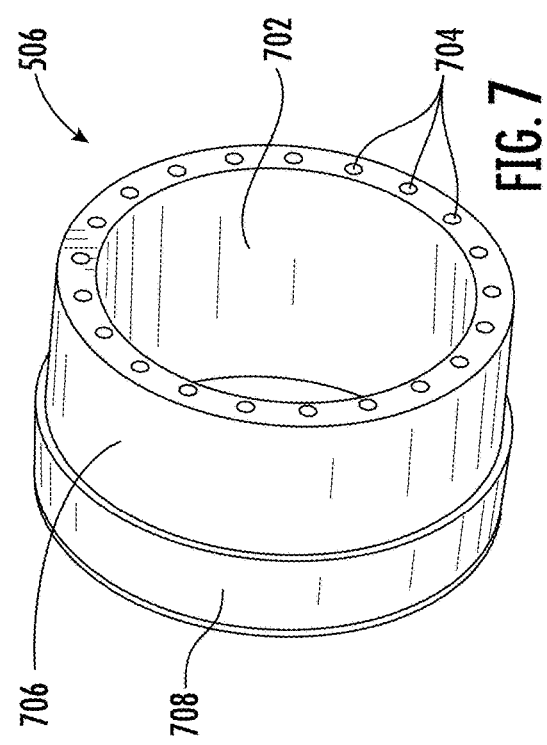
FIG. 7 depicts a perspective view of an example of a motor thermal transfer sleeve of the example aero stator assembly of FIGS. 5A-D in accordance with aspects of the present disclosure.

FIG. 7 depicts a perspective view of the example of the example motor thermal transfer sleeve 506. The motor thermal transfer sleeve 506, in this example, is sized and shaped to fit and slide over the motor 502 as described above. The motor thermal transfer sleeve 506 includes an inner surface 702 that is in thermal communication with the motor 502 when installed (mounted) over the motor as also described above. An aft end of the example motor thermal transfer sleeve 506 includes stator vane mounting holes 704 that align with corresponding mounting apertures of the thermally conductive vanes 508 and corresponding stator vane mounting apertures 602 of the motor mounting plate 504. Mechanical fasteners such as bolts (e.g., countersunk bolts), screws, and the like may be used to mount the motor mounting plate 504 to the thermally conductive vanes 508 and the thermal transfer sleeve 506 via the stator vane mounting apertures 602 and stator vane mounting holes 704 as seen, for example, in FIG. 5D. To accommodate the inner axial ring 514 defined by the lower axial flanges of the stator vanes 508, the aft end 706 of the motor thermal transfer sleeve has an OD that is smaller than the OD of a forward end 708 of the motor transfer sleeve. As seen in FIGS. 5A-D, for example, the inner ring 514 axially extends across the aft end 706 of the motor thermal sleeve 506.

Figure 8:
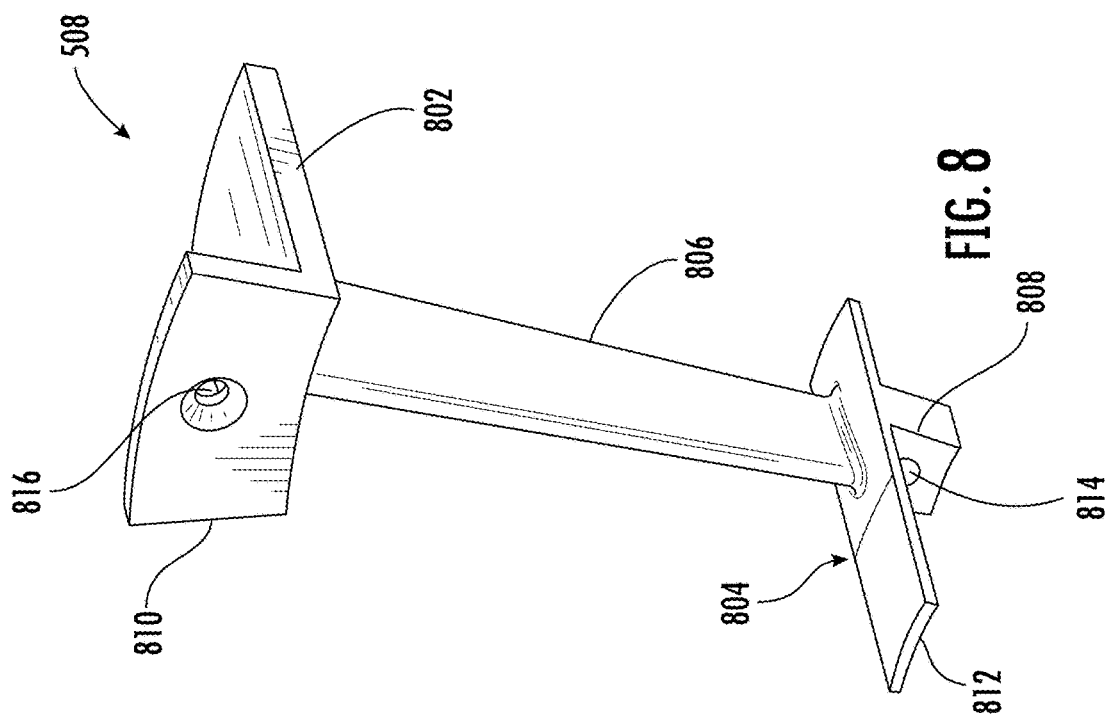
FIG. 8 depicts a perspective view of an example of a stator vane of the example aero stator assembly of FIGS. 5A-D in accordance with aspects of the present disclosure.

FIG. 8 depicts a perspective view of one of the example thermally conductive vanes 508. The thermally conductive vane 508, in this example, includes an upper axial flange 802, a lower axial flange 804, a blade 806 radially extending between the lower and upper axial flanges, an attachment lug 808 radially extending from the lower axial flange, and a radial flange 810 radially extending from a forward end of the upper axial flange 802. The upper axial flange 802, in this example, axially extends away from the forward and aft ends of the blade 806 in respective forward and aftward directions. The lower axial flange 804, in this example, likewise axially extends away from the forward and aft ends of the blade 806 in respective forward and aftward directions. The example lower axial flange 804 includes a forward end 812 that axially extends further away from a forward end of the blade 806 in a forward direction. The forward end 812 of the lower axial flange 804 defines the inner axial ring 514 (FIGS. 5A-D) of the example aero stator assembly 500 in its assembled configuration where it is in thermal communication with the aft end 706 of the motor thermal transfer sleeve 506. The blade 806, in this example, may be an airfoil as described herein and configured to direct and/or guide the airflow generated by an aero rotor. The attachment lug 808, in this example, includes a mounting aperture 814 used to mount the thermally conductive vane 508 to the motor thermal transfer sleeve 506 via the stator vane mounting holes 704 and to the motor mounting plate 504 via the stator vane mounting apertures 602. The radial flange 810 of the upper axial flange 802 includes a mounting aperture 816 for mounting the example thermally conductive vane 508 to the structural shroud 510 (FIG. 5A) of the example aero stator assembly 500.

FIG. 9A depicts a front perspective view of the example structural shroud 510. FIG. 9B depicts a side view of the example structural shroud 510. As described above, the structural shroud 510, circumscribes and mounts to the thermally conductive vanes 508 of the aero stator assembly 500 in its assembled configuration. For example, the example structural shroud 510 is sized and shaped to fit and slide over the respective upper axial flanges 802 of the thermally conductive vanes 508 as seen, for example, in FIG. 5A. The structural shroud 510, in this example, includes a forward radial flange 902, an aft radial flange 904, a web 906 that extends between the forward and aft radial flanges, and a mounting lug 908. The forward radial flange 902, in this example, includes stator vane mounting apertures 910. Each of the example mounting apertures 910 corresponds to and aligns with a respective mounting aperture 816 on the radial flange 810 of one of the thermally conductive vanes 508. Mechanical fasteners such as bolts (e.g., countersunk bolts), screws, and the like may be used to mount the structural shroud 510 to the thermally conductive vanes 508. The web 906, in this example, includes at least one wiring passthrough aperture 909 that allows passage of electrical wiring from an external side of the structural shroud 510 to an internal side of the structural shroud. The electrical wiring may be, for example, wiring that provides power and/or control signals to the motor 502 integrated in the aero stator assembly 500. The web of a structural shroud may have one or more wiring passthrough holes. The mounting lug 908 of the structural shroud 510, in this example, is configured to mount the example aero stator assembly 500 to another component of an air moving device (e.g., a pylon, housing such as ducting or a bulkhead, and the like). As described above, the ribs 512, in this example, may support additional components of the example aero stator assembly 500 (e.g., inner or outer mold line skin). A close-up view of one of the example ribs 512 is shown in FIG. 10. As seen in FIG. 10, the rib 512, in this example, includes radial flanges 1002 that respectively abut the forward radial flange 902 and the aft radial flange 904 of the structural shroud 510.

Figure 11A:
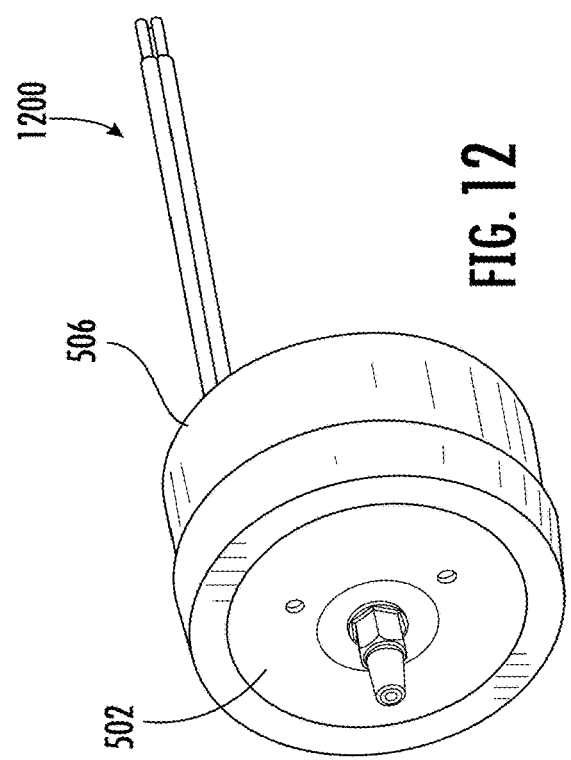
FIGS. 11A-B depict respective front and back perspective views of an assembly of the example motor mounting plate of FIG. 6 with an example motor in accordance with aspects of the present disclosure.
Figure 12:
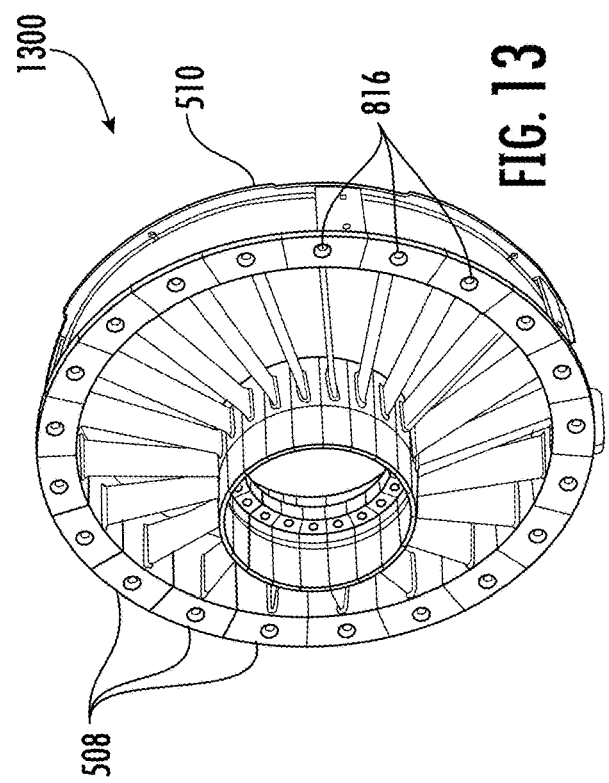
FIG. 12 depicts a perspective view of an assembly of the example motor thermal transfer sleeve of FIG. 7 with the example motor of FIGS. 11A-B in accordance with aspects of the present disclosure.
Figure 11B:
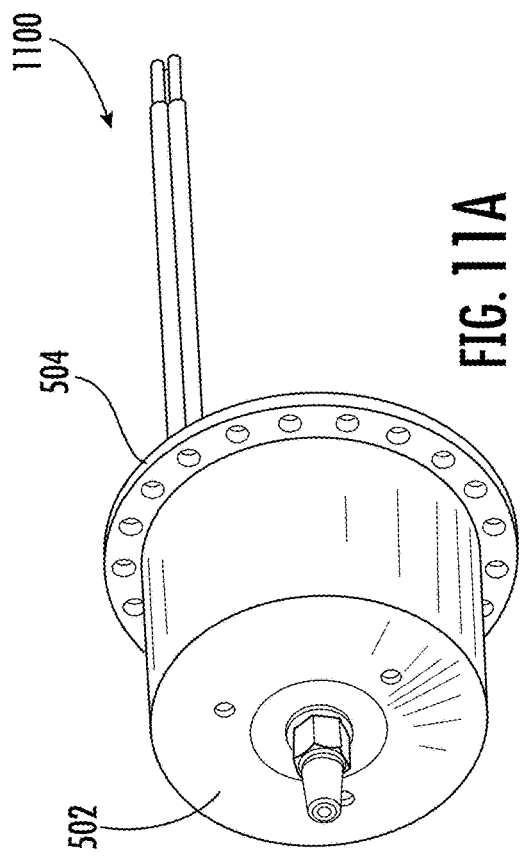
Figure 13:
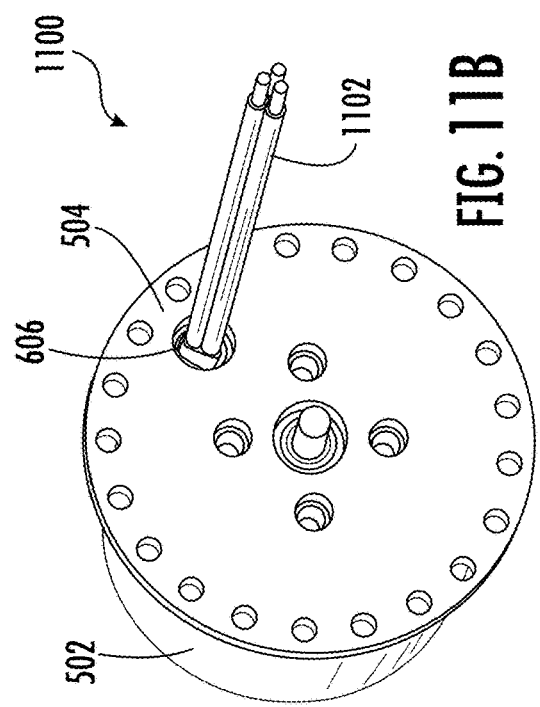
FIG. 13 depicts an example of an assembly of the example structural shroud of FIGS. 9A-B with the example stator vanes of FIG. 8 in accordance with aspects of the present disclosure.

FIGS. 11A-B depict respective front and back perspective views of an assembly 1100 of the example motor mounting plate 504 with the example motor 502. As seen in FIGS. 11A-B, the motor mounting plate 504 is flush against the aft end of the motor 502, with the motor wiring 1102 extending through the motor passthrough hole 606. FIG. 12 depicts a perspective view of an assembly 1200 of the example motor thermal transfer sleeve 506 with the example motor 502. As seen in FIG. 12, the motor thermal transfer sleeve 506 slides over the motor 502. FIG. 13 depicts an example of an assembly 1300 of the example structural shroud 510 with the example thermally conductive vanes 508. As seen in FIG. 13, the structural shroud slides over the thermally conductive vanes 508, in particular the upper axial flanges 802 (FIG. 8) of the thermally conductive vanes as described herein. Each of the stator vane mounting apertures 910 (FIG. 9) of the structural shroud 510 aligns with a respective one of the mounting apertures 816 of the thermally conductive vanes for mounting the structural shroud to the thermally conductive vane.

Figure 14:
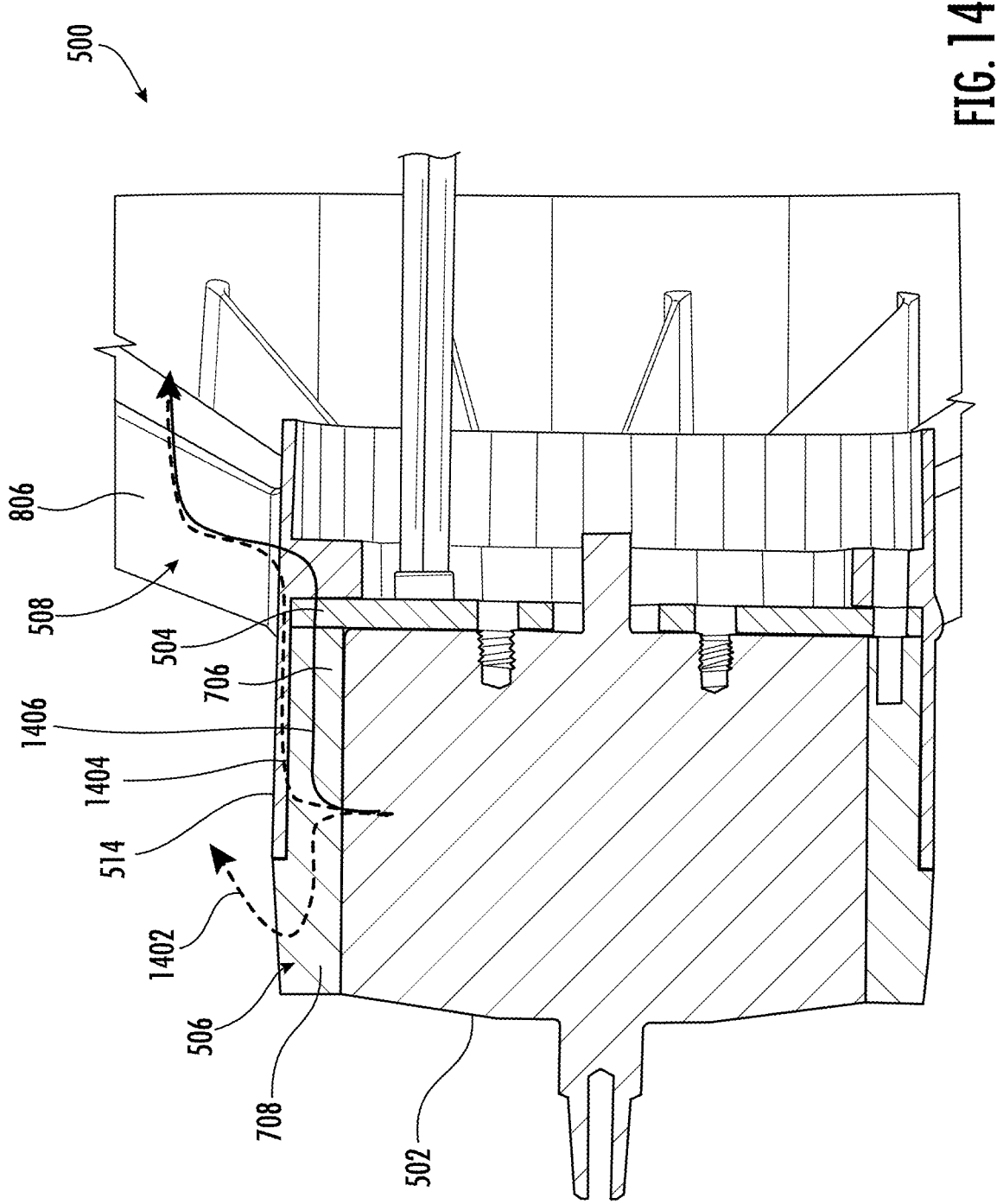
FIG. 14 depicts a side cross-sectional view of the example aero stator assembly of FIGS. 5A-D with examples of thermal transfer pathways through the example aero stator assembly in accordance with aspects of the present disclosure.

FIG. 14 depicts another side-cross sectional view of the example aero stator assembly with additional examples of thermal transfer pathways through the aero stator assembly shown. The thermal pathways shown in FIG. 14 include, for example, a thermal transfer pathway 1402 from the motor 502 through the forward end 708 of the motor thermal transfer sleeve 506; a thermal transfer pathway 1404 from the motor through the aft end 706 of the motor thermal transfer sleeve, through the inner axial ring 514 defined by the thermally conductive vanes 508, and through a blade 806 of one of the thermally conductive vanes; and a thermal transfer pathway 1406 from the motor through the aft end of the motor thermal transfer sleeve and through the motor mounting plate mounted to the aft end of the motor.

Figure 15:
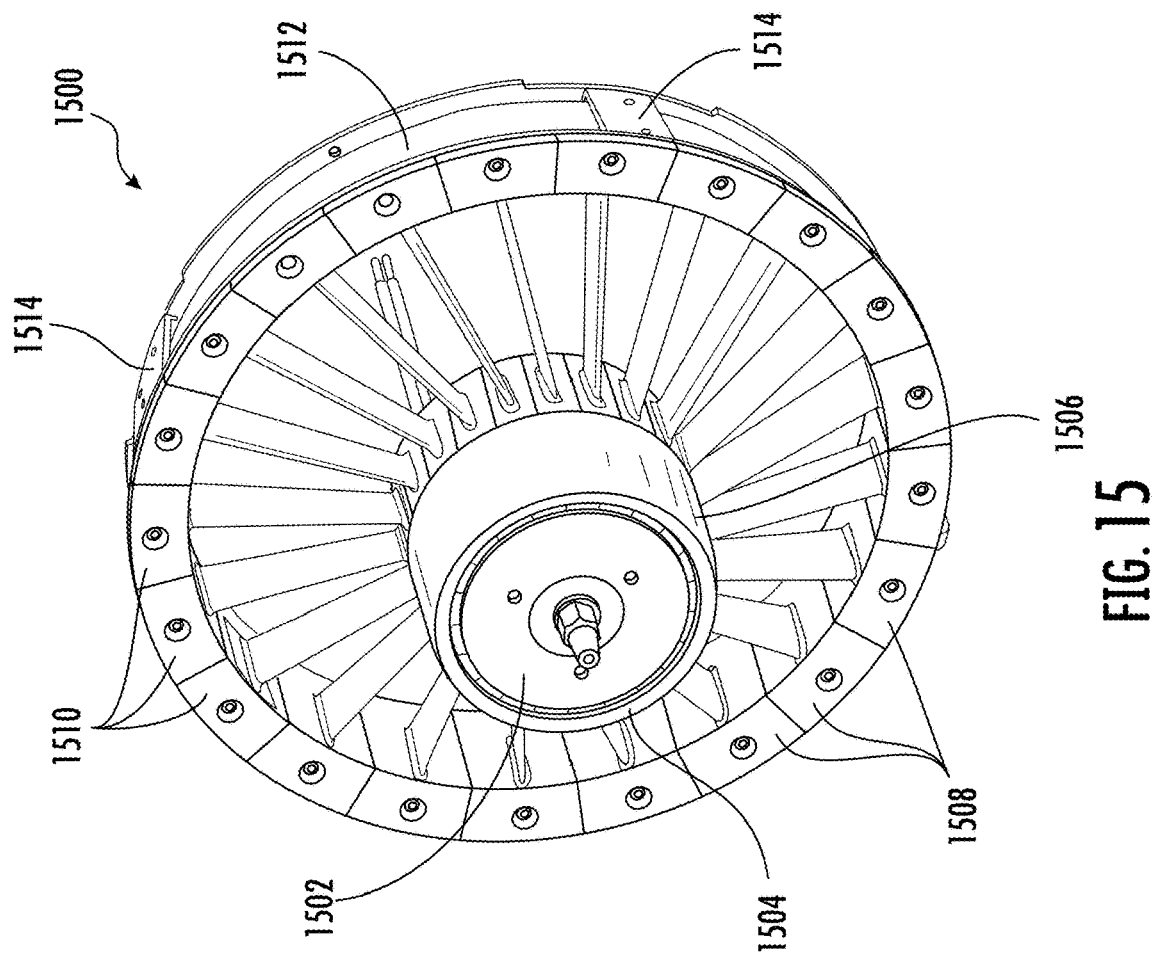
FIG. 15 depicts a front perspective view of another example of an aero stator assembly in accordance with aspects of the present disclosure in accordance with aspects of the present disclosure.

FIG. 15 depicts a front perspective view of another example of an aero stator assembly 1500. The example aero stator assembly 1500 shown in FIG. 15 includes components similar to components of the example aero stator assembly 500 discussed above and likewise includes an integrated motor 1502. The stator assembly 1500, in this example, is both thermally conductive and electrically conductive. The aero stator assembly 1500, in this example, thus includes a motor thermal transfer sleeve 1504, a motor fairing 1506, thermally conductive vanes 1508 that are thermally conductive as described herein, electrically conductive stator vanes 1510, a structural shroud 1512, and ribs 1514 for supporting additional structures of an air-moving device (e.g., IML, OML). The motor thermal transfer sleeve 1504, in this example, similarly slides over the motor 1502. The motor fairing 1506, in this example, slides over the motor thermal transfer sleeve 1504. The aero stator assembly 1500, in this example, includes three electrically conductive stator vanes 1510 that are positioned adjacent to each other. In other examples, an aero stator assembly may include more or fewer electrically conductive stator vanes that are not positioned adjacent to one another as described herein (e.g., with one or more intervening thermally conductive vanes positioned between the electrically conductive stator vanes). In some examples, a motor fairing may have a thickness about 1 mm. In some examples, a motor fairing may be manufactured via 3D printing, injection molding, and the like.

Figure 16:
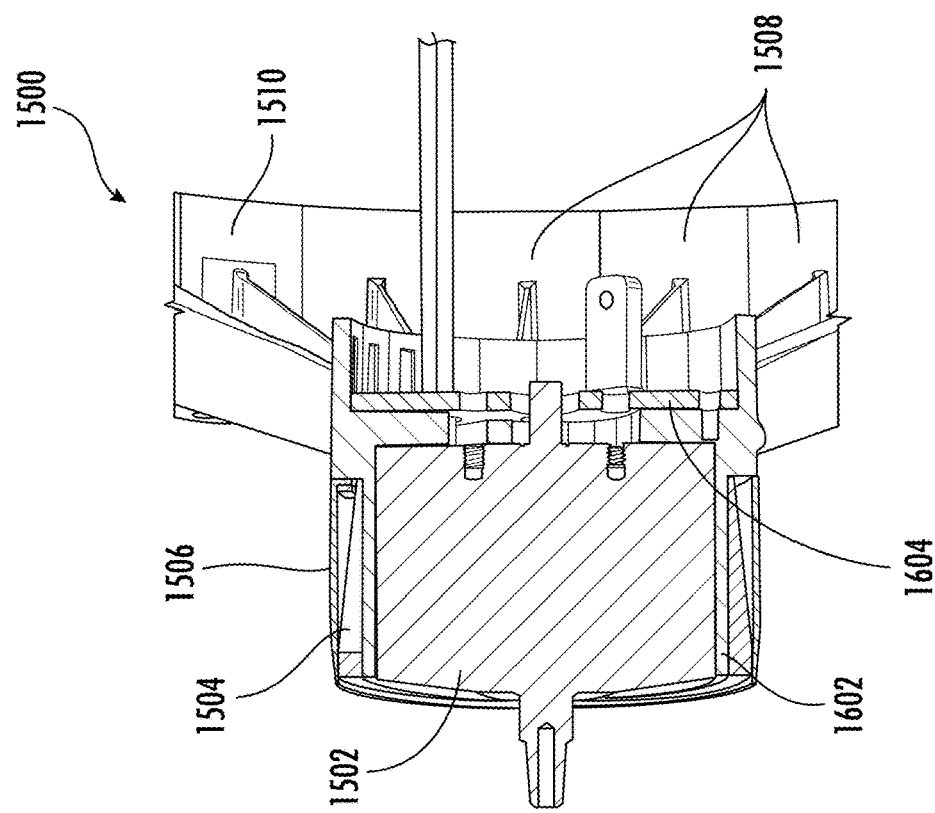
FIG. 16 depicts a side cross-sectional view of the example aero stator assembly of FIG. 15 in accordance with aspects of the present disclosure.

FIG. 16 depicts a side cross-sectional view of the example aero stator assembly 1500. As described further below, the thermally conductive vanes 1508 and the electrically conductive stator vanes 1510 include lower axial flanges that define an inner axial ring 1602 that is sized and shaped to receive the motor 1502. As seen in FIG. 16, the inner axial ring 1602 is in thermal communication with the motor 1502, and the motor thermal transfer sleeve 1504 is in thermal communication with the inner axial ring. The motor thermal transfer sleeve 1504, in this example, also has a tapered profile that tapers from a forward end of the motor thermal transfer sleeve to an aft end of the motor thermal transfer sleeve. As described herein, to achieve thermal communication between the motor 1502, inner axial ring 1602, and motor thermal transfer sleeve 1504, in this example, the ID of the inner axial ring is slightly larger than the OD of the motor and the ID of the motor thermal transfer sleeve is slightly larger than the OD of the inner axial ring (e.g., about 0.25 mm larger). The ID of the motor fairing 1506, in this example, is slightly larger than the maximum OD of the tapered motor thermal transfer sleeve (e.g., about 0.25 mm larger). As also seen in FIG. 16, the aero stator assembly 1500, in this example, also includes a motor mounting plate 1604 that mounts to and is in thermal communication with an aft end of the motor 1502.

Figure 17:
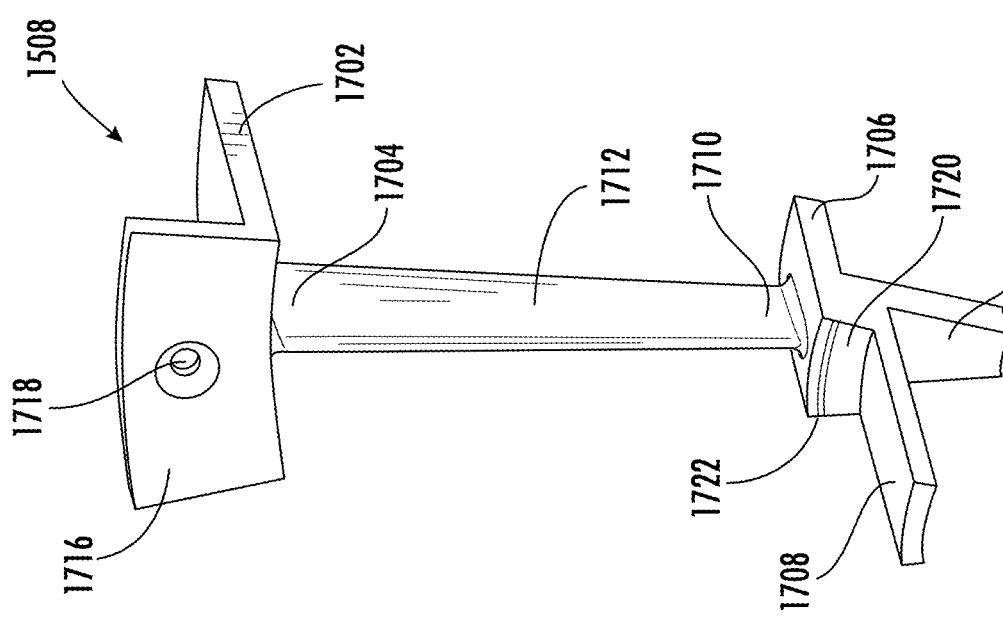
FIG. 17 depicts a perspective view of an example of a stator vane of the example aero stator assembly of FIG. 15 in accordance with aspects of the present disclosure.

FIG. 17 depicts a perspective view of an example of one of the thermally conductive vanes 1508. As described herein, the thermally conductive vane 1508 is thermally conductive and dissipates heat transferred to it from the motor of an air-moving device during operation. The example thermally conductive vane 1508 includes components similar to components of the example thermally conductive vane 508 discussed above. The thermally conductive vane 1508, in this example, includes an upper axial flange 1702 at the tip 1704 of the thermally conductive vane, two lower axial flanges 1706 and 1708 at the root 1710 of the thermally conductive vane, a blade 1712, and an attachment lug 1714 at the root of the thermally conductive vane. The blade 1712 extends between the upper axial flange 1702 and the lower axial flange 1708. The blade 1712 may be, for example, an airfoil as described herein. The upper axial flange 1702 axially extends away from an aft end of the blade 1712 in an aftward direction and includes a radial flange 1716 having a mounting aperture 1718 and radially extending from a forward end of the upper axial flange. The upper axial flange 1702 defines an outer ring of the example aero stator assembly 1500 in its assembled configuration. As described further below, the mounting aperture 1718 aligns with a respective stator vane mounting aperture of the structural shroud 1512 (FIG. 15). The lower axial flanges 1706 and 1708, in this example, are radially offset from each other. The lower axial flange 1706 axially extends away from an aft end of the blade in an aftward direction and the lower axial flange 1708 axially extends away from a forward end of the blade in a forward direction. The lower axial flange 1708 of the thermally conductive vane 1508 defines the inner axial ring 1602 (FIG. 16) of the example aero stator assembly 1500 in its assembled configuration. The thermally conductive vane 1508, in this example, also includes a radial face 1720 extending between the lower axial flanges 1706 and 1708. The radial face 1720, in this example, includes an axial slot 1722 that is sized and shaped to receive the rim of the motor fairing 1506 (FIG. 16) when the example aero stator assembly 1500 is in its assembled configuration. An aft end of the attachment lug 1714, in this example, includes a mounting hole. As described further below, the mounting hole of the attachment lug 1714 aligns with a respective stator vane mounting aperture of the motor mounting plate 1604 (FIG. 16). As seen in FIG. 16, an outer surface of an aft end of the motor 1502 is in thermal communication with an forward surface of the attachment lug 1714. Heat generated by the motor 1502 thus also may be transferred away from the motor toward the thermally conductive stator vanes 1508 via the attachment lugs 1714.

Figure 18A:
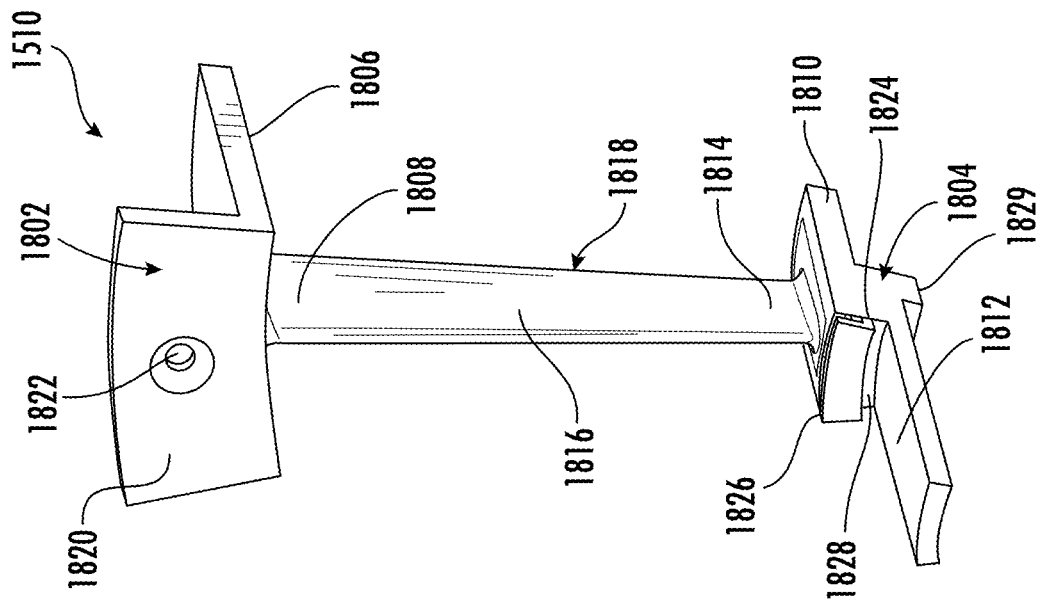
FIG. 18A depicts a perspective view of an example of an electrically conductive stator vane of the example aero stator assembly of FIG. 15 in accordance with aspects of the present disclosure.

FIG. 18A depicts a perspective view of one or the example electrically conductive stator vanes 1510. As described herein, the electrically conductive stator vane conducts power and/or control signals to the motor 1502 integrated in the example aero stator assembly 1500. The electrically conductive stator vane, in this example, is configured to electrically isolate (insulate) the electrically conductive stator vane from other structural and/or electrically conductive stator vanes of the aero stator assembly 1500 as well as the structural shroud 1512. The example electrically conductive stator vane 1510 thus includes an upper insulating portion 1802 and a lower insulating portion 1804. The electrically conductive stator vane 1510, in this example, includes components similar to components of the example thermally conductive vane 1508 discussed above. The upper insulating portion 1802, in this example, includes an upper axial flange 1806 at the tip 1808 of the thermally conductive vane, two lower axial flanges 1810 and 1812 at the root 1814 of the electrically conductive stator vane, and blade 1816. The blade 1816 extends between the upper axial flange 1806 and the lower axial flange 1810. The blade 1816 may be, for example, an airfoil as described herein. The blade 1816 may include, for example, wiring (e.g., copper wiring) that extends through the length of the blade between the upper axial flange 1806 and the lower axial flange 1810. An electrically conductive portion 1818 of the example electrically conductive stator vane thus may include the blade 1816. The upper axial flange 1806 axially extends away from an aft end of the blade 1816 in an aftward direction and includes a radial flange 1820 having a mounting aperture 1822 and radially extending from a forward end of the upper axial flange. The upper axial flange 1806 defines an outer ring of the example aero stator assembly 1500 in its assembled configuration. As described further below, the mounting aperture 1822 aligns with a respective stator vane mounting aperture of the structural shroud 1512 (FIG. 15). The lower axial flanges 1810 and 1812, in this example, are radially offset from each other. The lower axial flange 1810 axially extends away from an aft end of the blade in an aftward direction and the lower axial flange 1812 axially extends away from a forward end of the blade in a forward direction. The lower axial flange 1812 of the electrically conductive stator vane 1510 also defines, in conjunction with the lower axial flanges 1708 of the thermally conductive vanes 1508, the inner axial ring 1602 (FIG. 16) of the example aero stator assembly 1500 in its assembled configuration. The electrically conductive stator vane 1510, in this example, also includes a radial face 1824 extending between the lower axial flanges 1810 and 1812. The radial face 1824, in this example, includes radial slot 1826 that is sized and shaped to receive an attachment tab of the motor fairing 1506 (FIG. 16) and an axial slot 1828 that is sized and shaped to receive the rim of the motor thermal transfer sleeve 1504 (FIG. 16) when the example aero stator assembly 1500 is in its assembled configuration. The electrically conductive stator vane 1510, in this example, likewise includes an attachment lug 1829 with a mounting hole (not shown) on the aft end of the attachment lug that aligns with a respective stator vane mounting aperture of the motor mounting plate 1604 (FIG. 16).

Figure 18C:
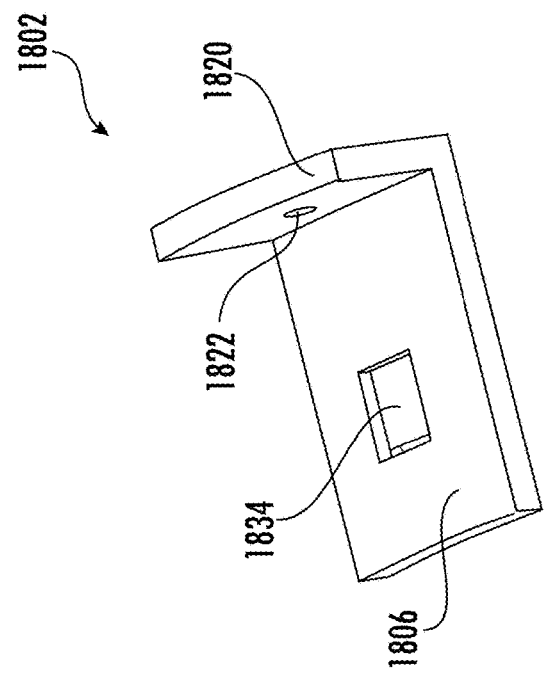
FIG. 18C depicts a perspective view of an example of an insulating portion of the example electrically conductive stator vane of FIG. 18A in accordance with aspects of the present disclosure.
Figure 18D:
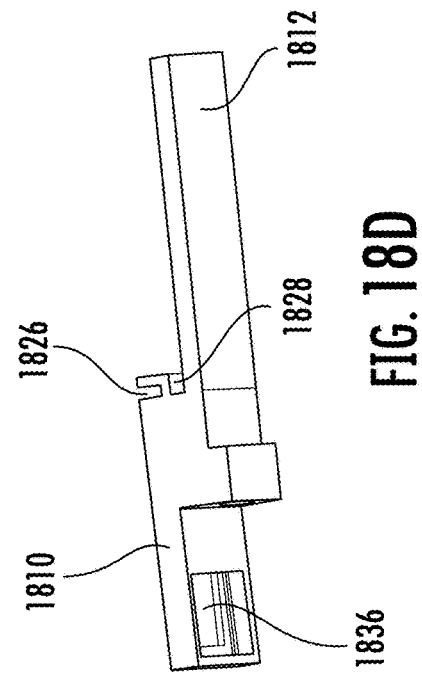
FIG. 18D depicts a perspective view of an example of another insulating portion of the example electrically conductive stator vane of FIG. 18A in accordance with aspects of the present disclosure.
Figure 18B:
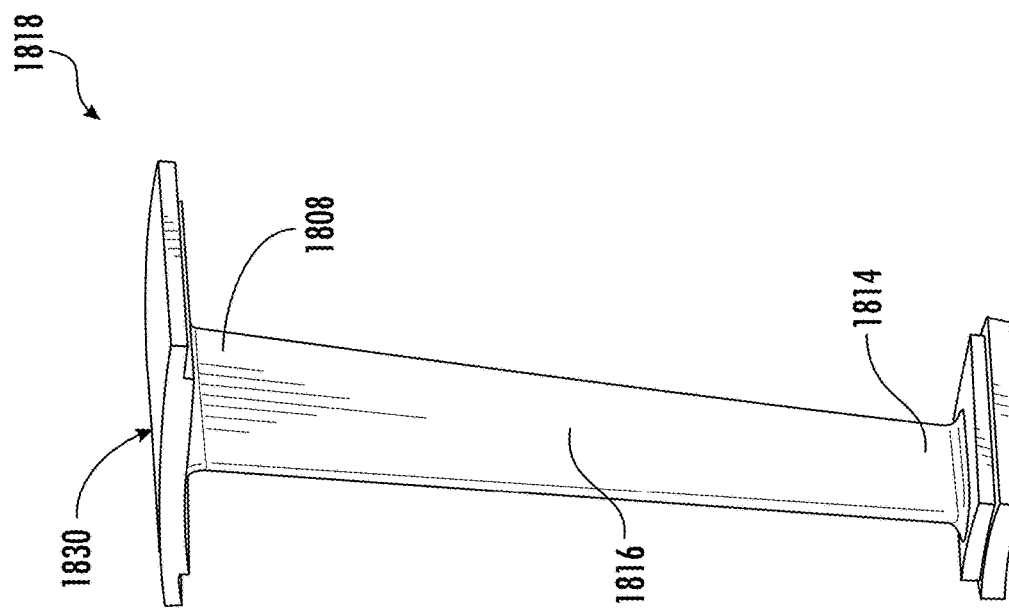
FIG. 18B depicts a perspective view of an example of an electrically conductive portion of the example electrically conductive stator vane of FIG. 18A in accordance with aspects of the present disclosure.

FIG. 18B depicts a perspective view of the electrically conductive portion 1818 of the example electrically conductive stator vane 1510. FIG. 18C depicts a perspective view of the example upper insulating portion 1802 of one of the example electrically conductive stator vanes 1510. FIG. 18D depicts a perspective view of the example lower insulating portion 1804 of the example electrically conductive stator vane 1510. To electrically isolate the electrically conductive portion 1818 of the electrically conductive stator vane 1510, the upper and lower insulating portions 1802 and 1804 may be constructed of a suitable insulating material (e.g., rubber). The insulating material may be suitably flexible to facilitate installation of the electrically conductive portion 1818 in the upper and lower insulating portions 1802 and 1804. As seen in FIG. 18B-D, the electrically conductive portion 1818, in this example, includes an upper flange 1830 that interfaces with a passthrough aperture 1834 of the upper insulating portion 1802 and a lower flange 1832 that interfaces with a passthrough aperture 1836 of the lower insulating portion 1804. The upper and lower flanges 1830 and 1832 and the passthrough apertures 1834 and 1836 may exhibit a stepped configuration to facilitate mounting and retention of the upper and lower flanges in their respective passthrough apertures as well as electrical isolation of the electrically conductive portion 1818. Electrical wiring (e.g., lead wiring), for example, may be attached to the electrically conductive stator vane 1510 at the tip 1808 and the root 1814 of the electrically conductive stator vane via the passthroughs apertures 1834 and 1836. In some examples, upper and lower insulating portions may provide about 1-2 mm of insulation in all directions extending away from passthrough apertures along the upper and lower flanges of an electrically conductive stator vane.

Figure 19:
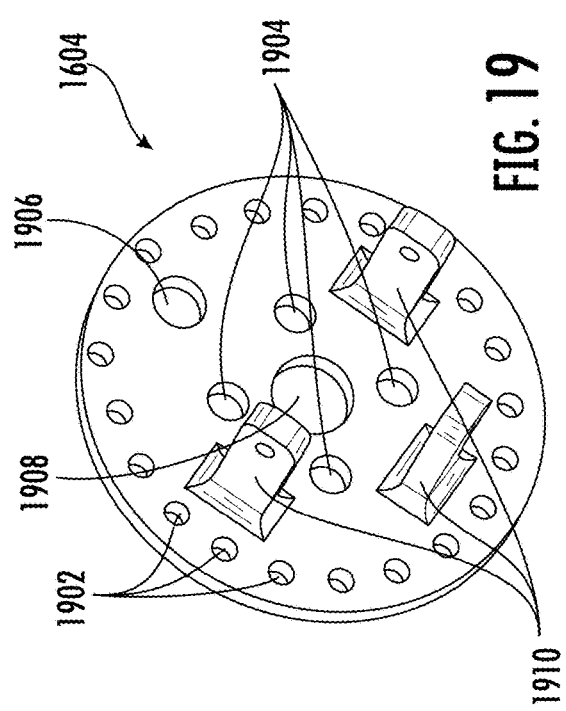
FIG. 19 depicts a rear perspective view of an example of a motor mounting plate of the example aero stator assembly of FIG. 15 in accordance with aspects of the present disclosure.

FIG. 19 depicts a perspective view of the example of motor mounting plate 1604 of the example stator assembly 1500. The example motor mounting plate 1604 includes components similar to components of the example motor mounting plate 504 discussed above. The motor mounting plate 1604, in this example, includes stator vane mounting apertures 1902, motor mounting apertures 1904, a wiring passthrough aperture 1906, and a central aperture 1908. For convenience, only some of the stator vane mounting apertures 1902 have been labeled with a reference number in FIG. 19. The stator vane mounting apertures 1902 are circumferentially positioned around an outer perimeter of the motor mounting plate 1604 and align with corresponding mounting holes on the respective attachment lugs 1714 and 1829 of the thermally conductive vanes 1508 and electrically conductive stator vanes 1510. The central aperture 1908 again may be configured to facilitate an optional encoder feature as described below with reference to FIG. 23. The motor mounting plate 1604 likewise may be constructed of a thermally conductive material as described herein to facilitate heat transfer away from the motor 1502 and to the thermally conductive vanes 1508. The motor mounting plate 1604, in this example, also includes multiple attachment lugs 1910. The attachment lugs 1910, in this example, may be used to mount a tail cone to the example aero stator assembly 1500. The motor mounting plate 1604, in this example, includes three attachment lugs 1910. In other examples, a motor mounting plate may include more or fewer attachment lugs. As described in further detail below with reference to FIG. 23, the attachment lugs of a motor mounting plate (e.g., the attachment lugs 1910) may be configured to also mount an encoder mounting bracket to facilitate an optional encoder feature. Mechanical fasteners such as bolts (e.g., countersunk bolts), screws, and the like may be used to mount a tail cone and/or encoder mounting bracket to the attachment lugs 1910.

Figure 20:
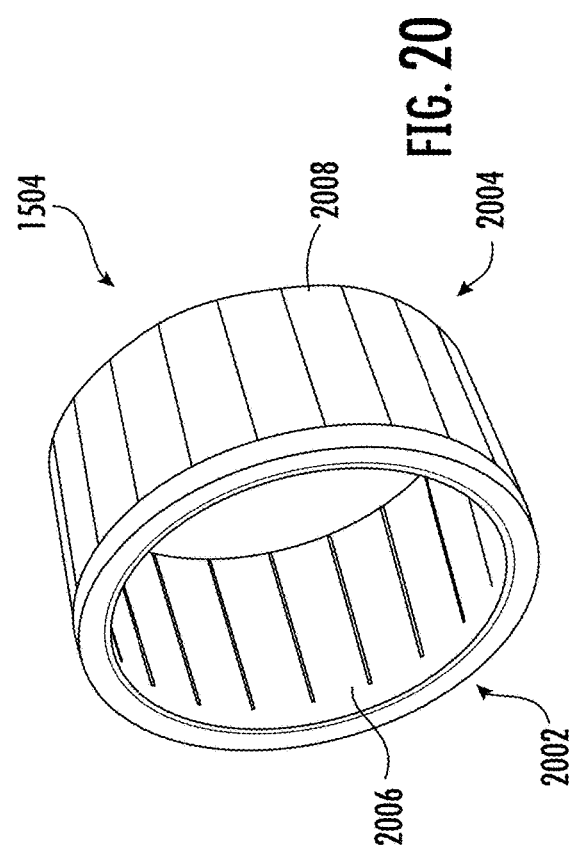
FIG. 20 depicts a front perspective view of an example of a motor thermal sleeve of the example aero stator assembly of FIG. 15 in accordance with aspects of the present disclosure.

FIG. 20 depicts a perspective view of an example of the example motor thermal sleeve 1504 of the example aero stator assembly 1500. As described above, the motor thermal transfer sleeve 1504, in this example tapers from a forward end 2002 to an aft end 2004 of the motor thermal transfer sleeve. The OD of the example motor thermal transfer sleeve 1504 at the forward end 2002 is thus larger than the OD of the motor thermal transfer sleeve at the aft end 2004 of the motor thermal transfer sleeve. The example motor thermal transfer sleeve 1504 is constructed of a thermally conductive material as described herein to facilitate heat transfer away from the motor 1502. The example motor thermal transfer sleeve thus includes an inner surface 2006 that is in thermal communication with the motor 1502 when the motor thermal transfer sleeve is installed on the motor. As described above, the example motor thermal transfer sleeve 1504 includes a rim 2008 that is received within respective axial slots 1828 (FIG. 18A) of the electrically conductive stator vanes when the aero stator assembly 1500 is in its assembled configuration. In some examples, to facilitate thermal communication with a motor of an air-moving device, a motor transfer sleeve may exhibit an axial taper in the range of about 0.5-0.6 mm (e.g., 0.58 mm) and apply a pressure of about 2 atmospheres (atm) to the lower axial flanges of the thermally conductive vanes and the electrically conductive stator vanes of an aero stator assembly.

Figure 21:
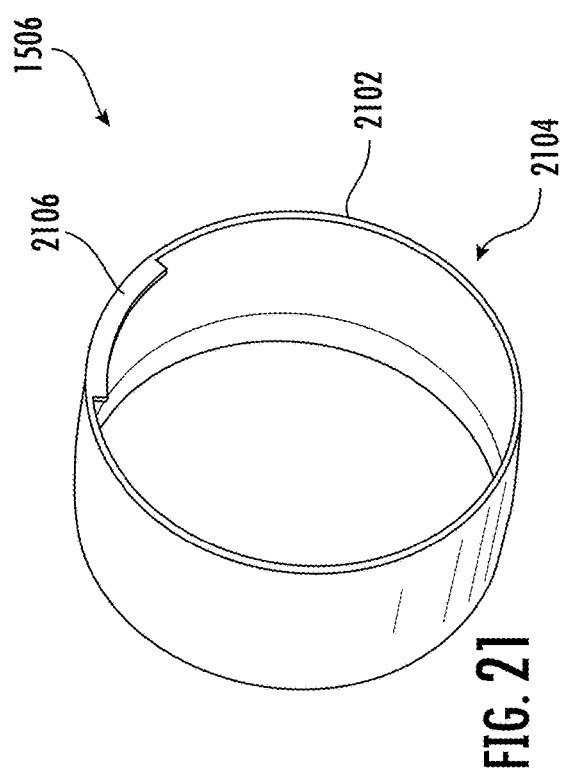
FIG. 21 depicts a rear perspective view of an example of a motor fairing of the example aero stator assembly of FIG. 15 in accordance with aspects of the present disclosure.

FIG. 21 depicts a rear perspective view of the example motor fairing 1506 of the example aero stator assembly 1500. As described above, the motor fairing 1506, in this example, includes a rim 2102 at the aft end 2104 of the motor fairing that is received within respective axial slots 1722 (FIG. 17) of the thermally conductive vanes when the aero stator assembly 1500 is in its assembled configuration. As also described above, the motor fairing 1506, in this example, includes an attachment tab 2106 that radially extends inward from the rim 2102 of the motor fairing and is received within the respective radial slots 1826 (FIG. 18A) of the electrically conductive stator vanes 1510 when the aero stator assembly 1500 is in its assembled configuration. The attachment tab 2106 facilitates mounting and retention of the motor fairing on the thermal sleeve 1504.

Figure 22:
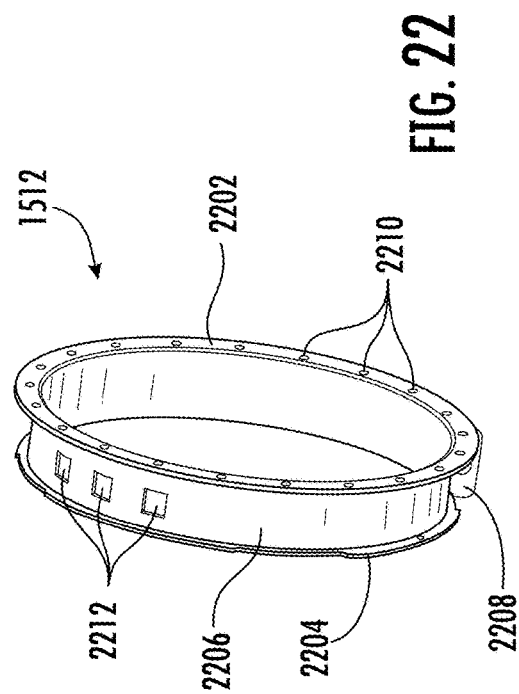
FIG. 22 depicts a top perspective view of an example of an structural shroud of the example aero stator assembly of FIG. 15 in accordance with aspects of the present disclosure.

FIG. 22 depicts a top perspective view of the example structural shroud 1512 of the example aero stator assembly 1500. The example structural shroud 1512 includes components similar to components of the example structural shroud 510 discussed above. As described above, the structural shroud 1512, circumscribes and mounts to the thermally conductive vanes 1508 and the electrically conductive stator vanes 1510 of the example aero stator assembly 1500 in its assembled configuration. For example, the example structural shroud 1512 is sized and shaped to fit and slide over the respective upper axial flanges 1702 and 1806 of the thermally conductive vanes 1508 and the electrically conductive stator vanes 1510 as seen, for example, in FIG. 15A. The structural shroud 1512, in this example, includes a forward radial flange 2202, an aft radial flange 2204, a web 2206 that extends between the forward and aft radial flanges, and a mounting lug 2208. The forward radial flange 2202, in this example, includes stator vane mounting apertures 2210. Each of the example mounting apertures 2210 corresponds to and aligns with a respective one of the mounting apertures 1718 and 1822 on the radial flanges 1716 and 1820 of the thermally conductive vanes 1508 and the electrically conductive stator vanes 1510. Mechanical fasteners such as bolts (e.g., countersunk bolts), screws, and the like may be used to mount the structural shroud 510 to the thermally conductive vanes 508. The web 2206, in this example, includes multiple passthrough apertures 2212 that allow passage of electrical wiring from an external side of the structural shroud 1512 to an internal side of the structural shroud (or attachment of electrical leads or lead wiring to the electrically conductive stator vanes). The electrical wiring may be, for example, wiring that provides power and/or control signals to the motor 1502 integrated in the aero stator assembly 1500. The web 2206, in this example, includes three passthrough apertures 2212 for three electrically conductive stator vanes 1510. The quantity of passthrough apertures may be based on the quantity of electrically conductive stator vanes of an aero stator assembly. An aero stator assembly may include more or fewer electrically conductive stator vanes and thus include more or fewer passthrough apertures in a structural shroud. The passthrough apertures 2212, in this example, are positioned adjacent to one another to match the adjacent positioning of the electrically conductive stator vanes 1510. In other examples as described herein, an aero stator assembly may include electrically conductive stator vanes that are not positioned adjacent to one another. As such, the passthrough apertures of the structural shroud in those examples likewise would not be positioned adjacent to one another. The mounting lug 2208 of the structural shroud 1512, in this example, likewise is configured to mount the example aero stator assembly 1500 to another component of an air moving device (e.g., a pylon, housing such as ducting or a bulkhead, and the like).

Figure 23:
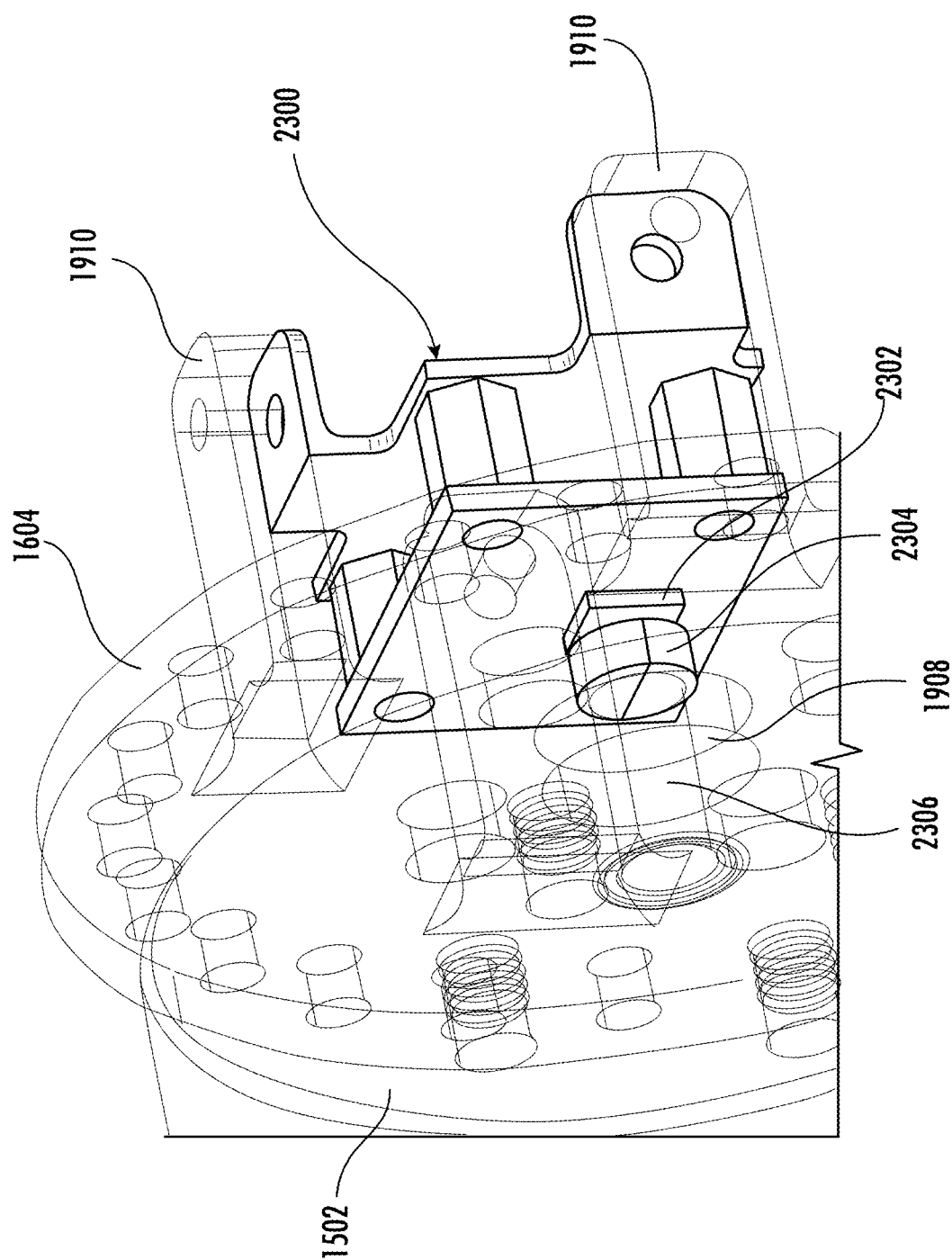
FIG. 23 depicts a perspective view of an encoder mount in accordance with aspects of the present disclosure.
Figure 24C:
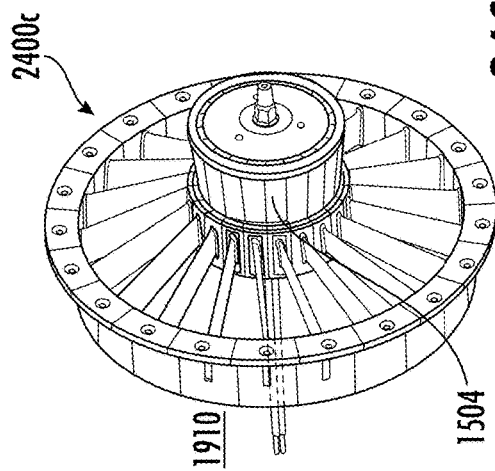
FIGS. 24A-F depict respective perspective views of an example assembly sequence for the example aero stator assembly of FIG. 15 in accordance with aspects of the present disclosure.
Figure 24F:
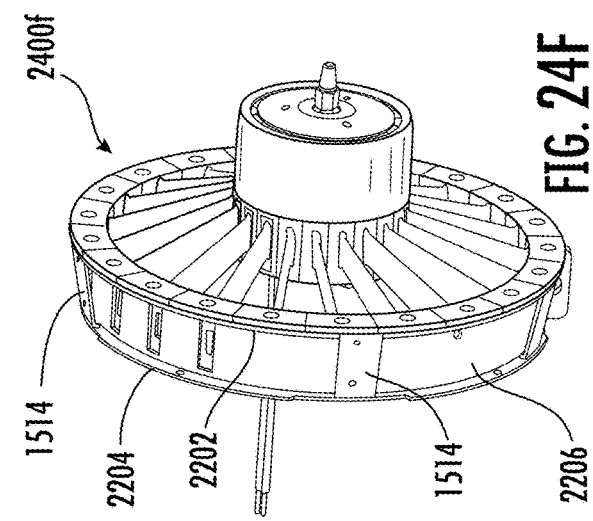
Figure 24B:
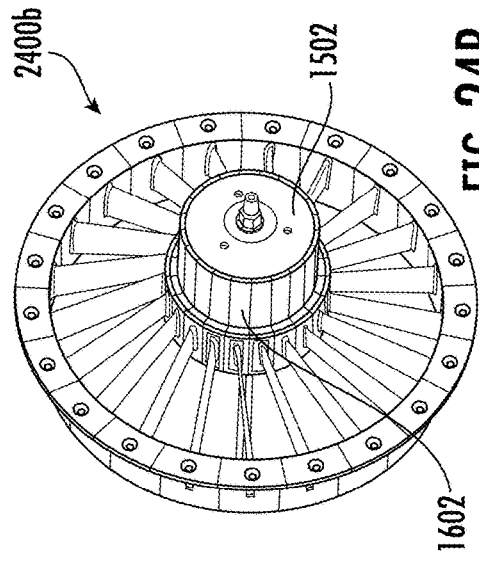
Figure 24E:
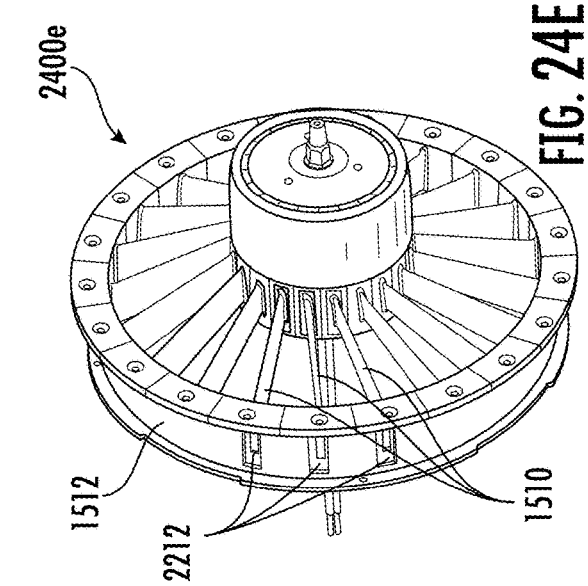
Figure 24A:
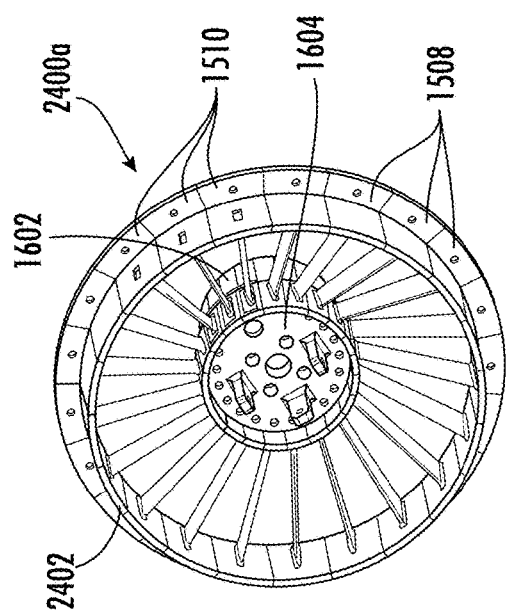
Figure 24D:
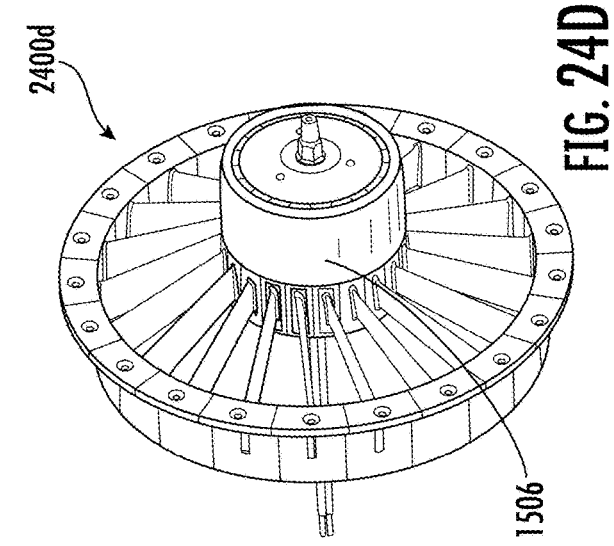

FIG. 23 depicts a perspective view of an example of an encoder mount 2300 that optionally may be included in some example implementations of an aero stator assembly such as the example aero stator assembly 1500. As seen in FIG. 23, the encoder mount 2300, in this example, is sized and shaped to mount to the attachment lugs 1910 of the motor mounting plate 1604. An encoder 2302 is mounted to a forward end of the example encoder mount 2300. A magnet 2304 is mounted to an axle (shaft) 2306 of the example motor 1502. The axle 2306 extends through the central aperture 1908 of the example motor mounting plate 1604. The encoder mount 2300, in this example, is configured to position the encoder 2302 sufficiently close to the magnet 2304 (e.g., at distance of about 1 millimeter) such that the encoder can detect changes to the magnetic field of the magnet as the magnetic poles spin via rotation the axle 2306 during operation of the motor 1502. The encoder 2302 may be, for example, an integrated circuit (IC) that generates an electrical signal corresponding to the changing magnetic field and provide that electrical signal, for example, to a control unit for processing. The control unit may use the electrical signal received from the encoder 2302, for example, to monitor and/or control the speed of the motor (e.g., the motor rotations per minute, RPMs).

FIGS. 24A-F depict respective perspective views of steps 2400a-f of an assembly sequence for the example aero stator assembly 1500. At step 2400a, in this example, the thermally conductive vanes 1508 and the electrically conductive stator vanes 1510 are mounted to the motor mounting plate 1604 as described herein. As described above, in this assembled configuration, the thermally conductive vanes 1508 and the electrically conductive stator vanes 1510 define an inner axial ring 1602 and an outer axial ring 2402 of the example aero stator assembly 1500. At step 2400b, in this example, the motor 1502 is inserted and integrated into the inner axial ring 1602 defined by the thermally conductive vanes 1508 and the electrically conductive stator vanes 1510 as described herein. At step 2400c, in this example, the motor thermal transfer sleeve 1504 is slid over the motor 1502 the inner axial ring as described herein. At step 2400d, in this example, the motor fairing 1506 is slid over the motor thermal transfer sleeve 1504 and attached to the electrically conductive stator vanes 1510 using the attachment tab 2106 (FIG. 21) as described herein. At step 2400c, in this example, the structural shroud 1512 is slid over the outer axial ring 2402, the passthrough apertures 2212 are aligned with the electrically conductive stator vanes 1510, and the structural shroud is mounted to the thermally conductive vanes 1508 and the electrically conductive stator vanes 1510 as described herein. At step 2400f, in this example, the ribs 1514 are installed across the web 2206 between the forward radial flange 2202 and the aft radial flange 2204 of the structural shroud 1512.

Figure 25B:
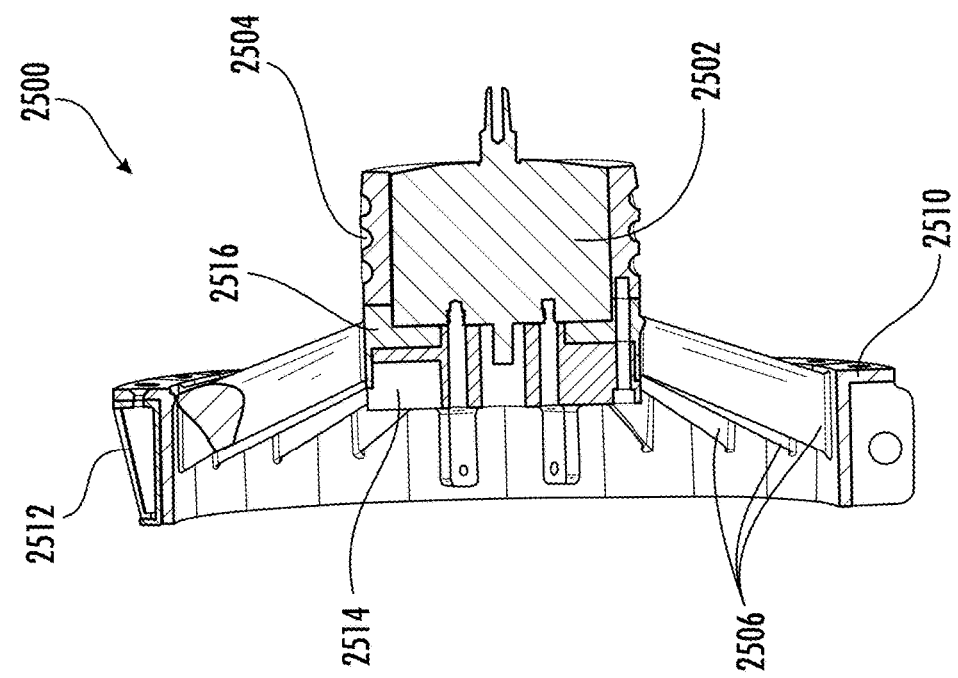
FIG. 25B depicts a side cross-sectional view of the example aero stator assembly of FIG. 25A in accordance with aspects of the present disclosure.
Figure 25A:
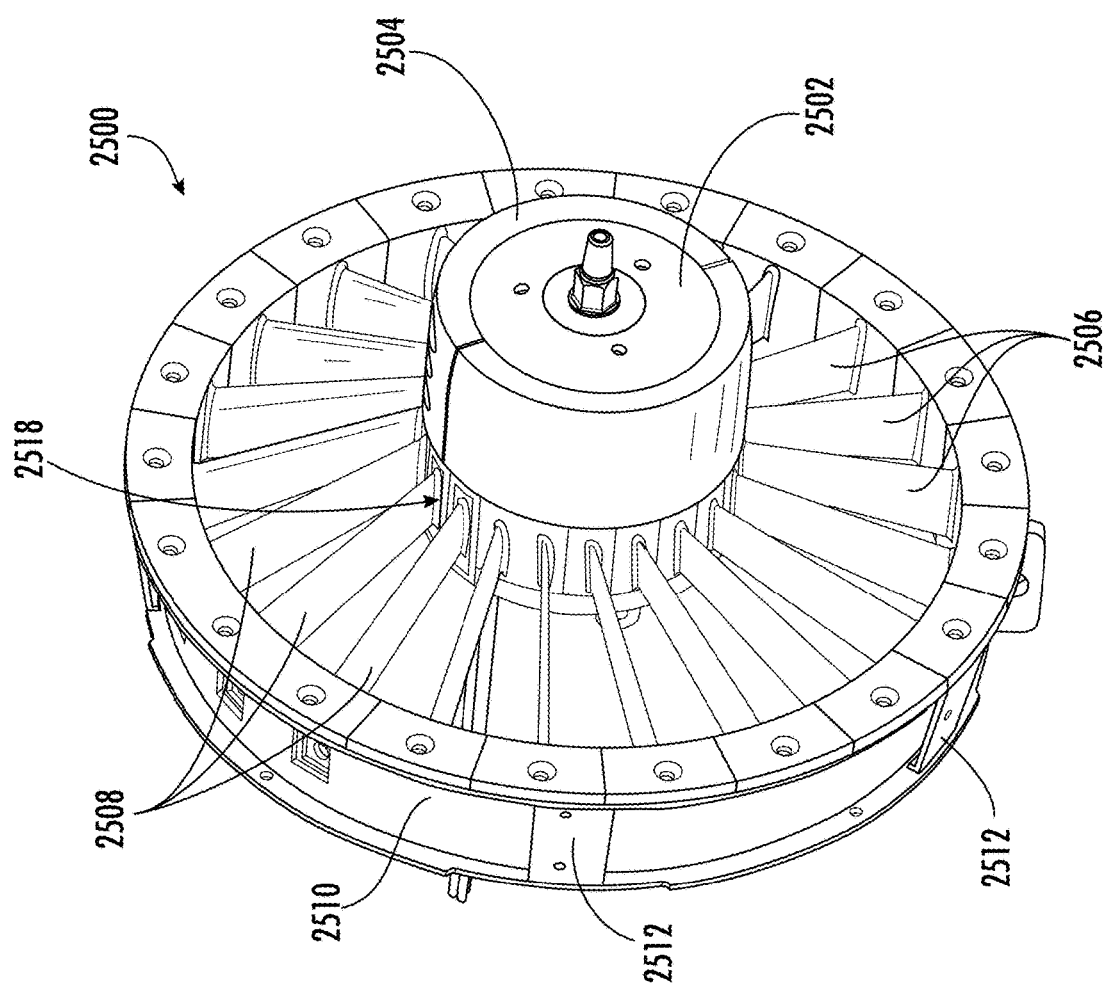
FIG. 25A depicts a front perspective view of another example of an aero stator assembly in accordance with aspects of the present disclosure in accordance with aspects of the present disclosure.

FIGS. 25A-B respectively depict a front perspective view and a side cross-sectional view of another example of an aero stator assembly 2500. Aspects of the aero stator assembly 2500, in this example, are similar to the example aero stator assembly 500 and the example aero stator assembly 1500 discussed above. For example, the aero stator assembly 2500, in this example, includes an integrated motor 2052 of an air-moving device. The example aero stator assembly 2500 also includes a motor fairing 2504, thermally conductive vanes 2506, electrically conductive stator vanes 2508, a structural shroud 2510, structural ribs 2512, and a motor mounting plate 2514. In contrast to an inner axial ring like the example aero stator assemblies 500 and 1500 (e.g., inner axial ring 514, inner axial ring 1602), the thermally conductive vanes 2506 of the aero stator assembly 2500, in this example, define an inner radial ring 2516 as shown in FIG. 25B (and FIG. 33A). The inner radial ring 2516, in this example, is sized and shaped to receive the motor 2502. The inner radial ring 2516 thus may at least partially define the hub of the aero stator assembly 2500. As seen in FIG. 25B and as described further below, the inner radial ring 2516 (e.g., a forward surface of the inner radial ring), in this example, is in thermal communication with an aft end of the motor 2502 (e.g., the outer surface of the rear end of the motor) and facilitates heat transfer from the motor to and through the thermally conductive vanes 2506. The aero stator assembly 2500, in this example, includes a stator vane sector 2518 that includes multiple electrically conductive stator vanes. The stator vane sector 2518, in this example, thus also may be referred to as an electrically conductive stator vane sector.

FIGS. 26A-B depict examples of thermally conductive vanes 2506a and 2506b of the example aero stator assembly 2500. Aspects of the example thermally conductive vanes 2506a and 2506b, in these examples, may be similar to the example thermally conductive vanes 508 and 1508 discussed above. For example, the thermally conductive vane 2506a, in this examples, includes an upper axial flange 2602 having a radial flange 2604 with a mounting aperture 2608, a lower axial flange 2610, and a blade 2612 (e.g., an airfoil) that extends between the upper and lower axial flanges. The thermally conductive vane 2506a, in this example, also includes an attachment lug 2613. The attachment lug 2613, in this example, includes a radial face 2614 having a mounting aperture 2616. The attachment lug 2613, in this example, also includes a radial thermal transfer lug 2618 that radially extends away from the lower axial flange 2610. As described herein, the thermal transfer lug 2618 defines the inner radial ring 2516 (FIG. 33A) of the example aero stator assembly 2500 in its assembled configuration. The example thermally conductive vane 2506b is substantially similar to the example thermally conductive vane 2506a but includes filleted corners 2620 rather than sharp corners.

FIG. 27 depicts an example of an electrically conductive stator vane sector 2518 of the example aero stator assembly 2500. An electrically conductive stator vane sector may include multiple electrically conductive stator vanes. The electrically conductive stator vane sector 2518, in this example, includes three electrically conductive stator vanes 2508. Other example electrically conductive stator vane sectors may include more or fewer electrically conductive stator vanes (e.g., 2-12). Similar to the electrically conductive stator vane 1510 discussed above, the electrically conductive stator vane sector may include an upper insulating portion 2702, a lower insulating portion 2704, and respective electrically conductive portions 2706. As described herein, the upper and lower insulating portions 2702 and 2704 are configured to electrically isolate (insulate) the respective electrically conductive portions 2706 of each of the electrically conductive stator vanes 2508 from each other, the thermally conductive vanes 2506, and the structural shroud 2510. The upper and lower insulating portions 2702 and 2704 thus may be constructed of an insulating material (e.g., rubber) and may be flexible to facilitate installation of the electrically conductive stator vanes 2508 in the stator vane sector 2518. Using a stator vane sector that retains multiple electrically conductive stator vanes may facilitate relatively easy installation and maintenance of the electrically conductive stator vanes as well as relatively easy connection of the electrical wiring that provides the power and/or control signals conducted by the electrically conductive stator vanes. Similar to the upper insulating portion 1802 discussed above, the upper insulating portion 2702, in this example, includes an upper axial flange 2708 a radial flange 2710. The radial flange 2710, in this example, includes multiple mounting apertures 2712 for mounting the electrically conductive stator vane sector 2518 to the structural shroud 2510, for example, one mounting aperture for each of the electrically conductive stator vanes 2508. The upper axial flange 2708, in this example, also includes multiple passthrough apertures 2714, for example, one passthrough aperture for each of the electrically conductive stator vanes 2508. Similar to the lower insulating portion 1804 discussed above, the lower insulating portion 2704, in this example, includes a lower axial flange 2716. The lower axial flange, in this example, similarly includes multiple passthrough apertures 2718, for example, one passthrough aperture for each of the electrically conductive stator vanes 2508. As described herein, the passthrough apertures 2714 and 2718 are configured to receive and retain respective ends of the electrically conductive portions 2706 of the electrically conductive stator vanes 2508. The lower insulating portion 2704 also may include one or more mounting apertures (not shown) for mounting the electrically conductive stator vane sector 2518 to the motor mounting plate 2514.

Figure 28:
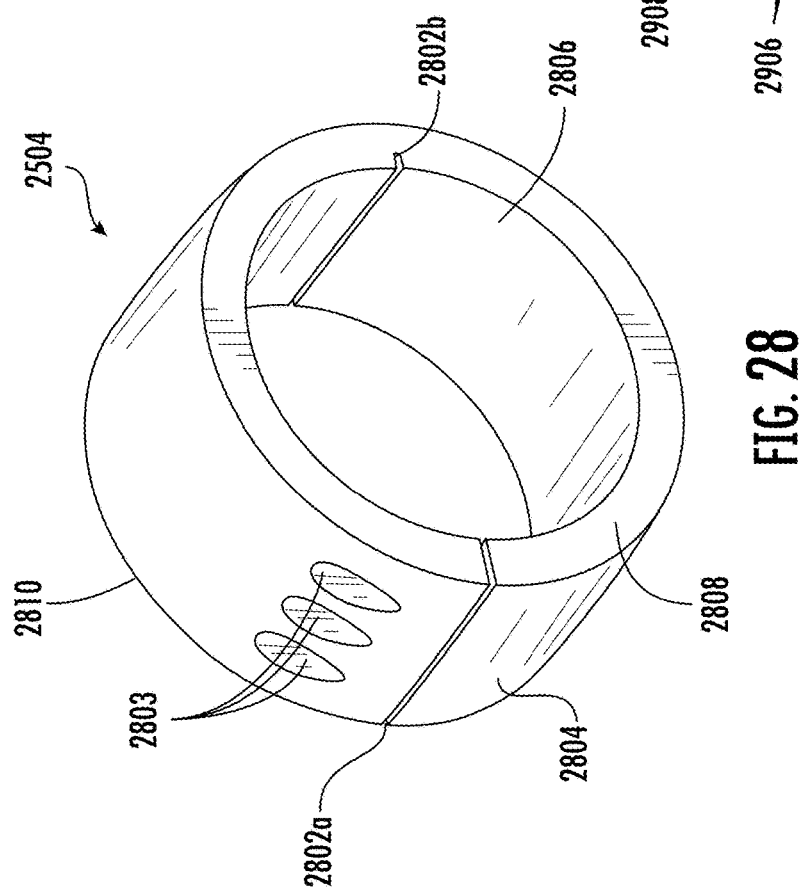
FIG. 28 depicts a perspective view of an example of a motor thermal clamping sleeve of the example aero stator assembly of FIG. 25A in accordance with aspects of the present disclosure.

FIG. 28 depicts a perspective view of the example motor thermal transfer sleeve 2504 of the example aero stator assembly 2500. The motor thermal transfer sleeve 2504, in this example, is configured to clamp over the motor 2502 (FIG. 25) to maintain thermal communication with the motor. To facilitate clamping of the motor thermal transfer sleeve 2504 on the motor, the motor thermal transfer sleeve 2504, in this example, includes axial grooves 2802a and 2802b and clamping holes 2803. The axial groove 2802a, in this example, axially extends along both an outer surface 2804 and an inner surface 2806 and radially across the rim 2808 of the example motor thermal transfer sleeve 2504. The axial groove 2802b, in this example, axially extends along the inner surface 2806 of the example motor thermal transfer sleeve 2504. The motor thermal transfer sleeve 2504, in this example, is clamped over the motor 2502 by inserting and tightening mechanical fasteners into the clamping holes 2803. Mechanical fasteners such as bolts (e.g., countersunk bolts), screws, and the like may be used to clamp the example motor thermal transfer sleeve 2504 over the motor. The motor thermal transfer sleeve 2504, in this example, includes three clamping holes 2803. In other examples, a motor thermal transfer sleeve may include more or fewer clamping holes. The motor thermal transfer sleeve 2504, in this example, also includes mounting holes (not shown) on the aft end 2810 of the motor thermal transfer sleeve, for example, one mounting hole for each of the thermally conductive vanes 2506 and one mounting hole for each of the mounting apertures of the electrically conductive stator vane sector 2518. The motor thermal transfer sleeve 2504 also may be referred to as a motor clamping sleeve. The motor thermal transfer sleeve 2504 also may support an IML or OML skin of the air-moving device. In some examples, the width of the axial grooves of a motor thermal transfer sleeve may in the range of about 0.7-0.8 (e.g., 0.75 mm).

Figure 29A:
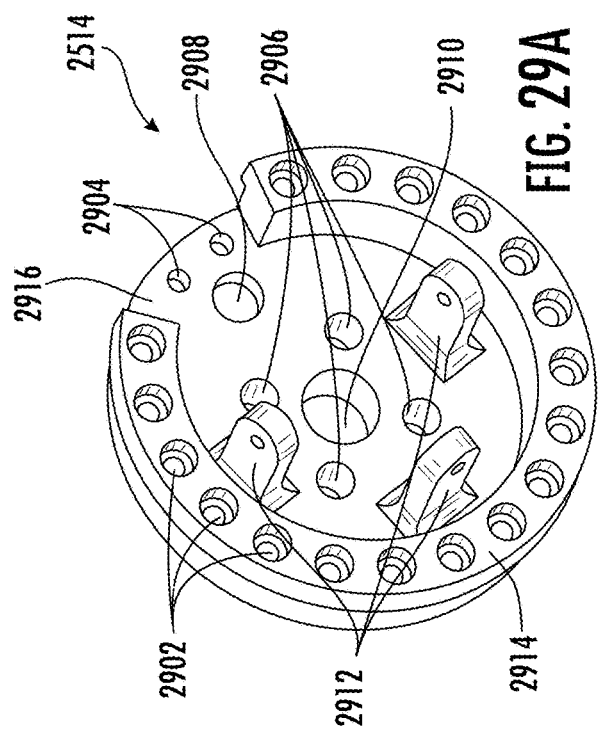
FIGS. 29A-B depict respective front and back perspective views of an example of a motor mounting plate of the example aero stator assembly of FIG. 25A in accordance with aspects of the present disclosure.
Figure 29B:
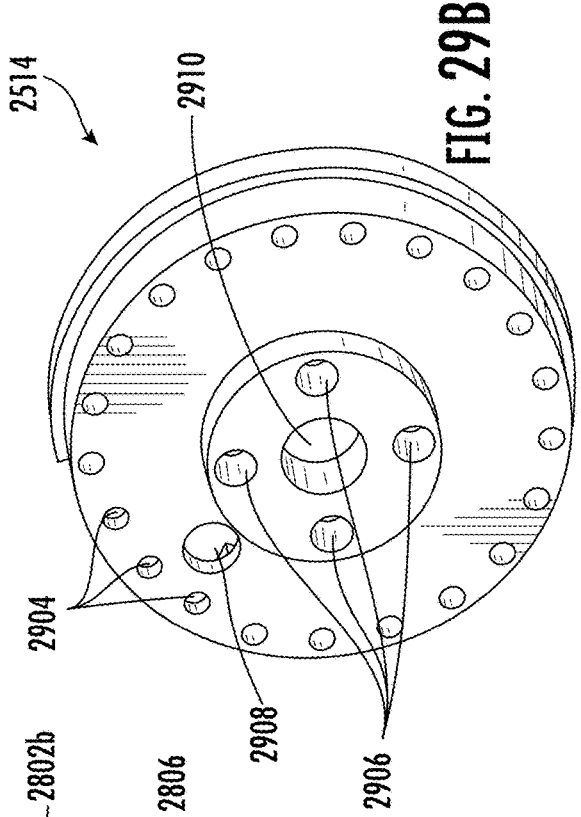

FIGS. 29A-B respectively depict front and back perspective views of the example motor mounting plate 2514 of the example aero stator assembly 2500. Aspects of the example motor mounting plate 2514 may be similar to the example motor mounting plates 504 and 1604 discussed above. For example, the motor mounting plate 2514, in this example, includes thermally conductive vane mounting apertures 2902, stator vane sector mounting apertures 2904, motor mounting apertures 2906, a wiring passthrough aperture 2908, and a central aperture 2910. For convenience, only some of the thermally conductive vane mounting apertures 2902 have been labeled with a reference number in FIGS. 29A-B. The stator vane mounting apertures 2902 and stator vane sector mounting apertures 2904 are circumferentially positioned around an outer perimeter of the motor mounting plate 2514 and align with corresponding mounting apertures on the thermally conductive vanes 2506 and the electrically conductive stator vane sector 2518. The central aperture 2910 again may be configured to facilitate an optional encoder feature as described above with reference to FIG. 23. The motor mounting plate 2514 likewise may be constructed of a thermally conductive material as described herein to facilitate heat transfer away from the motor 2502 and to the thermally conductive vanes 2506. The motor mounting plate 2514, in this example, also includes multiple attachment lugs 2912. The attachment lugs 2912, in this example, likewise may be used to mount a tail cone to the example aero stator assembly 2500. The motor mounting plate 2514, in this example, includes three attachment lugs 2912. In other examples, a motor mounting plate may include more or fewer attachment lugs. Mechanical fasteners such as bolts (e.g., countersunk bolts), screws, and the like again may be used for mounting. The motor mounting plate, in this example, has a cup-like configuration. For example, the aft end of the example motor mounting plate 2514 includes an circumferential rim 2914 that axially extends away from the aft end of the motor mounting plate. The axial rim 1914, in this example, includes the thermally conductive vane mounting apertures 1902. The axial rim 1914, in this example, also includes a cutout section 2916 (gap) that is sized and shaped to receive the stator vane sector 2518 when the example aero stator assembly 2500 is in its assembled configuration. In some examples, a cup-shaped motor mounting plate may have a thickness (not including attachment lugs) in the range of about 20-21 mm (e.g., 20.55 mm)

FIG. 30 depicts a perspective view of an alternative example of a structural shroud 3000. Aspects of this example structural shroud 3000 may be similar to the structural shrouds 510 and 1512 discussed above. The structural shroud 3000, in this example, includes passthrough apertures 3002 at a bottom end 3004 of the structural shroud near an attachment lug 3006. The location of the passthrough apertures of a structural shroud may depend on the design of the air-moving device and may be selected based on various considerations such as case of installation, maintenance, repair, replacement, and attaching electrical connectors to the electrically conductive stator vanes and/or electrically conductive stator vane sectors.

FIGS. 31A-B depict respective views of an example mounting plate assembly. The mounting plate assembly, in this example, includes separate components for mounting the motor of an air-moving device and for mounting aftward components of an air-moving device (e.g., a tail cone, an encoder mount). FIG. 31A depicts a rear perspective view of an example motor mounting plate 3102. FIG. 31B depicts a rear perspective view of an example aft mounting plate 3103. Aspects of the motor mounting plate 3102 and the aft mounting plate may be similar to the motor mounting plate 2514 discussed above. For example, the motor mounting plate 3102, in this example, may have a cup-like configuration and include an axial rim 3104 with thermally conductive vane mounting apertures 3106, a cutout section 3108 with stator vane sector mounting apertures 3110, motor mounting apertures 3112, a wiring passthrough aperture 3114, and a central aperture 3116. For convenience, only some of the thermally conductive vane mounting apertures 3106 have been labeled with a reference number in FIG. 31A. The motor mounting plate 3102, in this example, also includes aft mounting plate mounting apertures 3118 for mounting the aft mounting plate 3103 to the motor mounting plate. The aft mounting plate 3103, in this example, includes corresponding motor mounting apertures 3120, aft mounting plate mounting apertures 3122, and a central aperture 3124. The aft mounting plate 3103, in this examples, also includes multiple (e.g., three) attachment lugs 3126 (e.g., for mounting a tail cone, encoder mount, etc.). The aft mounting plate 3103, in this example, also includes a clipped section 3128 such that the aft mounting plate does not extend over the wiring passthrough aperture 3114 of the example motor mounting plate 3102 when the mounting plate assembly is in its assembled configuration. As described herein, the motor mounting plate 3102 and the aft mounting plate 3103 may be constructed of a thermally conductive material to facilitate heat transfer from a motor.

FIG. 32 depicts a perspective view of an assembly 3202 of the example motor mounting plate 2514 mounted to the example motor 2502 as described herein. FIG. 33A depicts a perspective view of an assembly 3302 of the example thermally conductive vanes 2506, the example stator vane sector 2518 having the electrically conductive stator vanes 2508, and the structural shroud 2510 as described herein. As seen in FIG. 33A, thermal transfer lugs 2618 of the thermally conductive vanes 2506 define the inner radial ring 2516 of the example aero stator assembly 2500. For convenience, only some of the thermally conductive vanes 2506 and the thermal transfer lugs 2618 have been labeled with a reference number in FIG. 33A. As described herein, the thermal transfer lugs 2618 are in thermal communication with the motor 2502 when the aero stator assembly 2500 is in its assembled configuration and facilitate heat transfer from the motor to and through the thermally conductive vanes 2506 where it is dissipated. FIG. 33B depicts a perspective view of an assembly 3304 of the assembly 3302 with the example motor 2052, the example motor thermal clamping sleeve 2504, and the motor mounting plate 2514. As seen in FIG. 33B, the thermally conductive vanes 2506 mount to the aft end of the motor thermal transfer sleeve 2504. As also seen in FIG. 33B, the motor mounting plate 2514 mounts to an aft end of the thermally conductive vanes 2506.

FIG. 34 depicts a perspective view of another example of an aero stator assembly 3400. The aero stator assembly 3400, in this example, is electrically conductive and provides power and/or control signals via multiple electrically conductive stator vane sectors 3402 each having multiple electrically conductive stator vanes 3034. For convenience, only some of the electrically conductive stator vanes 3404 are labeled with a reference number in FIG. 34. The electrically conductive stator vane sectors 3402, in this example, are constructed of an electrically conductive material (e.g., metal such as aluminum, steel, titanium, nickel, etc.). As described herein, an electrically conductive stator vane also may include embedded wiring (e.g., copper wiring, brass wiring). In some examples, different materials may be used to construct different stator vanes of an aero stator assembly. The material used to construct a stator vane may depend on the electric signal that will be sent via the stator vane. For example, stator vanes that carry relatively higher currents (e.g., for AC power or DC power) may be constructed of a different material than stator vanes that carry relatively lower currents (e.g., communications, sensor data, control signals, etc.). For relatively low-power applications, electric wiring (e.g., copper wiring, brass wiring) or metallic materials (e.g., steel, titanium, nickel) may be used. The aero stator assembly 3400, in this example, also includes a motor mount 3406 and multiple electrical connection brackets 3408, one for each of the electrically conductive stator vane sectors 3402. Each example electrically conductive stator vane 3402, in this example, includes an electrical attachment lug 3410 for attaching electrical wiring that delivers the power and/or control signals. The attachment lug 3140 of each electrically conductive stator vane sector 3402, in this example, is located on (e.g., attached to) an outer axial flange 3412 defined by the electrically conductive stator vane sector. As seen in FIG. 34, in an assembled configuration, the respective outer axial flanges 3412 of the electrically conductive stator vane sectors 3402 define an outer axial ring of the aero stator assembly 3400. The motor mount 3406, in this example, has a cup-like shape and thus also may be referred to as a motor mounting cup. As seen in FIG. 34 and as described in further detail below, the electrical connection brackets 3408 mount to the motor mount 3406 such that they are positioned (sandwiched) between electrically conductive stator vanes 3404 and the motor mount when the example aero stator assembly 3400 is in its assembled configuration. As also seen in FIG. 34, the electrical connection brackets axially extend through the motor mount 3406 when the example aero stator assembly 3400 is in its assembly configuration, which positions the electrical connection brackets proximate to a motor that is received and resides within the motor mount. As also described further below, the motor mount is configured to electrically isolate (insulate) the electrically conductive stator vane sectors from each other. To electrically isolate the electrically conductive stator vane sectors 3402, the motor mount 3406, in this example, includes axial flanges 3414, one for each pair of adjacent electrically conductive stator vane sectors. The axial flanges 3414, in this example, are positioned between respective inner axial flanges 3416 of the electrically conductive stator vane sectors 3402. As also seen in FIG. 34, in an assembled configuration, the respective inner axial flanges 3416 of the electrically conductive stator vane sectors 3402 define an inner axial ring of the aero stator assembly 3400. The motor mount 3406, in this example, is sized and shaped to be received within the inner axial ring defined by the inner axial flanges 3416 of the electrically conductive stator vane sectors 3402. The electrically conductive stator vanes 3404 are connected to and extend between the outer axial ring and the inner axial ring defined by the electrically conductive stator vane sectors 3402 of the example aero stator assembly 3400. In some examples, insulators also may be inserted between the outer axial ring defined by the outer axial flanges 3412 of the electrically conductive stator vane sectors 3402. As described herein, ring connectors may be used to connect the electrical wiring to the electrical connection brackets 3408 and the electrical attachment lugs 3410.

Figure 35:
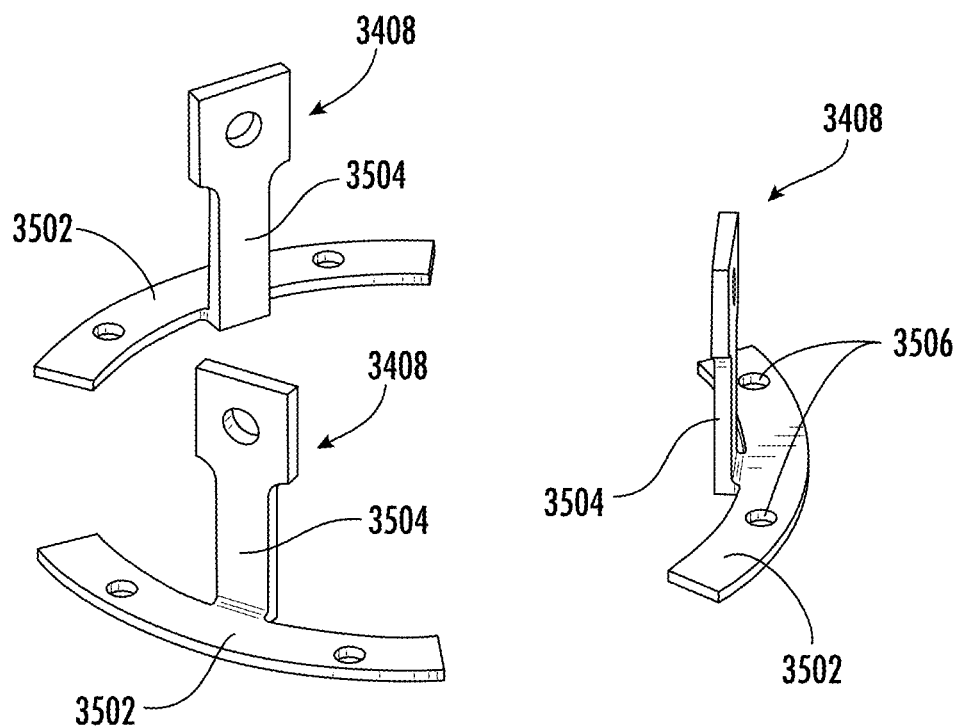
FIG. 35 depicts a perspective view of a set of electrical connection brackets of the example aero stator assembly of FIG. 34 in accordance with aspects of the present disclosure.

FIG. 35 depicts a perspective view of a set of electrical connection brackets 3408. The electrical connection brackets 3408, in this example, similarly are constructed of an electrically conductive material (e.g., aluminum). Each electrical connection bracket 3408, in this example, includes a radial flange 3502, an axial flange 3504, and mounting apertures 3506 formed in the radial flange. For convenience, only some of the mounting apertures 3506 are labeled with a reference number in FIG. 35. The radial flange 3502, in this example, is shaped (e.g., curved) to match an outer perimeter (e.g., curved outer perimeter) of the motor mount 3406 as described further below with reference to FIGS. 37A-B.

Figure 36:
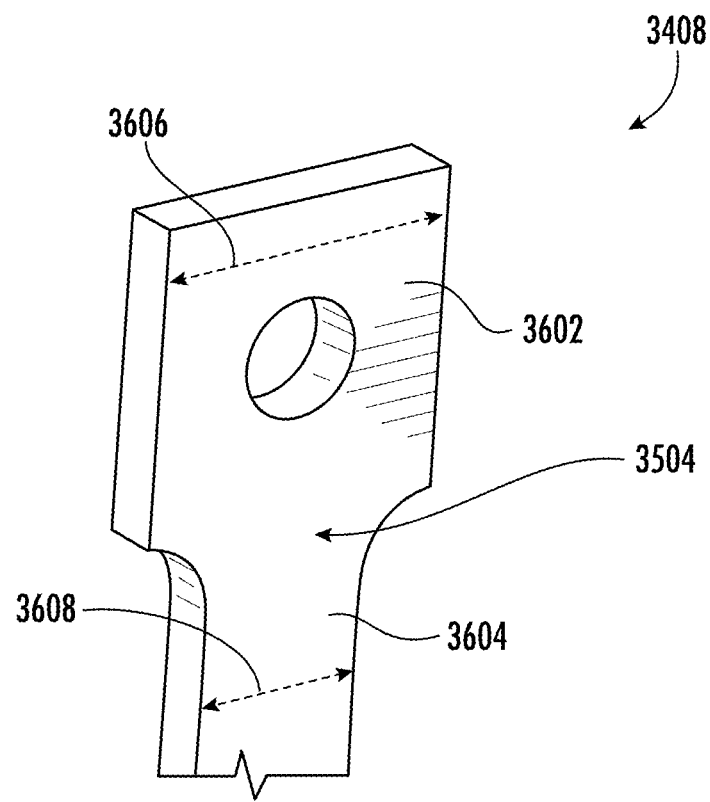
FIG. 36 depicts a close-up view of the example electrical connection bracket of FIG. 35 in accordance with aspects of the present disclosure.

FIG. 36 depicts a close-up view of the example axial flange 3504 of the example electrical connection bracket 3408. The axial flange 3504, in this example, includes an electrical attachment tab 3602 that is wider than a neck 3604 of the axial flange. For example, a width 3606 of the electrical attachment tab 3602 of the axial flange 3504 is greater than a width 3608 of the neck 3604 of the axial flange. The relatively wider electrical attachment tab 3602 facilitates electrical contact with an electrical terminal (e.g., a ring connector). More generally, the width of an electrical attachment tab of an axial flange of an electrical connection bracket may be based on the diameter of a suitable electrical terminal. For example, the width of an electrical attachment tab may be about 8.5 mm to facilitate electrical contact with a ring connector having a ring diameter of about 8.4 mm (8.38 mm) and a fastener (e.g., screw) diameter of about 4.0 mm.

Figure 37A:
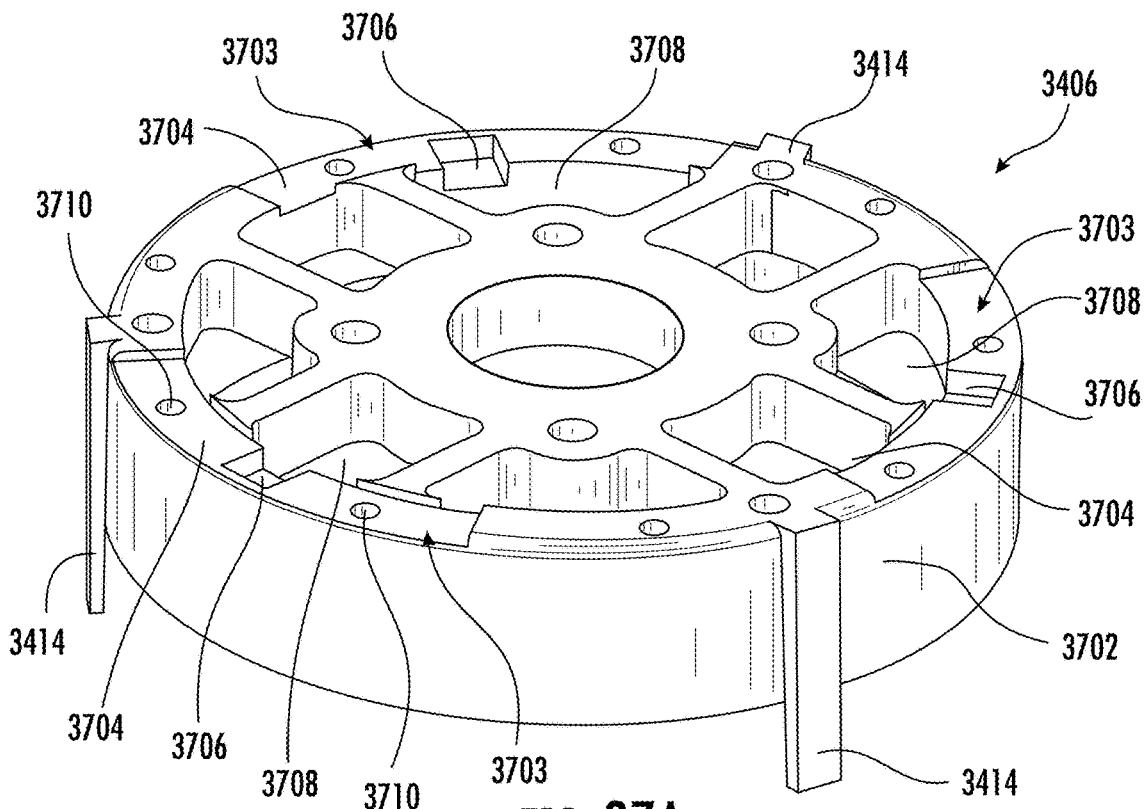
FIGS. 37A-B depict respective perspective and rear views of an example of a motor mount of the example aero stator assembly of FIG. 36 in accordance with aspects of the present disclosure.
Figure 37B:
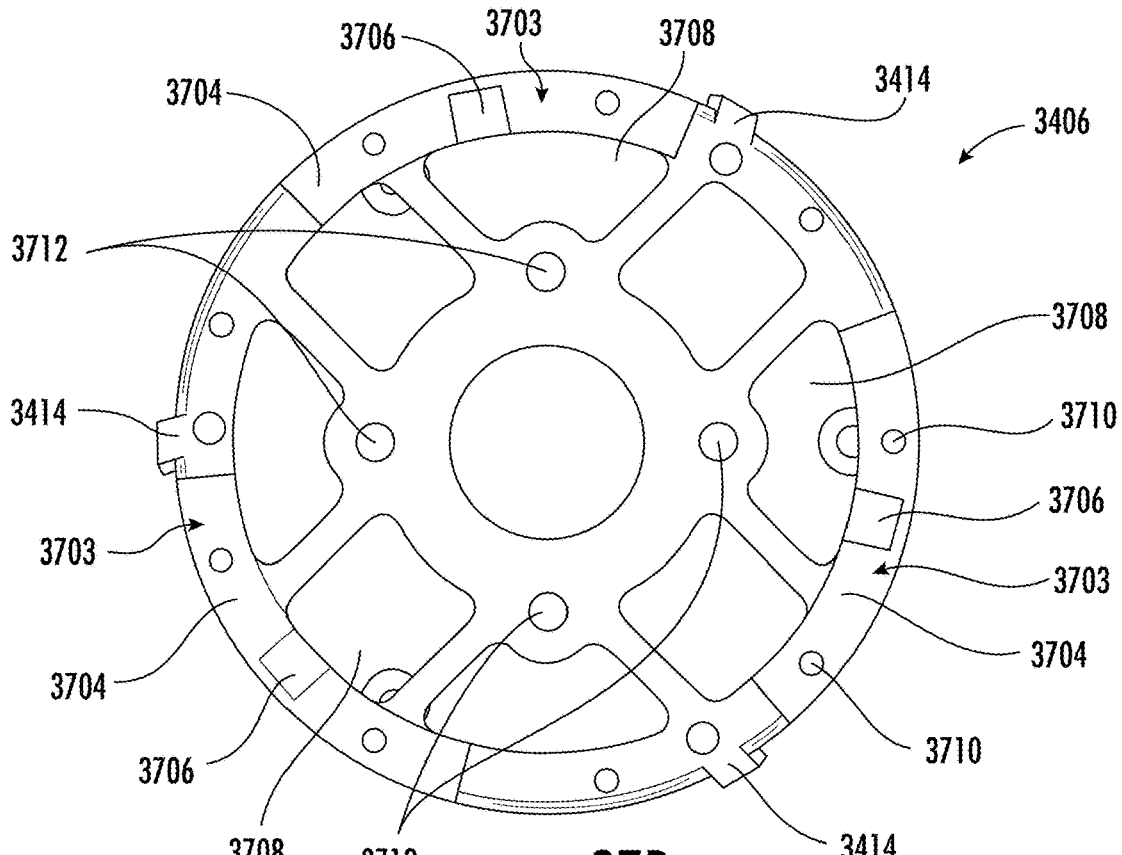
Figure 38:
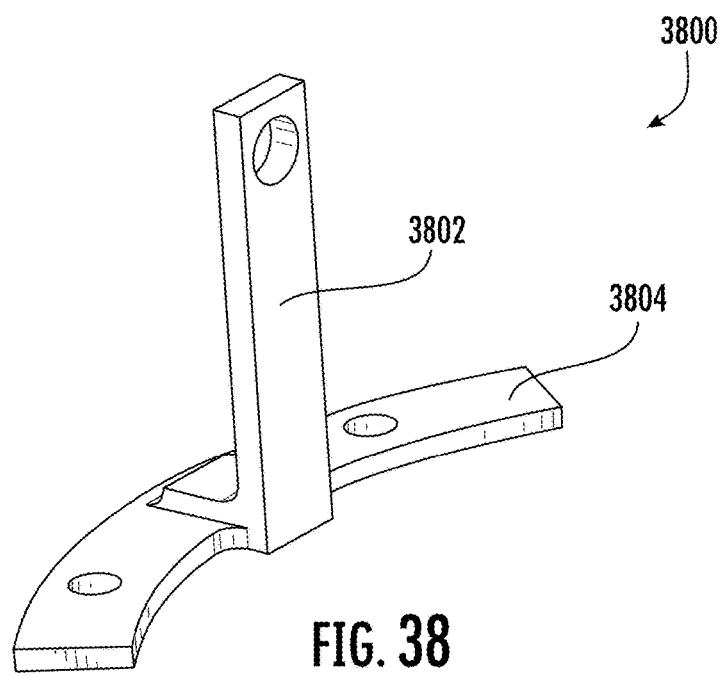
FIG. 38 depicts a perspective view of another example of an electrically conductive bracket in accordance with aspects of the present disclosure.

FIGS. 37A-B respectively depict perspective and rear views of the example motor mount 3406. As described herein, the motor mount 3406, in this example, has a cup-like shape and thus include an axial outer rim 3702 that is sized and shaped to receive a motor of an air-moving device. The axial flanges 3414, in this example, are located on the outer rim 3702. The motor mount 3406, in this example, includes bracket mounting sectors 3703 on the aft end of the motor mount for mounting an electrical connection bracket (e.g., electrical connection bracket 3408 in FIG. 34). Each bracket mounting sector 3703, in this example, is recessed from the aft end of the motor mount to receive one of the electrical connection brackets. As seen in FIGS. 37A-B, for example, the example bracket mounting sectors 3703 includes respective recesses 3704 formed in an aft end of the motor mount. Each recess 3704, in this example, is sized and shaped to receive the radial flange 3502 of one of the electrical connection brackets 3408. The motor mount 3406, in this example, also includes additional recesses 3706 formed in the recesses 3704 that are sized and shaped to receive an axial flange of an electrical connection bracket. For example, FIG. 38 depicts an alternative type of electrical connection bracket 3800 having an L-shaped axial flange 3802. The recesses 3706 of the motor mount 3406, in this example, may be configured to receive the L-shaped axial flange 3802 of the alternative example electrical connection bracket 3800. In some examples, a motor mount may exclude the additional recesses 3706. The motor mount 3406, in this example, also includes respective apertures 3708 that permit each axial flange 3504 of one of the electrical connection brackets 3408 (or axial flange 3802 of electrical connection bracket 3800) to axially extend through the motor mount. The motor mount 3406, in this example, includes corresponding mounting holes 3710 for mounting the electrical connection brackets 3408 or 3800 to the motor mount. For convenience, only some of the mounting holes 3710 are labeled with a reference number in FIGS. 37A-B. The motor mount, 3406, in this example, also includes motor mounting apertures 3712 for mounting a motor to the motor mount. In some examples, the motor mount may be constructed of an electrically insulating material (e.g., glass-filled plastic). In some examples, the motor mount may be constructed of aluminum and isolated from the electrically contacts using gaskets constructed of an electrically isolating material (e.g., silicone).

FIG. 38 depicts a perspective view of another example of an electrical connection bracket 3800. Aspects of the electrical connection bracket 3800 may be similar to the electrical connection bracket 3408 discussed above with reference to FIGS. 34-36. As discussed above, the example motor mounting cup 3406 is configured to receive the example electrical connection bracket 3800 at the bracket mounting sectors 3703, for example, the L-shaped axial flange 3802 in the recess 3706 and the radial flange 3804 in the recess 3704. As also seen in FIG. 38, the axial flange 3802 of the electrical connection bracket 3800, in this example, has a constant width.

Figure 39:
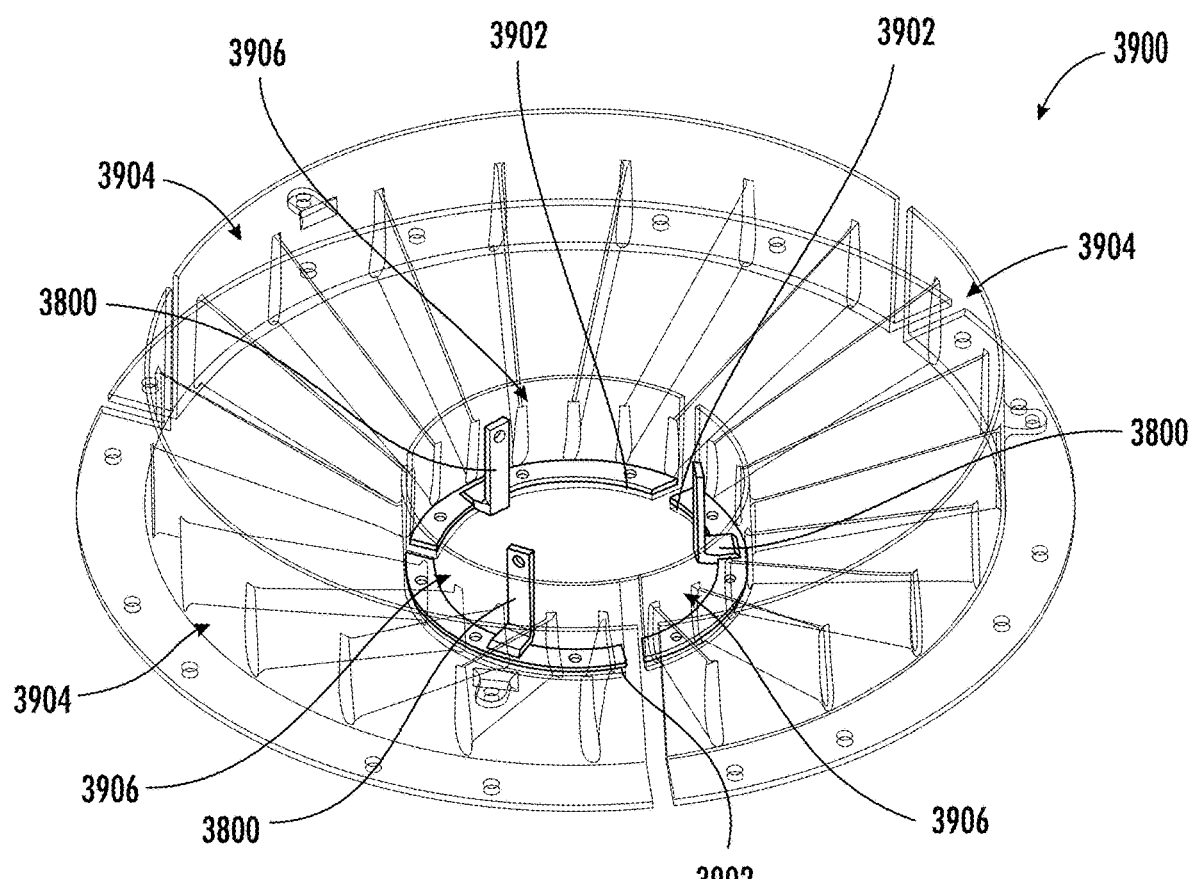
FIG. 39 depicts a perspective view of an assembly of the electrically conductive bracket of FIG. 38 with the example electrically conductive stator sectors of FIG. 34 in accordance with aspects of the present disclosure.

FIG. 39 depicts a perspective view of an assembly 3900 of the example aero stator assembly 3400 (FIG. 34) with a set of electrically conductive stator brackets 3800. The assembly 3900, in this example, includes bracket mounting sectors 3902 that each correspond to one of the bracket mounting sectors 3703 of the example motor mount 3406 as described above with reference to FIGS. 37A-B. As seen in FIG. 39, for example, each electrically conductive stator vane sector 3904 includes a respective one of the bracket mounting sectors 3902. Each bracket mounting sector 3902, in this example, includes a flange that radially extends inward toward a center of the example aero stator assembly 3900 from an inner axial flange 3906 of the electrically conductive stator vane sector 3904. Each inner axial flange 3906, in this example, includes corresponding mounting holes (FIG. 42B) for mounting the a respective one of the electrical connection brackets 3800 to the electrically conductive stator vane sector 3904. As also seen in FIG. 39 and described herein, the respective inner axial flanges 3906 of the example electrically conductive stator vane sectors 3904 define an inner axial ring when the example aero stator assembly 3900 is in an assembled configuration.

Figure 40A:
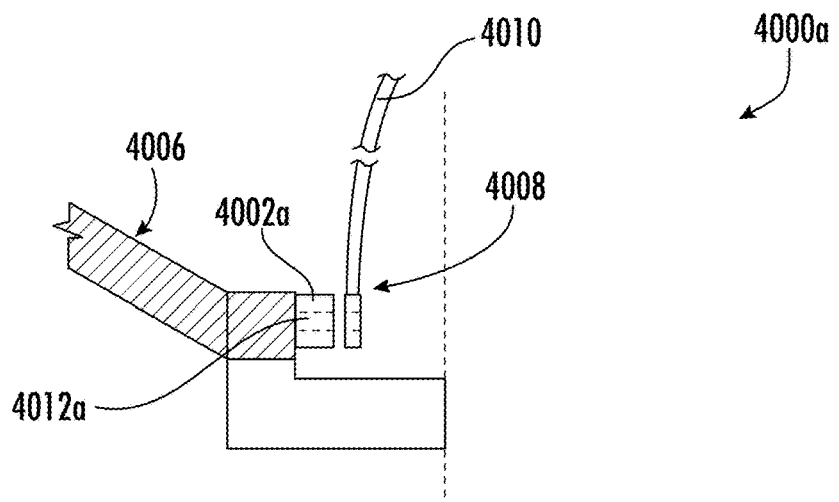
FIGS. 40A-B depict respective block diagrams of examples of electrical connection lugs in accordance with aspects of the present disclosure.
Figure 40B:
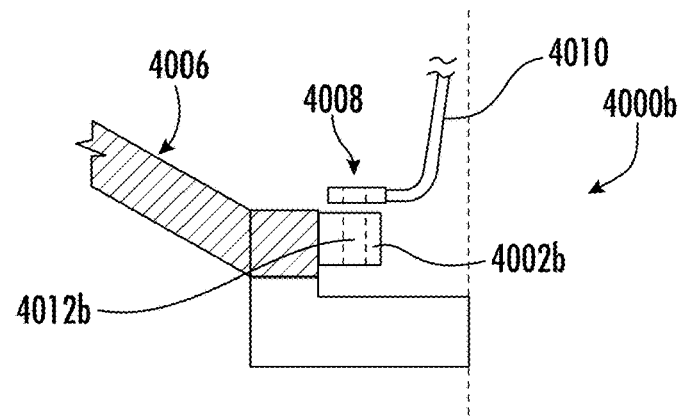
Figure 41:
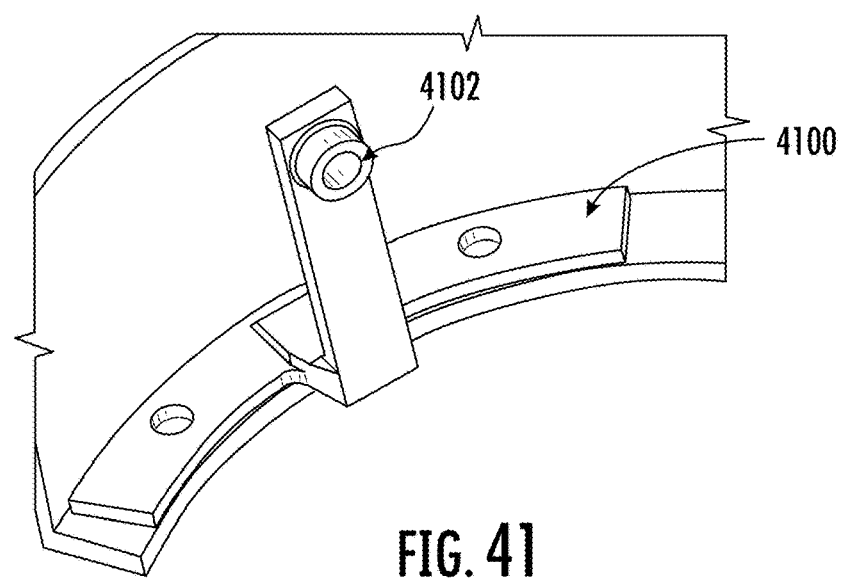
FIG. 41 depicts a perspective view of another example of an electrically conductive bracket in accordance with aspects of the present disclosure.

FIGS. 40A-B respectively depict block diagrams of example electrical lugs 4002a and 4002b. FIGS. 40A-B illustrate different orientations for a fastening hole or aperture used to mount an electrical wiring terminal 4004 to an electrically conductive stator vane 4006. The electrical wiring terminals 4004, in this example, include a ring connector 4008 that connects the lead wiring 4010 to a motor. The ring connector 4008, in this example, is mounted to the electrical lug 4002a or 4002b via a fastening hole or aperture. In FIG. 40A, the example fastening hole or aperture 4012a is radially oriented. In FIG. 40B, the example fastening hole or aperture 4012b is axially oriented. FIG. 41 depicts a perspective view of an example of an electrically conductive bracket 4100 having a radially extending electrical lug 4102. Aspects of the electrically conductive bracket 4100 otherwise may be similar to the electrical connection brackets 3408 and/or 3800 respectively discussed above with reference to FIGS. 34-36 and FIG. 38. The orientation of the electrical lugs (e.g., electrical lugs 4002a-b or 4102) may depend on the design of the air-moving device and may be selected based on various considerations such as case of installation, maintenance, repair, and/or replacement of the electrical wiring in the air-moving device.

Figure 42A:
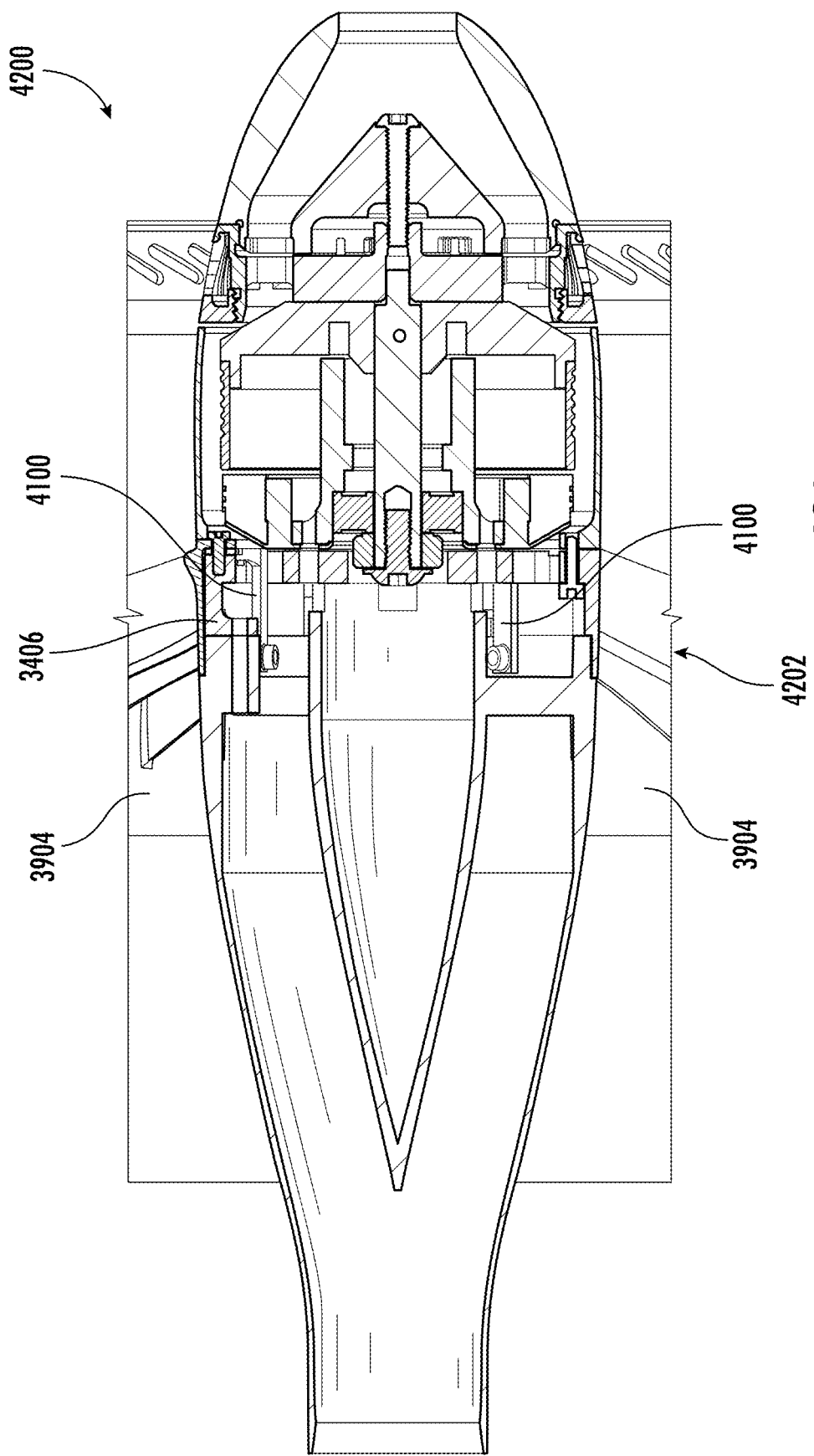
FIG. 42A depicts a side-cross sectional view of an example of an air-moving device with the example electrically conductive bracket of FIG. 41 in accordance with aspects of the present disclosure.
Figure 42B:
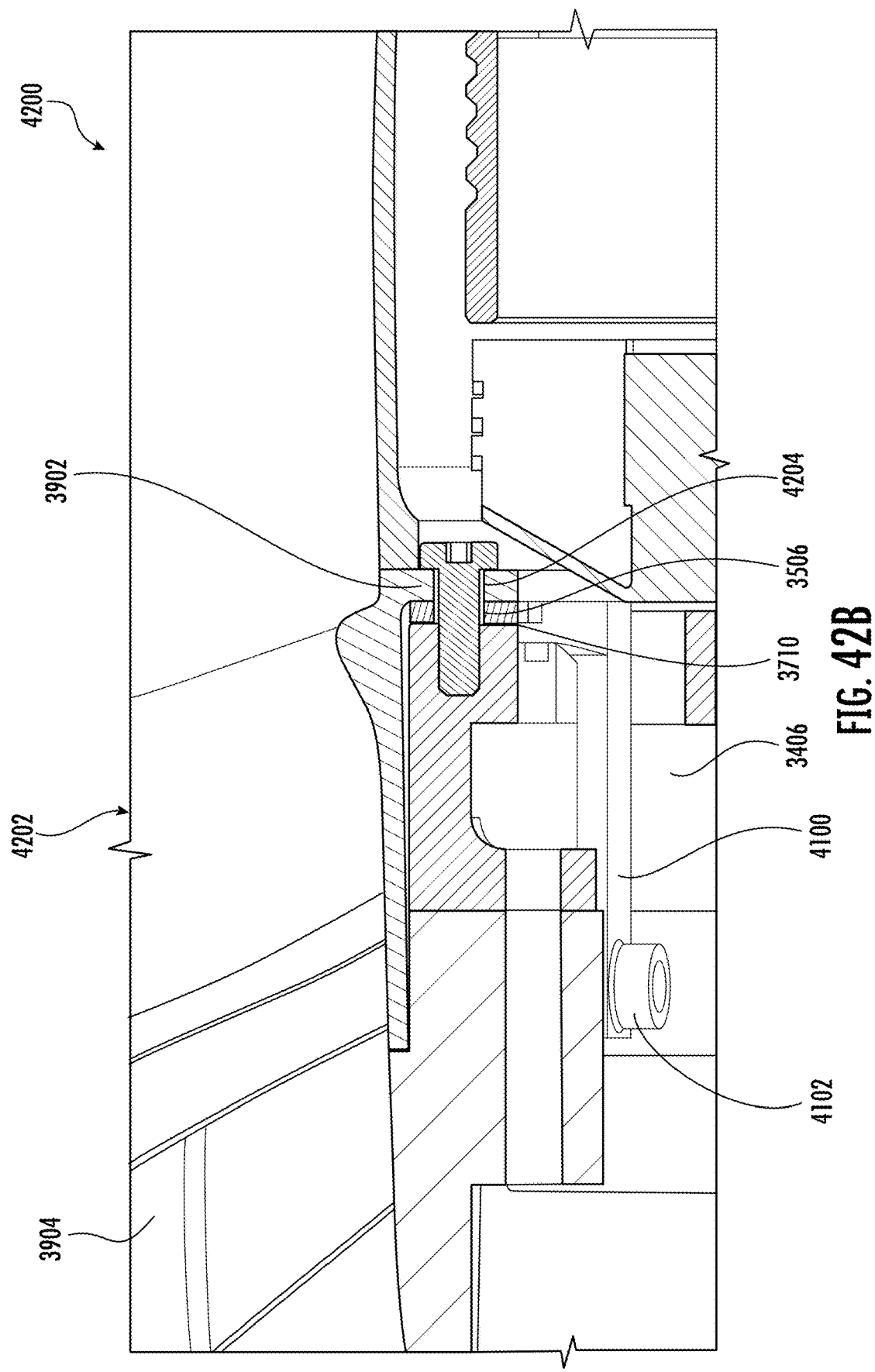
FIG. 42B depicts a close-up cross-sectional view of the air-moving device of FIG. 44A.

FIGS. 42A-B respectively depict a side cross-sectional view and a close-up side-cross sectional view of an example air-moving device 4200 with an example aero stator assembly 4202 having electrically conductive stator vane sectors in accordance with aspects described herein. The example aero stator assembly 4202, in this example, includes the electrically conductive stator vane sectors 3904 described above with reference to FIG. 39, the motor mount 3406 described above with reference to FIGS. 37A-B, and the electrical connection bracket 4100 described above with reference to FIG. 4100. As seen in FIG. 42B, the electrical connection bracket 4100, in this example, is positioned (sandwiched) between the motor mount 3406 and the bracket mounting sector 3902 (e.g., inner radial flange) of one the electrically conductive stator vane sectors 3904. As also seen in FIG. 42B, motor mount 3406, electrical connection bracket 4100, and the electrically conductive stator vane sector 3904 are mounted together using a fastener (e.g., a bolt) that extends through the aligned mounting aperture 4204 of the bracket mounting sector 3902, the mounting aperture 3506 of the electrical connection bracket, and the mounting hole 3710 of the motor mount 3406. In an assembled configuration, an electrical connection bracket (e.g., electrical connection bracket 4100) may be squeezed against the bracket mounting sector (e.g., bracket mounting sector 3902) of an electrically conductive stator vane sector (e.g., electrically conductive stator vane sector 3904) in order to facilitate the electrical connection when the motor mount, electrical connection bracket, and electrically conductive stator vane sector are fastened together.

Figure 43A:
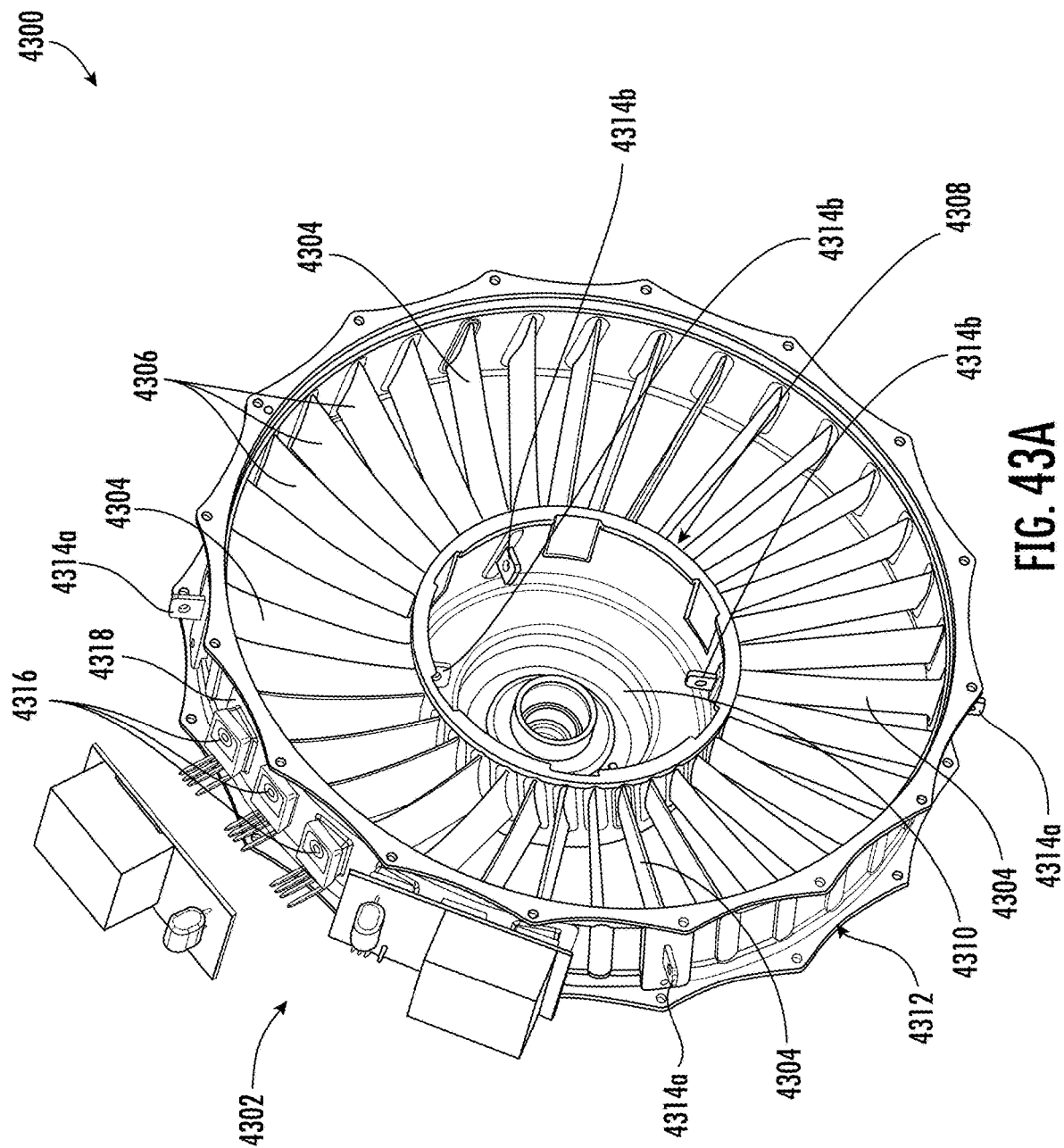
FIG. 43A depicts a perspective view of another example of an aero stator assembly in accordance with aspects of the present disclosure.
Figure 43B:
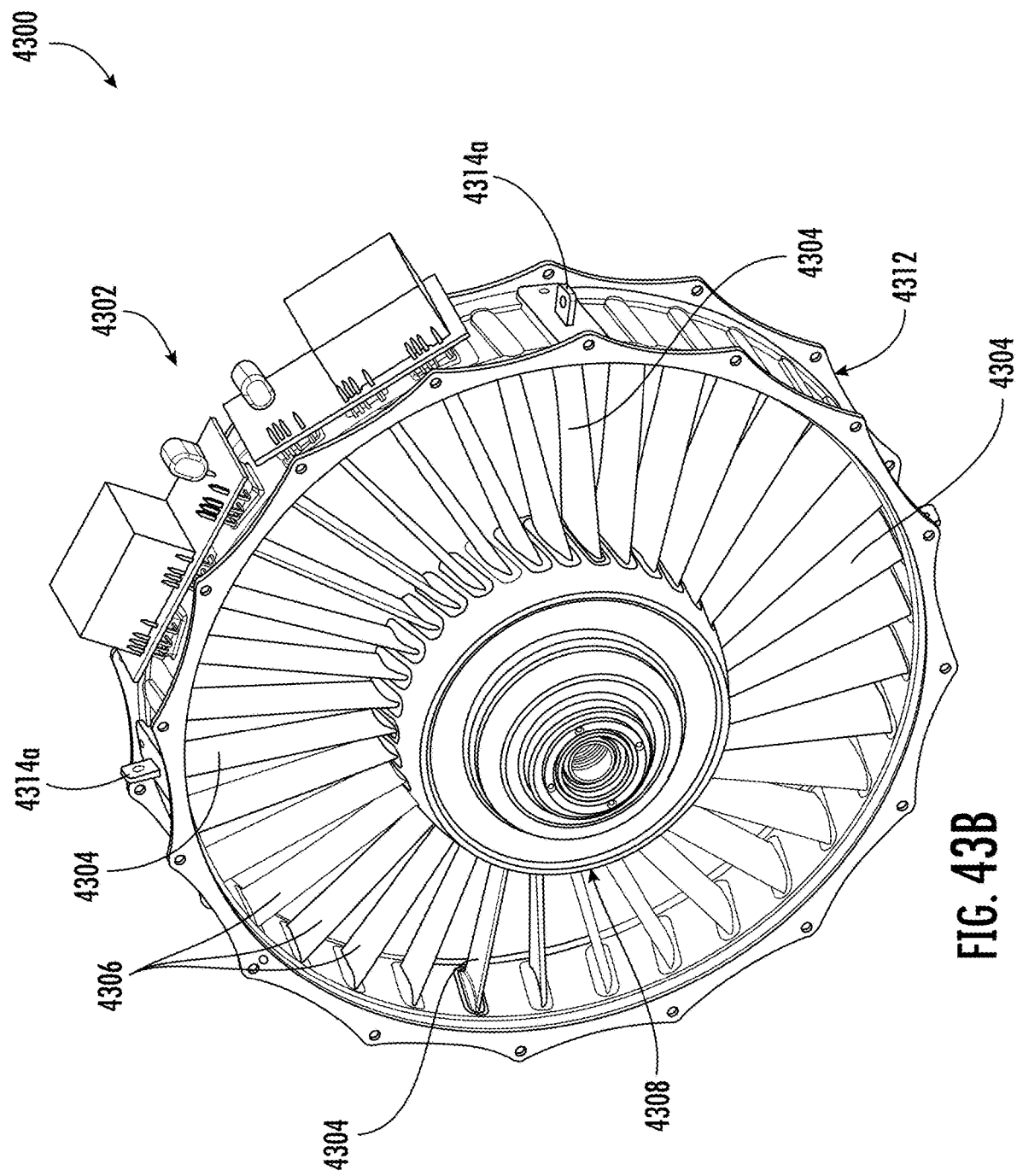
FIG. 43B depicts another perspective view the example aero stator assembly of FIG. 43A.

FIGS. 43A-B depict respective perspective views of another example of an aero stator assembly 4300 in accordance with aspects described herein. The example aero stator assembly 4300 is similar to the example aero stator assembly 102 discussed above with reference to FIG. 1 and FIG. 2. For example, the aero stator assembly 4300 includes a control unit 4302 (e.g., an ESC), multiple stator vanes including both electrically conductive stator vanes 4304 and thermally conductive vanes 4306, a hub 4308 defining a central cavity 4310, and a structural shroud 4312. The electrically conductive stator vanes 4304 and thermally conductive vanes 4306 radially extend away from an outer surface of the hub 4308 toward an outer perimeter of the aero stator assembly 4300, for example, between the hub and the structural shroud 4312. For convenience only some of the thermally conductive vanes 4306 have been labeled with a reference number in FIG. 43. Example implementations of an aero stator assembly in accordance with aspects of these disclosures may include more or fewer stator vanes than depicted in FIG. 43.

Similar to the aero stator assembly 102, the electrically conductive stator vanes 4304 are configured to conduct at least one of electrical power (e.g., DC power, AC power) or electrical control signaling (e.g., CAN bus signaling), and the thermally conductive vanes 4306 are configured to conduct heat away from the control unit 4302 during operation. The electrically conductive stator vanes 4304 thus likewise include electrical attachment lugs 4314a and 4314b for attaching electrical wiring (e.g., electrical leads, lead wiring) that delivers the power and/or the control signals. In contrast to the aero stator assembly 102, the aero stator assembly 4304, in this example, positions the control unit 4302 on the exterior surface of the structural shroud 4312. The control unit 4302, in this example, is in thermal communication with the structural shroud 4312, which is configured to conduct heat away from the heat-generating elements 4316 (e.g., MOSFETS) of the control unit. The structural shroud 4312 thus may be constructed of a thermally conductive material (e.g., aluminum). The structural shroud 4312, in this example, also is in thermal communication with the thermally conductive vanes 4306, which also are configured to conduct heat away from the structural shroud. The aero stator assembly 4300, in this example, thus is configured to conduct heat away from the heat-generating elements 4316 of the control unit 4302 to the thermally conductive vanes 4306 via the structural shroud 4312. The shape of the control unit 4302 (or a portion thereof) thus may conform to the circumferential perimeter of the structural shroud 4312. For example, as seen in the partially exploded view of the aero stator assembly 4300 in FIG. 43A, the heat-generating elements may be affixed or otherwise mounted to a mounting plate 4318 that is affixed or otherwise mounted to the exterior surface of the structural shroud 4312. The mounting plate 4318, in some examples, may include a portion (e.g., a bottom surface) that conforms to the shape (e.g., curvature) of the structural shroud 4312. The mounting plate 4318, in some examples, may be or otherwise function as a heatsink (e.g., include structural elements such as fins, posts, or the like, that facilitate the heat transfer away from the heat-generating elements 4316). In some examples, the heat-generating elements 4316 may be affixed or otherwise mounted to the exterior surface of the structural shroud 4312 without the use of a mounting plate (e.g., within recesses formed in the exterior surface of the structural shroud that are sized and shaped to receive the heat-generating elements such that the heat-generating elements are in thermal communication with the walls defining the recess as described herein). In some examples thermal paste or thermal glue may be used to affix the heat-generating elements 4316 and/or the mounting plate 4318. In some examples, brazing may be used to affix the mounting plate to the structural shroud 4312. The control unit 4302 thus may include multiple boards (e.g., PCBs) positioned radially around the outer perimeter of the structural shroud 4312 with the heat-generating elements 4316 (and optionally the mounting plate 4318) positioned ("sandwiched") between the boards and the exterior surface of the structural shroud. In some examples, a control unit may include multiple mounting plates with one or more heat-generating elements affixed to each mounting plate. In some examples, a control unit may include a quantity of boards that match the quantity of mounting plates with each board corresponding to one of the mounting plates.

With the control unit 4302 of the example aero stator assembly 4300 located on the exterior of the structural shroud 4312, another unit may be received within the central cavity 4310 of the hub 4308. For example, the central cavity 4310 of the aero stator assembly 4300, in this example, may receive a motor (not shown) as described herein that receives power and/or control signaling via the electrically conductive stator vanes 4304. The motor may also be in thermal communication with the hub 4308 as described herein when residing within the central cavity 4310. The hub 4308 may be configured to conduct heat away from the motor to the thermally conductive vanes 4306 during operation as also described herein. In some examples, one or more thermistors may be used to monitor the temperature of a motor residing within the central cavity of a hub of an aero stator assembly. In these examples, one or more of the electrically conductive stator vanes may be used to provide one ore more thermistor signals to an ESC located on the exterior surface of a structural shroud. Based on the signals received at the ESC from the thermistor(s) via the electrically conductive stator vanes, the ESC may control the operation of the motor to keep its temperature within acceptable thermal limits (e.g., below a temperature threshold). In some examples, the hub of an aero stator assembly may not include a central cavity, and a motor may be located forward or aft of the aero stator assembly.

Aero stators as described herein may be manufactured in different ways. In some examples an aero stator may be machined (e.g., via CNC machining) as a singular unitary piece. In these examples, the aero stator may have a monolithic construction (e.g., an aero stator with vanes that are contiguous with a hub of the aero stator and contiguous with a shroud of the aero stator). In other examples, portions of an aero stator (e.g., stator vane sectors, hub, stator vanes, structural shroud, or portions thereof) may be individually manufactured as separate pieces and joined together to form the aero stator assembly. In some examples, portions of an aero stator may have a monolithic construction (e.g., a sector having one or more stator vanes contiguous with a portion of the hub and contiguous with a portion of the shroud).

As described herein, example of aero stator assemblies may be electrically and/or thermally conductive. In some examples, an aero stator assembly may be both electrically and thermally conductive as described herein. In some examples, an aero stator assembly may be only thermally conductive. In some examples, an aero stator assembly may be only electrically conductive. The thermal conductivity of an aero stator assembly may depend on an area of the aero stator assembly that is in thermal communication with heat-generating elements of an air-moving device (e.g., a motor, control unit MOSFETS, and the like). In some examples, a contact area of a motor mount (or motor mounting plate) with an aft face of a motor may be in the range of about 2,000-3,000 mm$^2$ (e.g., about 2,246 mm$^2$, about 2,355 mm$^2$). The thermal communication resistance of the aero stator assembly may depend on contact pressure, the surface features of the surfaces in thermal communication with each other (e.g., rough, medium, or smooth), type of thermally conductive material (e.g., aluminum), the temperature of the thermally conductive material, and the thickness of the thermally conductive material. In some examples, the thermally conductive stator vanes described herein may conduct heat from a motor of an air-moving device with a contact resistance (R) of less than about 0.25 K/W (e.g., about 0.222 K/W). In some examples, a motor mount (or motor mounting plate) may have a maximum contact resistance (R) of about 0.0005 m$^2$ K/W. In some examples, a motor mount (or motor mounting plate) may have a thickness in the range of about 3-6 mm (e.g. 3 mm, 4.5 mm, 6 mm). In some examples, thermal paste or thermal glue may be used to facilitate the thermal conductivity between two thermally conductive components of an air-moving device. It should be appreciated that the above disclosures of the thermal conductivity of an aero stator assembly are provide simply for the purpose of illustration and without limitation.

Figure 44:
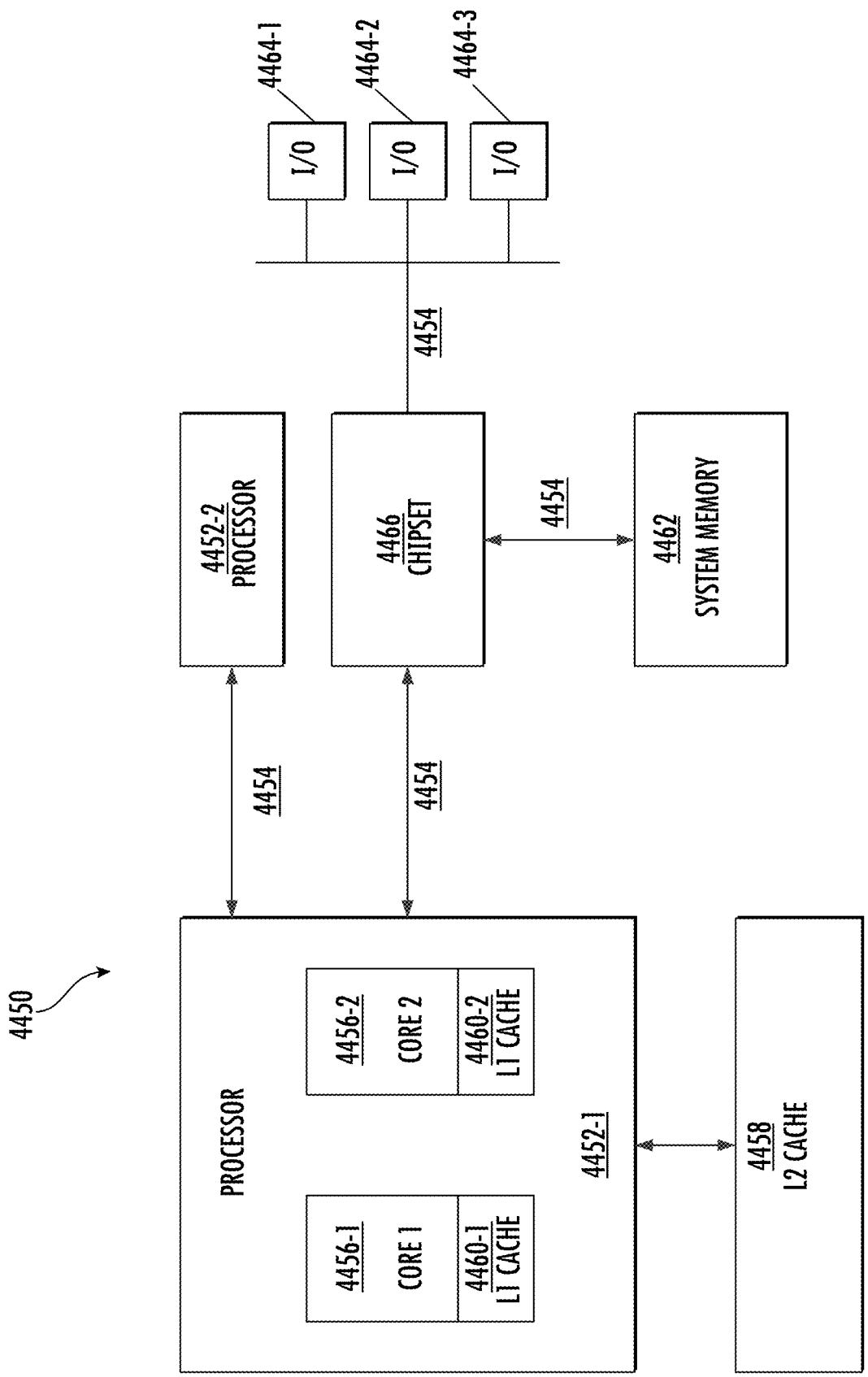
FIG. 44 depicts a block diagram of example components of a control computer that may be part of or in communication with a blower system according to one or more examples as described herein.

Aspects of this disclosure further relate to one or more non-transitory computer-readable mediums that comprise computer-readable instructions that, when executed by a processor, cause the processor to perform at least one or more functions as disclosed herein, such as, but not limited to, controlling operation of one or more air-moving devices (e.g., a propulsor, a blower), controlling operation of one or more controllers of an air-moving device, controlling operation of one or more electronic speed controllers of an air-moving device, and/or performing other functions. FIG. 44, for example, depicts a block diagram of example components of a control computer that may be part of or in communication with an air-moving device in accordance with aspects of the present disclosure. FIG. 44 depicts one non-limiting example of a computer-readable medium according to some examples. Specifically, FIG. 44 illustrates a block diagram of control computer 4450 for an air-moving device (e.g., a propulsor, a blower). Those skilled in the art will appreciate that the disclosures associated with FIG. 44 may be applicable to any system, air-moving device, or air-moving device control system disclosed herein and/or combinations thereof. Control computer 4450 may include one or more processors, such as processor 4452-1 and 4452-2 (generally referred to herein as "processors 4452" or "processor 4452"). Processors 4452 may communicate with each other or other components via an interconnection network or bus 4454. Processor 4452 may include one or more processing cores, such as cores 4456-1 and 4456-2 (referred to herein as "cores 4456" or more generally as "core 4456"), which may be implemented on a single integrated circuit (IC) chip.

Cores 4456 may have a shared cache 4458 and/or a private cache (e.g., caches 4460-1 and 4460-2, respectively and referred to herein as "caches 4460"). One or more caches 4458/4360 may locally cache data stored in a system memory, such as memory 4462, for faster access by components of the processor 4452. Memory 4462 may be in communication with the processors 4452 via a chipset 4466. Cache 4458 may be part of system memory 4462 in certain examples. Memory 4462 may include, but is not limited to, random access memory (RAM), read only memory (ROM), and include one or more of solid-state memory, optical or magnetic storage, and/or any other medium that can be used to store electronic information. Yet other examples may omit system memory 4462.

System 4450 may include one or more I/O devices (e.g., I/O devices 4464-1 through 4464-3, each generally referred to as I/O device 4464). I/O data from one or more I/O devices 4464 may be stored at one or more caches 4458, 4460 and/or system memory 4462. Each of I/O devices 4464 may be permanently or temporarily configured to be in operative communication with a component of an apparatus, such as an air-moving device, using any physical or wireless communication protocol.

Although the computer 4450 is shown on a single drawing, it will be appreciated with the benefit of this disclosure that one or more components may be "remote" with respect to another component. For example, in one example, one or more components may be in a separate housing from one or more other components. In some examples, one or more components of the computer 4450 may only be in wireless communication with other components of the computer 4450. In some examples, one or more components of computer 4450 may be located on or within a portion of an air-moving device, and yet other components may be located remote with respect to the air-moving device.

Air-moving devices as described may include various types of air-moving devices. Examples of air-moving devices include propulsors for aircrafts such as airplanes (e.g., electric airplanes), drones, and the like; hand-operated equipment such as leaf blowers, snow blowers, hair dryers, and the like; various types of fans such as aircraft fans, stove-top fans, bathroom fans, computer fans (e.g., server fans, laptop fans, desktop fans), cooling fans, ventilation fans, heating-ventilation-air conditioning (HVAC) fans, blower fans (e.g., carpet dryers, race track dryers, car wash dryers); air purifiers, humidifiers, ice-making devices, snow-making devices, and other types of air-moving devices that move air via operation of a motor and/or control unit. In some examples, air-moving devices may include multiple aerodynamic stator assemblies that each integrate a respective motor, control unit, or ESC as described herein. For example, an air-moving device may include a one-dimensional array aerodynamic stator assemblies or a two-dimensional grid of aerodynamic stator assemblies. A grid of aerodynamic stator assemblies may have various shapes such as, for example, a square grid shape, a rectangular grid shape, a hexagonal grid shape, and the like.

The articles "a" and "an" are used herein to refer to one or to more than one (i.e., to at least one) of the grammatical object of the article. By way of example, "an element"

means one element or more than one element. Furthermore, "about" as used herein when referring to a measurable value such as an amount, a temporal duration, and the like, is meant to encompass variations of +20%, +10%, +5%, +1%, and +0.1% from the specified value, as such variations are appropriate according to the understanding of one of ordinary skill in the art. Throughout this disclosure, various aspects are presented in as numerical range. It should be understood that any description in describing a range is provided for convenience and brevity and should not be construed as an inflexible limitation. Where appropriate according to the understanding of one or ordinary skill in the art, the description of a range should be considered to have specifically disclosed all the possible subranges as well as individual numerical values within that range with an appropriate quantity of significant digits according to the understanding of one or ordinary skill in the art. This applies regardless of the breadth of the range.

While aspects of the present disclosure have been described in terms of preferred examples, and it will be understood that the disclosure is not limited thereto since modifications may be made to those skilled in the art, particularly in light of the foregoing teachings. For example, although various examples are described herein, features and/or steps of those examples may be combined, divided, omitted, rearranged, revised, and/or augmented in any desired manner. Various alterations, modifications, and improvements will be appreciated by those skilled in the art and are intended to be part of this description, even if not expressly stated herein, and are intended to be within the spirit and scope of the disclosures herein. The disclosures herein, therefore, are by way of example only, and are not limiting.

For example, the subject matter disclosed herein extends to the disclosures in the following numbered clauses.

Clause 1. An aerodynamic stator for an air-moving device, the aerodynamic stator comprising: a hub defining a central cavity, wherein a size of the cavity and a shape of the cavity are configured to receive a motor of an air-moving device or a control unit of the air-moving device; and conductive stator vanes radially extending away from an outer surface of the hub, wherein the conductive stator vanes are configured to be in conductive communication with the motor or the control unit based on the motor or the control unit being received within the central cavity of the hub.

Clause 2. The aerodynamic stator of Clause 1, wherein: the motor or the control unit is in thermal communication with the hub; and the conductive stator vanes comprise at least one thermally conductive stator vane configured to be in thermal communication with the motor or the control unit via the hub based on the motor or the control unit being received within the central cavity of the hub.

Clause 3. The aerodynamic stator of Clause 1, wherein the conductive stator vanes comprise at least one electrically conductive stator vane configured to be in electrical communication with the motor or the control unit based on the motor or the control unit being received within the central cavity of the hub.

Clause 4. The aerodynamic stator of Clause 1, wherein: the motor or the control unit is in thermal communication with the hub; the conductive stator vanes comprise at least one thermally conductive stator vane configured to be in thermal communication with the motor or the control unit via the hub based on the motor or the control unit being received within the central cavity of the hub; and the conductive stator vanes comprise at least one electrically conductive stator vane configured to be in electrical communication with the motor or the control unit based on the motor or the control unit being received within the central cavity of the hub.

Clause 5. The aerodynamic stator of Clause 1, wherein the air-moving device is an aircraft propulsor.

Clause 6. The aerodynamic stator of Clause 1, wherein the aerodynamic stator has a monolithic construction.

Clause 7. The aerodynamic stator of Clause 1, wherein the motor of the air-moving device is received within the central cavity of the hub.

Clause 8. The aerodynamic stator of Clause 1, wherein the control unit of the air-moving device is received within the central cavity of the hub.

Clause 9. An assembly for an air-moving device, the assembly comprising: a motor; and an aerodynamic stator comprising: a hub defining a central cavity, wherein the motor is received within the central cavity of the hub; and conductive stator vanes radially extending away from an outer surface of the hub, wherein the motor is in conductive communication with the conductive stator vanes.

Clause 10. The assembly of Clause 9, wherein: the conductive stator vanes comprise thermally conductive stator vanes in thermal communication with the hub; an outer surface of the motor is in thermal communication with an inner surface of the hub; and the hub is configured to conduct, away from the motor toward the thermally conductive stator vanes, heat generated by the motor.

Clause 11. The assembly of Clause 10 further comprising a thermally conductive sleeve received in the central cavity and in thermal communication with an outer circumferential surface of the motor, wherein the outer circumferential surface of the motor is in thermal communication with an inner circumferential surface of the hub via the sleeve.

Clause 12. The assembly of Clause 10, wherein: each thermally conductive stator vane comprises: a blade radially extending between a root of the thermally conductive stator vane and a tip of the thermally conductive stator vane; and an axial flange axially extending forward of the blade; the hub is at least partially defined by an axial ring formed by each respective axial flange of the thermally conductive stator vanes; and an outer circumferential surface of the motor is in thermal communication with an inner circumferential surface of the axial ring.

Clause 13. The assembly of Clause 10, wherein: each thermally conductive stator vane comprises: a blade radially extending between a root of the thermally conductive stator vane and a tip of the thermally conductive stator vane; and a radial lug radially extending away from the blade toward a center of the hub; the hub is at least partially defined by a radial ring formed by each respective radial lug of the thermally conductive stator vanes; and an outer surface of an aft end of the motor is in thermal communication with the radial lug.

Clause 14. The assembly of Clause 9, wherein the conductive stator vanes comprise electrically conductive stator vanes in electrical communication with the motor.

Clause 15. The assembly of Clause 14, wherein at least one of the electrically conductive stator vanes is configured to deliver power to the motor.

Clause 16. The assembly of Clause 14, wherein at least one of the electrically conductive stator vanes is configured to deliver control signaling to the motor.

Clause 17. The assembly of Clause 14, wherein at least one of the electrically conductive stator vanes is configured to deliver power to the motor and at least one of the electrically conductive stator vanes is configured to deliver control signaling to the motor.

Clause 18. The assembly of Clause 9, wherein: the conductive stator vanes comprise thermally conductive stator vanes in thermal communication with the hub and comprise electrically conductive stator vanes in electrical communication with the motor; an outer surface of the motor is in thermal communication with an inner surface of the hub; and the hub is configured to conduct, away from the motor toward the thermally conductive stator vanes, heat generated by the motor.

Clause 19. The assembly of Clause 9, wherein the aerodynamic stator comprises a plurality of sectors, wherein each sector has a monolithic construction, and wherein each sector comprises at least one of the conductive stator vanes and a portion of the hub.

Clause 20. An Air-Moving Device, Comprising: A Control Unit; and
an aerodynamic stator, wherein the aerodynamic stator comprises: a hub defining a central cavity, wherein the control unit is received within the central cavity of the hub; and conductive stator vanes radially extending away from an outer surface of the hub, wherein the control unit is in conductive communication with the conductive stator vanes.

Clause 21. The air-moving device of Clause 20, wherein: the conductive stator vanes comprise thermally conductive stator vanes in thermal communication with the hub; at least one heat-generating element of the control unit is in thermal communication with an inner surface of the hub; and the hub is configured to conduct, away from the at least one heat-generating element toward the thermally conductive stator vanes, heat generated by the at least one heat-generating element.

Clause 22. The air-moving device of Clause 21, wherein the at least one heat-generating element comprises at least one metal-oxide-semiconductor field-effect transistor (MOSFET).

Clause 23. The air-moving device of Clause 20, wherein the conductive stator vanes comprise electrically conductive stator vanes in electrical communication with the control unit.

Clause 24. The air-moving device of Clause 23, wherein at least one of the electrically conductive stator vanes is configured to deliver power to the control unit.

Clause 25. The air-moving device of Clause 23, wherein at least one of the electrically conductive stator vanes is configured to deliver control signaling to the control unit.

Clause 26. The air-moving device of Clause 23, wherein at least one of the electrically conductive stator vanes is configured to deliver power to the control unit and at least one of the electrically conductive stator vanes is configured to deliver control signaling to the control unit.

Clause 27. The air-moving device of Clause 20, wherein: the conductive stator vanes comprise thermally conductive stator vanes in thermal communication with the hub and comprise electrically conductive stator vanes in electrical communication with the control unit; at least one heat-generating element of the control unit is in thermal communication with an inner surface of the hub; and the hub is configured to conduct, away from the at least one heat-generating element toward the thermally conductive stator vanes, heat generated by the at least one heat-generating element.

Clause 28. The air-moving device of Clause 20, wherein the control unit is an electronic speed controller (ESC).

Clause 29. The air-moving device of Clause 20, further comprising an aerodynamic rotor, wherein the aerodynamic stator is positioned aftward of the aerodynamic rotor.

Clause 30. The air-moving device of Clause 20, further comprising: at least one second control unit; and at least one second aerodynamic stator, wherein each of the at least one second aerodynamic stator comprises: a second hub defining a second central cavity, wherein the second control unit is received within the central cavity of the hub; and second conductive stator vanes radially extending away from an outer surface of the second hub, wherein the second control unit is in conductive communication with the second conductive stator vanes.

What is claimed is:

1. An air-moving device comprising:
a mechanical power delivery system comprising a drive shaft;
an aerodynamic rotor comprising a plurality of blades, wherein the aerodynamic rotor is coupled to the mechanical power delivery system and configured to generate thrust based on being rotated by the mechanical power delivery system via the drive shaft;
an aerodynamic stator located between the aerodynamic rotor and the mechanical power delivery mechanism, the aerodynamic stator comprising:
a thermally conductive hub comprising an axial rim that defines a central cavity of the thermally conductive hub;
stator vanes radially extending away from an outer surface of the hub toward an outer perimeter of the aerodynamic stator, wherein the stator vanes comprise:
thermally conductive stator vanes in thermal communication with the hub and configured to conduct heat away from the hub; and
electrically conductive stator vanes configured to conduct at least one of electrical power or electrical control signaling; and
a control unit received within the central cavity of the hub and electrically coupled to the mechanical power delivery mechanism and to the electrically conductive stator vanes, the control unit comprising:
a substrate defining a central aperture that permits passage of the drive shaft; and
a plurality of heat-generating elements positioned at an outer perimeter of the substrate and in thermal communication with an inner surface of the hub.

2. The air-moving device of claim 1, wherein the control unit comprises an electronic speed controller (ESC), and wherein the plurality of heat-generating elements comprise one or more metal-oxide-semiconductor field-effect transistors (MOSFETs).

3. The air-moving device of claim 1, wherein the control unit is configured to receive electrical power via at least one of the electrically conductive stator vanes and to power the mechanical power delivery mechanism with the received electrical power.

4. The air-moving device of claim 3, wherein the received electrical power is direct current (DC) power and the control unit is configured to provide alternative current (AC) power to the mechanical power delivery mechanism based on the received DC power.

5. The air-moving device of claim 1, wherein the control unit is configured to receive electrical control signaling via at least one of the electrically conductive stator vanes and to control the mechanical power delivery mechanism based on the received electrical control signaling.

6. The air-moving device of claim 5, wherein the electrical control signaling comprises controller area network (CAN) signaling.

7. The air-moving device of claim 1, further comprising a collar that axially extends through the central aperture of the control unit and couples the control unit to the mechanical power delivery mechanism, wherein the drive shaft axially extends through the collar.

8. The air-moving device of claim 1, wherein each of the electrically conductive stator vanes comprises:
 a first electrical coupling located at a first end of the electrically conductive stator vane and disposed within the central cavity of the hub; and
 a second electrical coupling located at a second end of the electrically conductive stator vane opposite the first end.

9. The air-moving device of claim 1, wherein the axial rim of the hub comprises, for each of the plurality of heat-generating elements, a recess that receives the heat-generating element, wherein the heat-generating element is in thermal communication with at least one surface of the recess.

10. The air-moving device of claim 1, wherein the air-moving device is a propulsor for an aircraft.

11. The air-moving device of claim 1, wherein the mechanical power delivery system comprises an electric motor.

12. An assembly for an air-moving device, the assembly comprising:
 a control unit comprising one or more heat-generating elements and configured to electrically couple to a motor of an air-moving device;
 an aerodynamic stator comprising:
  a hub defining a central cavity, wherein the control unit is received within the central cavity, wherein the one or more heat-generating elements of the control unit are in thermal communication with an inner surface of the hub, and wherein the hub is configured to conduct, away from the control unit, heat generated by the one or more heat-generating elements of the control unit;
  thermally conductive stator vanes radially extending away from an outer surface of the hub in thermal communication with the hub and configured to conduct heat away from the hub;
  at least one first electrically conductive stator vane radially extending away from the outer surface of the hub and configured to conduct electrical power to the control unit; and
  at least one second electrically conductive stator vane radially extending away from the outer surface of the hub and configured to conduct power control signaling to the control unit.

13. The assembly of claim 12, wherein the control unit comprises one or more power inverters configured to receive the electrical power conducted by the at least one first electrically conductive stator vane.

14. The assembly of claim 12, wherein the heat-generating elements of the control unit comprise one or more metal-oxide-semiconductor field-effect transistors (MOSFETs), and wherein the MOSFETs are radially positioned around an outer perimeter of the control unit.

15. The assembly of claim 12, wherein the control unit comprises a central aperture that permits passage of a drive shaft of the motor of the air-moving device.

16. An aerodynamic stator for an air-moving device, the aerodynamic stator comprising:
 a thermally conductive hub configured to receive, in a central cavity of the hub, a control unit of an air-moving device and configured to conduct, away from the control unit, heat generated by one or more heat-generating elements of the control unit based on the heat-generating elements being in thermal communication with an inner surface of the hub when the control unit is received within the central cavity of the hub;
 thermally conductive stator vanes in thermal communication with the hub and radially extending outward from an outer surface of the hub, wherein the thermally conductive stator vanes are configured to conduct heat away from the hub and dissipate the heat at least based on an airflow across the thermally conductive stator vanes generated by an aerodynamic rotor located forward of the aerodynamic stator; and
 electrically conductive stator vanes coupled to the hub and radially extending outward from the outer surface of the hub, wherein the electrically conductive stator vanes are configured to conduct, for a mechanical power delivery mechanism located aftward of the aerodynamic stator, at least one of electric power or electric control signaling.

17. The aerodynamic stator of claim 16, further comprising:
 a shroud circumscribing and coupled to the thermally conductive stator vanes and to the electrically conductive stator vanes; and
 wherein each of the electrically conductive stator vanes comprises:
  a first electrical coupling disposed within the central cavity of the hub; and
  a second electrical coupling disposed on an exterior side of the shroud.

18. The aerodynamic stator of claim 16, wherein a quantity of the electrically conductive stator vanes is in a range of 3-5 electrically conductive stator vanes.

19. The aerodynamic stator of claim 16, wherein a quantity of the thermally conductive stator vanes is in a range of 10-40 thermally conductive stator vanes.

20. The aerodynamic stator of claim 16, wherein the inner surface of the hub comprises, for each of the one or more heat-generating elements of the control unit, a recess configured to receive the heat-generating element when the control unit is received within the central cavity of the hub.

21. The aerodynamic stator of claim 16, wherein the central cavity of the hub has a circular shape.

* * * * *